United States Patent
Mizutani et al.

(10) Patent No.: US 6,172,488 B1
(45) Date of Patent: Jan. 9, 2001

(54) AC TRANSMISSION SYSTEM WITH REACTANCE COMPENSATION

(75) Inventors: Mami Mizutani, Tokyo; Yukitaka Monden, Kanagawa-ken; Masaaki Shigeta; Shigeru Tanaka, both of Tokyo; Hajime Yamamoto, Kanagawa-ken; Hiroshi Uchino, Tokyo, all of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/288,920

(22) Filed: Apr. 9, 1999

(30) Foreign Application Priority Data

Apr. 10, 1998 (JP) .................................................. 10-114388
May 7, 1998 (JP) .................................................. 10-124369

(51) Int. Cl.⁷ ........................................................ G05F 1/70
(52) U.S. Cl. ............................................................ 323/207
(58) Field of Search .................................. 323/205, 207, 323/208, 215, 218

(56) References Cited

U.S. PATENT DOCUMENTS

| | | | |
|---|---|---|---|
| 5,198,746 | 3/1993 | Gyugyi et al. | 323/207 |
| 5,343,139 | 8/1994 | Gyugyi et al. | 323/207 |
| 5,355,076 * | 10/1994 | Chadwick | 323/208 |
| 5,657,213 * | 8/1997 | Bjorklund et al. | 363/35 |
| 5,734,256 * | 3/1998 | Larsen et al. | 323/207 |
| 5,808,452 * | 9/1998 | Gyugyi et al. | 323/207 |
| 5,952,816 * | 9/1999 | Larsen | 323/215 |

* cited by examiner

*Primary Examiner*—Adolf Deneke Berhane
(74) *Attorney, Agent, or Firm*—Foley & Lardner

(57) ABSTRACT

A series compensation generator SCG is installed in a transmission line that links various substations SS and the transmission capability of the system as a whole can be increased by regulating the equivalent reactance of the transmission line. Series compensation generator SCG generates a voltage of which the phase angle is shifted substantially 90° in relation to the current flowing in the transmission line, and it also generates a voltage that compensates the voltage drop due to the equivalent reactance. Also, when an electrical fluctuation phenomenon (power oscillation) occurs in the transmission line, it is possible speedily to suppress the power oscillation by detecting the power fluctuation of the transmission line and controlling the compensating voltage of series compensation generator SCG so that it suppresses that power fluctuation.

48 Claims, 41 Drawing Sheets

%XI3>%XI1>%XI2>%XI5>%XI4

$P3 \cdot X3 > P1 \cdot X1 > P2 \cdot X2 > P5 \cdot X5 > P4 \cdot X4$ (a)

(b)

AC TRANSMISSION SYSTEM WITH REACTANCE COMPENSATION

BACKGROUND OF THE INVENTION

1. Field of the Invention

The present invention relates to AC transmission systems that use existing AC transmission lines, but are unaffected by the reactance of the transmission lines, and more particularly relates to AC transmission systems that improve the transmission capability of transmission lines or distribution lines by cancelling the impedance of AC transmission lines or AC distribution lines.

2. Description of the Related Art

Most Japanese transmission lines are AC transmission type of frequency 50 Hz or 60 Hz, while some, such as intersystem links and long-distance transmission lines, use DC transmission.

FIG. 1 shows system block diagrams illustrating the concepts of DC transmission and AC transmission.

In the diagrams, G indicates a power station, SS a sub-station, TR1, TR2 transformers, CNV an AC/DC power converter, INV a DC/AC power converter, Ld a DC reactor and X AC transmission line reactance, respectively.

FIG. 1(a) shows a DC transmission system. AC power generated in power station G is converted to DC by AC/DC power converter CNV. That DC power is transmitted to the receiving sub-station via DC transmission lines. Then, the DC power is once more converted to AC power by DC/AC power converter INV, and AC power is supplied to other sub-stations or to demand loads.

This DC transmission system has the advantage that it is possible to transmit power over long distances without voltage drops due to transmission line reactance because the power is transmitted by temporarily converting it to DC. Also, even if two AC systems have different frequencies, it is possible to link them. However, power converters each having the same transmission capacity are required on the transmitting side and the receiving side. Also, new DC transmission lines must be constructed, and the system becomes expensive.

On the other hand, FIG. 1(b) shows an AC transmission system. This has the advantage that transformers TR1 and TR2 can freely alter the voltage, and the AC can be transmitted as it is. Also, most of the present transmission lines are AC transmission lines, and an economical power supply that uses these effectively is possible. However, when there is reactance X in a transmission line, its voltage drop becomes a problem, and there is the disadvantage that there is a limit to the active power than can be transmitted.

In FIG. 2, FIG. 2(a) shows a simple equivalent circuit for an AC transmission line, and FIG. 2(b) shows the relationship of the transmitted power to phase angle θ. In the drawings, when the transmitting terminal voltage is taken as Vs, the receiving terminal voltage as Vr, its phase difference as θ and the reactance of the transmission line as X, the active power P that can be transmitted is expressed by the following expression.

$$P = \frac{Vs \cdot Vr}{X} \cdot \sin\theta$$

Consequently, as the length of the transmission line becomes longer, reactance X becomes greater, and the transmissible active power is more limited.

Also, normal transmission is operated with a phase difference θ of 30° or less. However, if power fluctuations occur in the system and the phase difference θ exceeds 90°, a so-called generator out-of-step phenomenon occurs, and transmission becomes impossible. Moreover, in a system with a large transmission line reactance X, there is the disadvantage that, since the maximum value of transmitted power is small, phase difference θ will fluctuate greatly, even with a small power fluctuation, and the system readily becomes unstable.

With AC transmission, the voltage can freely be varied by a transformer, and this is economical, providing AC transmission over long distances using existing lines is possible. Thus, there is a great advantage on both the power supply side and the power user side. However, it suffers from the effect of transmission line reactance, and there are limits to the transmissible active power.

On the other hand, DC transmission does not suffer the effect of transmission line reactance. However, since it cannot use existing transmission lines, and also large capacity power converters sufficient for the transmission capacity are required, the system cost becomes very high. Moreover, when attempting to supply power to a load partway along the transmission route, it is necessary temporarily to convert the DC to AC power; power converters are required for that, and that, too, becomes an uneconomic system.

SUMMARY OF THE INVENTION

Accordingly, one object of the present invention is to provide a novel AC transmission system that can make effective use of existing AC transmission lines, can cancel effects due to reactance, and can transmit over long distances by increasing the transmission capabilities of the transmission lines.

Also, one object of the present invention is to provide an AC transmission system that can make effective use of existing transmission lines (including distribution lines), can cancel the effects due to reactance, can increase the transmission capabilities of transmission lines or distribution lines, and can transmit over long distances.

To achieve the above objects, in a power system in which transmission is via multiple substations, the present invention is an AC transmission system that provides at least one series compensation generator that generates a compensating voltage for regulating the equivalent reactance of power lines between those substations and inhibiting power oscillation.

With AC transmission, the performance of long distance transmission via multiple substations, making use of existing transmission lines, can be considered. The transmission capability of the system as a whole can be increased by installing multiple series compensation generators on the transmission lines that connect the various substations, and regulating the equivalent reactance of the transmission lines.

A series compensation generator generates a voltage with its phase shifted by an electrical angle of approximately 90° to the current flowing in a transmission line. Thus, it generates a voltage that compensates the voltage drop due to the equivalent reactance. Provided the series compensation generator generates a compensating voltage such that it will entirely cancel the voltage drop due to the inductance of the transmission line, the equivalent reactance of the transmission line will become zero.

Also, even if the reactance is not entirely cancelled, by reducing the inductance, the transmission capability of the transmission line can be markedly improved.

Moreover, even if, from whatever cause, an electrical oscillation phenomenon (power oscillation) occurs in the transmission line, that electrical oscillation phenomenon can be suppressed by outputting a compensating voltage from the series compensation generator. That is to say, it is possible speedily to suppress power oscillation by detecting the power fluctuation of the transmission line, and controlling the compensating voltage of the series compensation generator so that it inhibits the power oscillation.

By this means, long-distance AC transmission is possible via multiple substations.

The capacity of a series compensation generator is determined by the percentage reactance % XI of the transmission line, and it is possible to manage about 10~20% of that of a power converter of a DC transmission system. Also, since it can be used in existing transmission lines, the system cost is much more economical.

Also, in order to achieve the above objects, the present invention is an AC transmission system in which the above-mentioned series compensation generator is designed for inclusive regulation of the reactance of neighbouring transmission lines.

In the case of performing long-distance AC transmission via multiple transmission lines, there is a requirement to increase the transmission capability with a minimum of equipment. By compensating the reactance of neighbouring transmission lines using one series compensation generator, the transmission capability of all the transmission lines can be improved. By this means, low system cost long-distance AC transmission can be achieved.

Moreover, in order to achieve the above-mentioned objects, in a power system in which transmission is via multiple substations, the present invention is an AC transmission system that provides series compensation generators that generate compensating voltages so that the equivalent reactances in the transmission lines that are connected between all the various substations of the transmission route become approximately zero.

In an AC transmission system that supplies power via multiple substations and transmission lines, compensatory control is exercised so that all the equivalent reactances on that transmission route become approximately zero. By this means, the size and phase of the voltage in each substation become the same. Thus, AC transmission that is unaffected by reactance becomes possible from the substation to the domestic consumer, and the same effect is obtained as with DC transmission. Furthermore, existing AC transmission lines can be used, and also the capacities of the series compensation generators are markedly smaller than those of DC transmission power converters. Also, the maximum value of the transmissible power is increased by the fact that the reactances of the various transmission lines on the transmission route become approximately zero. The result is a stable power system in which the phase difference does not shift, even for some degree of power fluctuation.

Furthermore, in order to achieve the above-mentioned objects, in a power system in which transmission is via multiple substations, the present invention is an AC transmission system that selects the transmission line with the largest percentage reactance % XI out of the transmission lines that are connected between the above-mentioned substations, and provides a series compensation generator that generates a compensating voltage to reduce the equivalent reactance of that transmission line.

With AC transmission, the performance of long distance transmission via multiple substations, making use of existing transmission lines, can be considered. The transmission capability of the whole system can be increased by selecting the transmission line with the largest equivalent reactance % XI out of the transmission lines that are connected between the various substations, and causing the generation of a compensating voltage by a series compensation generator that will reduce the equivalent reactance of that transmission line to approximately zero. By this means, efficient long-distance AC transmission via multiple substations becomes possible.

Furthermore, in order to achieve the above-mentioned objects, in a power system in which transmission is via multiple substations, the present invention is an AC transmission system that selects the transmission line for which the product of the reactance X of the transmission line and the amount of power flow P flowing in that transmission line is the largest out of the transmission lines that are connected between the above substations, and provides a series compensation generator that generates a compensating voltage to reduce the equivalent reactance of that transmission line.

With AC transmission, the performance of long distance transmission via multiple substations, making use of existing transmission lines, can be considered. The transmission capability of the whole system can be increased by selecting the transmission line for which the product of the transmission line reactance X and the amount of power flow P flowing in that transmission line is the largest out of the transmission lines that are connected between the various substations, and causing the generation of a compensating voltage by a series compensation generator so that the equivalent reactance of that transmission line is reduced. A transmission line in which the amount of power flow P flowing is large is one in which the effect of transmission line reactance X will be large. Therefore, it is effective to select and compensate the one in which the product of P and X is the largest. By this means, efficient long-distance AC transmission via multiple substations becomes possible.

Furthermore, in order to achieve the above-mentioned objects, the present invention is an AC transmission system in which the series compensation generator is provided with a means for detecting the fluctuation components of the active power and the reactive power of the transmission line. This system is designed to suppress power oscillation of the power system by regulating the compensating voltage of the component that is orthogonal to the current flowing in the transmission line according to that active power fluctuation, and also by regulating the compensating voltage of the component that is the same phase as the current flowing in the transmission line according to that reactive power fluctuation.

A series compensation generator has been stated to have the function of regulating the equivalent reactance of a transmission line by generating the voltage of a component that is approximately orthogonal to the current flowing in a transmission line in the steady state.

When a transmission line earth fault (or ground fault) happens, power oscillation occurs in the system. In that case, the oscillation of the power system is suppressed by detecting the fluctuations of the active power and the reactive power of the transmission line, regulating the compensating voltage of the component that is orthogonal to the current flowing in the transmission line according to that active power fluctuation, and also regulating the compensating voltage of the component that is the same phase as the current flowing in the transmission line according to that reactive power fluctuation. By this means, it is possible to design the speedy suppression of power fluctuation and the stability of long-distance AC transmission.

Furthermore, in order to achieve the above-mentioned objects, the present invention is an AC transmission system in which a series compensation generator is provided with means of detecting the amount of power flow in a transmission line, and of regulating the equivalent reactance of that transmission line according to that power flow amount.

The series compensation generator detects the flowing power of a transmission line, regulates the equivalent reactance of the transmission line according to the amount of power flow, and thus increases the transmission capability of that transmission line. That is to say, when the power flow amount is large, it reduces the equivalent reactance of the transmission line, and conversely, when the amount of flow is small, it increases the equivalent reactance. As a result, the sizes of voltage Vs on the transmitting side and voltage Vr on the receiving side together with phase difference θ can be kept approximately constant, and a stable system voltage is obtained.

Furthermore, in order to achieve the above-mentioned objects, the present invention is an AC transmission system in which the series compensation generator is provided with a circuit that bypasses that overcurrent when an overcurrent has occurred due to an earth fault and the like in the transmission line.

When an earth fault and the like occur in the power system, an excessive current will flow in the transmission line. At this time, there is a danger that an excessive current will also flow in the series compensation generator and the equipment will be damaged. To prevent this, a bypass circuit is provided in parallel with the series compensation generator, and control is exercised so that, when the passage of a current of a set value or greater is detected, that current will flow via the bypass circuit. By this means, operation is possible without damage to the equipment, even when a fault has occurred.

Furthermore, in order to achieve the above-mentioned objects, the present invention is an AC transmission system in which the series compensation generator is composed of a series transformer and a voltage source self-commutating inverter connected to the secondary side of that transformer.

With a large-capacity AC transmission line, there is high-voltage transmission of several hundred kV. The primary winding of the series transformer is connected in series with the relevant transmission line, and the voltage source self-commutating inverter is connected to the secondary winding of the series transformer. By this means, it is possible to insulate the inverter from the high-voltage transmission line. The voltage source self-commutating inverter regulates the amplitude of the output voltage by pulse-width modulation control (PWM control), or the like, and, in the steady state, generates a voltage of which the phase is shifted 90° in relation to the current flowing in the transmission line. When power oscillation occurs, that power oscillation is suppressed by controlling the phase and amplitude of the inverter output voltage.

Furthermore, in order to achieve the above-mentioned objects, the present invention is an AC transmission system in which the series compensation generator is composed of a series capacitor and a compensation voltage generator that is connected in series with that series capacitor.

The series capacitor cancels the greater part of the transmission line reactance and thus reduces the capacity of the compensation generator. The compensation voltage generator regulates the equivalent reactance of the transmission line, thus increasing the transmission capability, and also inhibits power oscillation of the system.

Furthermore, in order to achieve the above-mentioned objects, the present invention is an AC transmission system in which the series compensation generator is composed of a series capacitor and a compensation current generator that is connected in parallel with that series capacitor.

The series capacitor cancels the greater part of the to transmission line reactance and thus reduces the capacity of the compensation current generator. The compensation current generator supplies a compensating current to the series capacitor and regulates the equivalent reactance of the transmission line by regulating the impressed voltage of the capacitor, thus increasing the transmission capability and also inhibiting power oscillation in the system. In this case, it is possible to manage with a compensation current generator of small capacity. Also, this method has the advantage that, even in the case of an earth fault occurring in the transmission line, most of the excessive current will flow via the series capacitor and the effect on the compensation current generator will be small.

Furthermore, in order to achieve the above-mentioned objects, the present invention is an AC transmission system in which the series compensation generator is composed of a main series capacitor, an auxiliary series capacitor connected in series with that main series capacitor, and a compensation current generator that is connected in parallel with that auxiliary series capacitor.

The main series capacitor cancels the greater part of the transmission line reactance. The compensation current generator regulates the voltage impressed on (applied to) the auxiliary series capacitor by supplying a compensating current to that capacitor. The equivalent reactance of the transmission line is regulated by regulating the voltage impressed on (applied to) the auxiliary series capacitor. Thus, transmission capacity is increased, and also power oscillation in the system is inhibited. In this case, it is possible to manage with a compensation current generator of very small capacity. Also, this method has the advantage that, even in the case of an earth fault occurring in the transmission line, most of the excessive current will flow via the auxiliary series capacitor and the effect on the compensation current generator will be small.

Furthermore, in order to achieve the above-mentioned objects, in a power system in which transmission is via multiple substations, the present invention is an AC transmission system that is provided with:

multiple series capacitors that are connected in series with the relevant transmission lines to cancel the greater part of the inductance of the transmission lines between the substations; and compensation voltage generators that generate compensating voltages to regulate the reactance of the transmission lines and to inhibit power oscillation.

With AC transmission, the performance of long distance transmission via multiple substations, making use of existing transmission lines, can be considered. The greater part of the inductance of the transmission lines that link the various substations is cancelled by the multiple series capacitors, and the transmission capability of the system as a whole is increased by decreasing the equivalent reactance of the transmission lines. Also, the reactance of the transmission lines is regulated and the power oscillation of the system suppressed by the compensation voltage generators. By this means, long-distance AC transmission via multiple substations becomes possible. Provided there is regulation to completely cancel the inductance of the transmission lines, long-distance AC transmission unaffected by the reactance of the transmission lines is possible.

Furthermore, in order to achieve the above-mentioned objects, in a power system in which transmission is via multiple substations, the present invention is an AC transmission system that is provided with:

multiple series capacitors that are connected in series with the relevant transmission lines to cancel the greater part of the inductance of the transmission lines between the substations; and a compensation voltage generator that is connected in series with any of the series capacitors and generates a compensating voltage to inhibit power oscillation in the transmission lines.

With AC transmission, the performance of long distance transmission via multiple substations, making use of existing transmission lines, can be considered. The greater part of the inductance of the transmission lines that link the various substations is cancelled by the multiple series capacitors, and the transmission capability of the system as a whole is increased by decreasing the equivalent reactance of the transmission lines. Also, the reactance of the transmission lines is regulated and power oscillation of the system suppressed by the compensation voltage generator that is connected to any of the series capacitors. In this case, there is the advantage that, since the reactance of the transmission lines is compensated by the series capacitors, it is possible to manage with a compensation voltage generator of small capacity. By this means, provided there is regulation to completely cancel the inductance of the transmission lines, long-distance AC transmission unaffected by the reactance of the transmission lines is possible.

Furthermore, in order to achieve the above-mentioned objects, the present invention is an AC transmission system in which the multiple series capacitors and the compensation voltage generator are provided with circuits that will bypass those overcurrents in the event of overcurrents being generated by earth faults, or the like, in the transmission lines.

When an earth fault or the like has occurred in a transmission line, the overcurrent becomes greater as the reactance of the transmission line becomes smaller. Therefore, the series capacitors will quickly short, and the transmission line reactance will become greater. For that reason, the overcurrent is detected, and if it reaches a certain level or above, the current is made to flow via the bypass circuit. By this means, increase of the overcurrent is inhibited, and the series capacitors and the compensation voltage generator are protected. As soon as the overcurrent has disappeared, first, power oscillation is suppressed by opening the compensation voltage generator bypass circuit. After that, the series capacitor bypass circuits are sequentially opened, and long-distance AC transmission shifts to normal.

Furthermore, in order to achieve the above-mentioned objects, in a power system in which transmission is via multiple substations, the present invention is an AC transmission system that is provided with:

multiple series capacitors that are connected in series with the relevant transmission lines to cancel the greater part of the inductance of the transmission lines between the substations; and a compensation current generator that is connected in parallel with any of the series capacitors and generates a compensating current to inhibit power oscillation in the transmission lines.

With AC transmission, the performance of long distance transmission via multiple substations, making use of existing transmission lines, can be considered. The greater part of the inductance of the transmission lines that link the various substations is cancelled by the multiple series capacitors, and power oscillation of the system is suppressed by the compensation current generator that is connected in parallel with any of the series capacitors. Thus, the transmission capability of the system as a whole is increased by decreasing the equivalent reactance of the transmission lines. By this means, long-distance AC transmission via multiple substations becomes possible. Provided there is regulation completely to cancel the inductance of the transmission lines, long-distance AC transmission unaffected by the reactance of the transmission lines is possible.

Furthermore, in order to achieve the above-mentioned objects, the present invention is an AC transmission system in which the multiple series capacitors are provided with circuits that bypass those overcurrents when overcurrents occur due to earth faults or the like in the transmission lines.

When an earth fault or the like has occurred in a transmission line, the overcurrent becomes greater as the reactance of the transmission line becomes smaller. Therefore, the series capacitors will quickly short, and the transmission line reactance will become greater. For that reason, the overcurrent is detected, and if it reaches a certain level or above, the current is made to flow via the bypass circuits. By this means, increase of the overcurrent is inhibited, and the series capacitors and the compensation current generator are protected. As soon as the overcurrent has disappeared, first, power oscillation is suppressed by opening the bypass circuit of the series capacitor that is connected in parallel with the compensation current generator. After that, the series capacitor bypass circuits are sequentially opened, thus causing long-distance AC transmission to shift to normal.

Furthermore, in order to achieve the above-mentioned objects, in a power system in which transmission is via multiple substations, the present invention is an AC transmission system that is provided with:

multiple main series capacitors that are connected in series with the relevant transmission lines to cancel the greater part of the inductance of the transmission lines between the substations;

an auxiliary series capacitor that is connected in series with any of the main series capacitors; and a compensation current generator that is connected in parallel with that auxiliary series capacitor.

With AC transmission, the performance of long distance transmission via multiple substations, making use of existing transmission lines, can be considered. The greater part of the inductance of the transmission lines that link the various substations is cancelled by the multiple main series capacitors, and an auxiliary series capacitor is connected in series with any one of the main series capacitors. The compensation current generator regulates the impressed voltage of the auxiliary series capacitor by supplying a compensating current to the auxiliary series capacitor. By this means, the power oscillation of the system is suppressed, and the transmission capability of the system as a whole is increased by reducing the equivalent reactance of the transmission lines. Thus, long-distance AC transmission via multiple substations becomes possible. In this case, it is possible to manage with a compensation current generator of very small capacity. Provided there is regulation completely to cancel the inductance of the transmission lines, long-distance AC transmission unaffected by the reactance of the transmission lines is possible.

Furthermore, in order to achieve the above-mentioned objects, the present invention is an AC transmission system in which the multiple main series capacitors and the auxiliary series capacitor are provided with circuits that bypass those overcurrents when overcurrents occur due to earth faults or the like in the transmission lines.

When an earth fault or the like has occurred in a transmission line, the overcurrent becomes greater as the reactance of the transmission line becomes smaller. Therefore, the series capacitors will quickly short, and the transmission line reactance will become greater. For that reason, the overcurrent is detected, and if it reaches a certain level or above, the current is made to flow via the bypass circuits. By this means, increase of the overcurrent is inhibited, and the series capacitors and the compensation current generator are protected. As soon as the overcurrent has disappeared, first, power oscillation is suppressed by opening the bypass circuit of the auxiliary series capacitor that is connected in parallel with the compensation current generator. After that, the main series capacitor bypass circuits are sequentially opened, thus causing long-distance AC transmission to shift to normal.

Furthermore, in order to achieve the above-mentioned objects, the present invention is an AC transmission system that is provided with:

a long-distance AC transmission line;

a series compensation generator that generates a compensating voltage for regulating the equivalent reactance of the transmission line; and a static var generator that compensates the reactive current or the higher harmonic current flowing in the transmission line.

The series compensation generator generates a compensation voltage that is shifted to a phase angle of approximately 90° to the current flowing in the transmission line, and this regulates the equivalent reactance of the transmission line, and inhibits power oscillation. At the same time, there is inter-line, or line to ground, floating capacitance in transmission lines, and in a long-distance transmission line a large reactive current will come to flow via that floating capacitance. As this reactive current becomes larger, it will affect the current capacity of the transmission line and, ultimately, Long-distance AC transmission will become impossible. The static var generator compensates the reactive current and higher harmonic current flowing in this transmission line and, together with the series compensation generator, increases the transmission capability of the transmission line, thus achieving long-distance AC transmission.

Furthermore, in order to achieve the above-mentioned objects, the present invention is an AC transmission system that is provided with:

a long-distance AC transmission line;

a series compensation generator that generates a compensating voltage for reducing the equivalent inductance of the transmission line to approximately zero; and a static var generator that compensates the reactive current or the higher harmonic current flowing in the floating inductance of the transmission line.

The series compensation generator generates a compensation voltage that is shifted to a phase angle of approximately 90° to the current flowing in the transmission line, and makes the equivalent inductance approximately zero. Also, the design is such that, when power oscillation occurs, it acts to inhibit that, and thus stabilizes the system.

The reactive current and higher harmonic current flowing in the floating inductance are compensated by the static var generator. As a result, the currents on the transmission side and the current receiving side become approximately equal, and it becomes easier for a steady compensating voltage outputted from the series compensation generator to generate a component of which the phase is shifted 90° to the current flowing in the transmission line. Therefore, it comes about that the series compensation generator generates a steady reactive power, and it is possible to manage with a small capacity energy storage element. Incidentally, when inhibiting power oscillation, the phase of the compensating voltage varies transitionally. Only at that time is the output and input of active power of short duration.

In this way, the static var generator, in combination with the series compensation generator, increases the transmission capability of the transmission line and achieves long-distance AC transmission.

Furthermore, in order to achieve the above-mentioned objects, the present invention is an AC transmission system in which the series compensation generator is provided with a power oscillation inhibition means that detects power fluctuation in the transmission line and inhibits that power fluctuation.

When an earth fault or the like has occurred in a transmission line, power fluctuation occurs even after the earthed point has been disconnected, and brings about generator out-of-step phenomena and the like. The power oscillation in the transmission line is detected, and a compensating voltage is caused to be generated from the series compensation generator to suppress that fluctuation. By this means, stabilization of the AC transmission system is designed.

Furthermore, in order to achieve the above-mentioned objects, the present invention is an AC transmission system in which the series compensation generator is provided with a circuit that bypasses that overcurrent when an overcurrent occurs due to an earth fault or the like in the transmission line.

When an earth fault or the like has occurred in a transmission line, the overcurrent becomes greater as the reactance of the transmission line becomes smaller. Therefore, the series capacitor will quickly short, and the transmission line reactance will become greater. For that reason, the overcurrent is detected, and if it reaches a certain level or above, the current is made to flow via the bypass circuit. By this means, increase of the overcurrent is inhibited, and the series compensation generator is protected. As soon as the overcurrent has disappeared, the power oscillation is suppressed by opening the bypass circuit of the series compensation generator.

Furthermore, in order to achieve the above-mentioned objects, the present invention is an AC transmission system in which series compensation generators or static var generators are split and installed in multiple locations in the transmission line.

The inductance and floating capacitance of a transmission line are by no means concentrated in one place. They exist as distributed constants Thus, by splitting the series compensation generators and static var generators and installing them in multiple dispersed locations, compensation can be even more detailed. Also, the voltage distribution of the transmission line becomes uniform and the withstand-voltage capability of the transmission equipment can be reduced.

Also, with a long-distance AC transmission line, the voltage phase at the receiving end shifts greatly in relation to the voltage phase at the transmitting end, due to the voltage drop caused by the transmission line inductance. With particularly long distance transmission, the phase shift sometimes exceeds 90° partway along the transmission line. When that is the case, the maximum transmissible power is determined at that point, and a series compensation generator installed at the receiving end will become unable to function. To solve the problem, series compensation generators are split and installed in multiple places in the transmission line. By this means, the phase difference will not exceed 90°0 in relation to the transmitting end voltage phase at all places in the transmission line, and long-distance AC transmission can be achieved.

Furthermore, in order to achieve the above-mentioned objects, the present invention is an AC transmission system that is provided with:

a long-distance AC transmission line;

a series capacitor that is connected in series with the transmission line to cancel the greater part of the transmission line inductance;

a compensation voltage generator that is connected in series with the capacitor; and a static var generator that compensates the reactive current or the higher harmonic current flowing in the floating capacitance of the transmission line.

The series capacitor achieves transmission with approximately zero reactance by cancelling the greater part of the transmission line inductance. The compensation voltage generator, by regulating its output voltage, performs stabilization of the system and regulation of the transmission line reactance.

In a transmission line, there is inter-line and line-to-earth floating capacitance. Thus, with a long-distance transmission line, a large reactive current will flow via that floating inductance. As this reactive current becomes larger, it will affect the current capacity of the transmission line and, ultimately, long-distance AC transmission will become impossible. The static var generator compensates the reactive current and higher harmonic current that flow in the floating capacitance of the transmission line and, in combination with the above-mentioned series compensation generator, achieves long-distance AC transmission.

Also, by compensating the reactive current flowing in the floating capacitance of the transmission line using a static var generator, the current on the transmission side and the current on the receiving side become approximately equal. Thus, the voltage drop of the transmission line inductance and the voltage drop of the series capacitors become exactly cancelling phases. Therefore, the capacity of the compensation voltage generator can be decreased by that amount, and an economical system can be provided. Moreover, the steady compensating voltage that is outputted from the compensation voltage generator may be generated with a phase that is shifted 90° from the current flowing in the transmission line. Thus, reactive power will be steadily supplied, and it is possible to manage with a reduced capacity energy storage element.

Furthermore, in order to achieve the above-mentioned objects, the present invention is an AC transmission system in which the series capacitor and the compensation voltage generator are provided with circuits that bypass that overcurrent when an overcurrent occurs due to an earth fault or the like in the transmission line.

When an earth fault or the like has occurred in a transmission line, the overcurrent becomes greater as the reactance of the transmission line becomes smaller. Therefore, the series capacitor will quickly short, and the transmission line reactance will become greater. For that reason, the overcurrent is detected, and if it reaches a certain level or above, the current is made to flow via the bypass circuit. By this means, increase of the overcurrent is inhibited, and the series capacitor and the compensation voltage generator are protected. As soon as the overcurrent has disappeared, first, power oscillation is suppressed by opening the bypass circuit of the compensation voltage generator. After that, the series capacitor bypass circuits are sequentially opened, thus causing long-distance AC transmission to shift to normal.

Furthermore, in order to achieve the above-mentioned objects, the present invention is an AC transmission system in which the compensation voltage generator is provided with a power oscillation inhibition means that detects the power fluctuation of the transmission line and inhibits that power fluctuation.

The power oscillation of the transmission line is detected, and the output voltage from the compensation voltage generator is controlled so that the power fluctuation is suppressed. By this means, it becomes possible to suppress any shaft torsion oscillation contained in the generator, and the resonance phenomenon generated between the inductance of the transmission line and the series capacitor.

Furthermore, in order to achieve the above-mentioned objects, the present invention is an AC transmission system in which series capacitors or static var generators are split and installed in multiple locations in the transmission line.

The inductance and floating capacitance of a transmission line are by no means concentrated in one place. They exist as distributed constants. Thus, by splitting the series capacitors and static var generators and installing them in multiple dispersed locations, compensation can be even more detailed. Also, the voltage distribution of the transmission line becomes uniform and the withstand-voltage capability of the transmission equipment can be reduced.

With a long-distance AC transmission line, the voltage phase at the receiving end shifts greatly in relation to the voltage phase at the transmitting end, due to the voltage drop caused by the transmission line inductance. With particularly long distance transmission, the phase shift sometimes exceeds 90° partway along the transmission line. When that is the case, the maximum transmissible power is determined at that point, and a series capacitor installed at the receiving end will become unable to function. To solve the problem, series capacitors are split and installed in multiple places in the transmission line. By this means, the phase difference will not exceed 90° in relation to the transmitting end voltage phase at all places in the transmission line, and long-distance AC transmission can be achieved.

Furthermore, in order to achieve the above-mentioned objects, the present invention is an AC transmission system that is provided with:

a long-distance AC transmission line;

a series capacitor that is connected in series with the transmission line to cancel the greater part of the transmission line inductance;

a compensation current generator that is connected in parallel with the series capacitor; and a static var generator that compensates the reactive current or the higher harmonic current flowing in the floating capacitance of the transmission line.

The greater part of the transmission line inductance is cancelled by the series capacitor. The compensation current generator supplies a compensating current to the series capacitor, and, by varying the impressed voltage of that capacitor, it regulates the equivalent reactance of the transmission line and thus inhibits transmission line power oscillation.

In a transmission line, there is inter-line and line-to-earth floating capacitance. Thus, with a long-distance transmission line, a large reactive current will flow via that floating inductance. As this reactive current becomes larger, it will affect the current capacity of the transmission line and, ultimately, long-distance AC transmission will become impossible. The static var generator compensates the reactive current that flows in the floating capacitance of the transmission line and, in combination with the above-mentioned series capacitor and compensation current generator, is designed to stabilize the system and improve transmission capability. Thus, long-distance AC transmission is achieved.

Also, by compensating the reactive current flowing in the floating capacitance of the transmission line using a static var generator, the current on the transmission side and the current on the receiving side become approximately equal. Thus, the voltage drop of the transmission line inductance and the voltage drop of the series capacitor become exactly cancelling phases. As a result, the capacity of the compensation current generator can be decreased, and an economical system can be provided.

Furthermore, in order to achieve the above-mentioned objects, the present invention is an AC transmission system in which the series capacitor is provided with a circuit that bypasses that overcurrent when an overcurrent occurs due to an earth fault or the like in the transmission line.

When an earth fault or the like has occurred in a transmission line, the overcurrent becomes greater as the reactance of the transmission line becomes smaller. Therefore, the series capacitor will quickly short, and the transmission line reactance will become greater. For that reason, the overcurrent is detected, and if it reaches a certain level or above, the current is made to flow via the bypass circuit. By this means, increase of the overcurrent is inhibited, and the series capacitor and the compensation current generator are protected. As soon as the overcurrent has disappeared, the power oscillation is suppressed by opening the bypass circuit, thus causing long-distance AC transmission to shift to normal.

Furthermore, in order to achieve the above-mentioned objects, the present invention is an AC transmission system that is provided with:

a long-distance AC transmission line;

a main series capacitor that is connected in series with the transmission line to cancel the greater part of the transmission line inductance;

an auxiliary series capacitor that is connected in series with the main series capacitor;

a compensation current generator that is connected in parallel with the auxiliary series capacitor; and a static var generator that compensates the reactive current or the higher harmonic current flowing in the floating capacitance of the transmission line.

The greater part of the transmission line inductance is cancelled by the main series capacitor. The compensation current generator supplies a compensating current to the auxiliary series capacitor, and, by varying the impressed (applied) voltage of that capacitor, it regulates the equivalent reactance of the transmission line. The parallel compensation generator compensates the reactive current and the higher harmonic current flowing in the transmission line. In combination with the main series capacitor, the auxiliary series capacitor and the compensation current generator, it stabilizes the system and acts to improve transmission capability, thus achieving long-distance AC transmission.

Furthermore, in order to achieve the above-mentioned objects, the present invention is an AC transmission system in which the main series capacitor and the auxiliary series capacitor are provided with circuits that bypass those overcurrents when overcurrents occur due to earth faults or the like in the transmission lines.

When an earth fault or the like has occurred in a transmission line, the overcurrent becomes greater as the reactance of the transmission line becomes smaller. Therefore, the main series capacitor and the auxiliary series capacitor will quickly short, and the transmission line reactance will become greater. For that reason, the overcurrent is detected, and if it reaches a certain level or above, the current is made to flow via the bypass circuit. By this means, increase of the overcurrent is inhibited, and the main series capacitor or the auxiliary series capacitor and the compensation current generator are protected. As soon as the overcurrent has disappeared, first, power oscillation is suppressed by opening the bypass circuit of the auxiliary series capacitor. After that, long-distance AC transmission is caused to shift to normal by opening the main series capacitor bypass circuit.

Furthermore, in order to achieve the above-mentioned objects, the present invention is an AC transmission system in which main series capacitors or static var generators are split and installed in multiple locations in the transmission line.

The inductance and floating capacitance of a transmission line are by no means concentrated in one place. They exist as distributed constants. Thus, by splitting the main series capacitors or the static var generators and installing them in multiple dispersed locations, compensation can be even more detailed. Also, the voltage distribution of the transmission line becomes uniform and the withstand-voltage capability of the transmission equipment can be reduced.

Also, with a long-distance AC transmission line, the voltage phase at the receiving end shifts greatly in relation to the voltage phase at the transmitting end, due to the voltage drop caused by the transmission line inductance. With particularly long distance transmission, the phase shift sometimes exceeds 90° partway along the transmission line. When that is the case, the maximum transmissible power is determined at that point, and a series compensation generator installed at the receiving end will become unable to function. To solve the problem, main series capacitors are split and installed in multiple places in the transmission line. By this means, the phase difference will not exceed 90° in relation to the transmitting end voltage phase at all places in the transmission line, and long-distance AC transmission can be achieved.

Furthermore, in order to achieve the above-mentioned objects, the present invention is an AC transmission system in which the compensation current generator comprises means for detecting the amount of power fluctuation in the transmission line and suppressing that power fluctuation.

The amount of power fluctuation in the transmission line is detected, and the output current from the compensation current generator is regulated, thereby controlling the applied voltage to the series capacitors or auxiliary series capacitors, in such a manner that the power fluctuation is suppressed. By this means, it is possible to suppress torsional oscillations, including those in the generator, and resonance phenomena generated between the inductance of the transmission line and the series capacitors.

Furthermore, in order to achieve the above-mentioned objects, in the present invention, the compensation voltage generating means generates a voltage whose phase in terms of an electrical angle is displaced by almost 90° with respect to the current flowing in the AC transmission line, thereby generating a voltage drop due to the equivalent reactance. If the compensation voltage generating means generates a compensating voltage in such a manner that the voltage drop due to the inductance of the transmission line is cancelled out, then the equivalent reactance of the transmission line becomes substantially zero. Thereby, zero-reactance transmission becomes possible, and long-distance AC power transmission can be achieved.

Moreover, in addition to not cancelling out the reactance totally, by reducing the inductance, it is possible to raise the transmission capability of the transmission line dramatically. In particular, significant advantages can be expected in raising the transmission capability of minor transmission lines.

Since the capacity of the compensation voltage generating means is merely 10~20%, approximately, of the capacity of a power converter in a DC transmission system, and since existing transmission lines can be used, the system costs are extremely low.

In the present invention, the compensation voltage generating means generates a voltage whose phase in terms of an electrical angle is displaced by almost 90° with respect to the current flowing in the AC transmission line, thereby generating a voltage drop due to the equivalent reactance. If the compensation voltage generating means generates a compensating voltage in such a manner that the voltage drop due to the inductance of the transmission line is cancelled out, then the equivalent reactance of the transmission line becomes substantially zero. Thereby, zero-reactance transmission becomes possible, and long-distance AC power transmission can be achieved.

Moreover, in addition to not cancelling out the reactance totally, by reducing the inductance, it is possible to raise the transmission capability of the transmission line dramatically. In particular, significant advantages can be expected in raising the transmission capability of minor transmission lines.

Moreover, if, for some reason, electrical oscillation phenomena occur in the transmission line, these oscillation phenomena can be suppressed by outputting a compensating voltage from the compensation voltage generating means.

Since the capacity of the compensation voltage generating means is merely 10~20%, approximately, of the capacity of a power converter in a DC transmission system, and since existing transmission lines can be used, the system costs are extremely low.

Furthermore, in order to achieve the above-mentioned objects, in the present invention, it is possible to cancel out the greater part of the inductance in a transmission line by connecting capacitors to the transmission line. In this case, resonance phenomena may occur between the inductance of the transmission line and the capacitors. The compensation voltage generating means generates a compensating voltage in order to suppress these resonance phenomena. For example, if a power fluctuation has occurred at the power station (transmitting end) or at the substation or load (receiving end), then the compensation voltage generating means is able to generate a compensating voltage in order to suppress any power oscillation.

The greater part of the inductance of the transmission line is cancelled out by the capacitors, and furthermore, the system can be operated at an overall equivalent reactance of zero using the compensation voltage generating means. Consequently, long-distance AC power transmission becomes possible, and the transmission capability of minor transmission lines can be improved dramatically. Moreover, the capacity of the compensation voltage generating means is small, so it is possible to provide an AC transmission system.

Furthermore, in order to achieve the above-mentioned objects, in the present invention, it is also possible to cancel out the greater part of the inductance of a transmission line by connecting capacitors to the transmission line. In this case, resonance phenomena may occur between the inductance of the transmission line and the capacitors. The compensation voltage generating means generates a compensating voltage in order to suppress these resonance phenomena. For example, if a power fluctuation has occurred at the power station (transmitting end) or at the substation or load (receiving end), then the compensation voltage generating means is able to generate a compensating voltage in order to suppress power oscillation. Moreover, since the capacitance of the capacitors in question can be changed in step fashion, it is also possible to control slow power oscillations by changing the capacitance of the capacitors in steps.

Thus, the greater part of the inductance of the transmission line or distribution line can be cancelled out using series capacitors, and furthermore, the system can be operated at an overall equivalent reactance of zero using the compensation voltage generating means. Consequently, long-distance AC power transmission becomes possible, and the transmission capability of minor transmission lines can be improved dramatically. Moreover, the capacity of the compensation voltage generating means is small, so it is possible to provide an AC transmission system.

Furthermore, in order to achieve the above-mentioned objects, in the present invention, it is also possible to cancel out the greater part of the inductance of a transmission line by connecting capacitors to the transmission line. In this case, resonance phenomena may occur between the inductance of the transmission line and the capacitors. The compensation voltage generating means generates a compensating voltage in order to suppress these resonance phenomena. For example, if a power fluctuation has occurred at the power station (transmitting end) or at the substation or load (receiving end), then the compensation voltage generating means is able to generate a compensating voltage in order to suppress power oscillation.

Since the capacitors, which are split and installed in multiple locations on the transmission line, compensate for the reactance of the transmission line from one capacitor to the next capacitor, the capacitors have small capacities. Moreover, since voltage drops can be compensated for in a detailed fashion by installing the split capacitors in multiple locations, it is possible to achieve a uniform voltage distribution in the transmission line.

Thus, the greater part of the inductance of the transmission line can be cancelled out using capacitors, and furthermore, the system can be operated at an overall equivalent reactance of zero using the compensation voltage generating means. Consequently, long-distance AC power transmission becomes possible, and the transmission capability of minor transmission lines can be improved dramatically. Moreover, the capacity of the compensation voltage generating means is small, so it is possible to provide an AC transmission system.

Furthermore, in order to achieve the above-mentioned objects, in the present invention, it is also possible to cancel out the greater part of the inductance of a transmission line by connecting capacitors. In this case, resonance phenomena may occur between the inductance of the transmission line and the capacitors. The compensation voltage generating means generates a compensating voltage in order to suppress these resonance phenomena. For example, if a power fluctuation has occurred at the power station (transmitting end) or at the substation or load (receiving end), then the compensation voltage generating means is able to generate a compensating voltage in order to suppress power oscillation.

If an overcurrent is generated in the transmission line system, then the inductance of the transmission line has the effect of easing changes in current, but in cases where capacitors are connected to the system in series, this effect is reduced and changes in current can be extreme. By providing bypass circuits that short the two ends of the capacitors, the equivalent inductance of the transmission line is increased, in such a manner that no extreme changes in current are produced. Moreover, this also has the action of protecting the capacitors from overvoltages, and the like.

Thus, the greater part of the inductance of the transmission line can be cancelled out by means of capacitors, and furthermore, the system can be operated at an overall equivalent reactance of zero by means of the compensation voltage generating means. Consequently, long-distance AC power transmission becomes possible, and the transmission capability of minor transmission lines can be improved dramatically. Moreover, the capacity of the compensation voltage generating means is small, so it is possible to provide an AC transmission system.

Furthermore, in order to achieve the above-mentioned objects, in the present invention, it is also possible to cancel out the greater part of the inductance of a transmission line by connecting capacitors to the transmission line. In this case, resonance phenomena may occur between the inductance of the transmission line and the capacitors. The compensation voltage generating means generates a compensating voltage in order to suppress these resonance phenomena. For example, if a power fluctuation has occurred at the power station (transmitting end) or at the substation or load (receiving end), then the compensation voltage generating means is able to generate a compensating voltage in order to suppress power oscillation.

If an overcurrent is generated in the transmission line system, the compensation voltage generating means is isolated from the system by a shorting bypass circuit, which has the effect of protecting the compensation voltage generating means.

Thus, the greater part of the inductance of the transmission line can be cancelled out by means of capacitors, and furthermore, the system can be operated at an overall equivalent reactance of zero using the compensation voltage generating means. Consequently, long-distance AC power transmission becomes possible, and the transmission capability of minor transmission lines can be improved dramatically. Moreover, the capacity of the compensation voltage generating means is small, so it is possible to provide an AC transmission system.

Furthermore, in order to achieve the above-mentioned objects, in the present invention, the equivalent reactance of a transmission line becomes substantially zero if the output current of a compensation current generating means is controlled such that voltages cancelling out voltage drops due to the inductance of the transmission line are generated by capacitors connected in parallel thereto. By this means, zero-reactance transmission becomes possible, and hence long-distance AC power transmission can be achieved.

Moreover, even if the reactance is not totally cancelled, by reducing the inductance, it is possible to raise the transmission capability of the transmission line dramatically. In particular, significant advantages can be expected in raising the transmission capability of minor transmission lines.

Furthermore, in order to achieve the above-mentioned objects, in the present invention, the equivalent reactance of a transmission line becomes substantially zero if the output current of a compensation current generating means is controlled such that voltages cancelling out voltage drops due to the inductance of the transmission line are generated by capacitors connected in parallel thereto. By this means, zero-reactance transmission becomes possible, and hence long-distance AC power transmission can be achieved.

Furthermore, even if the reactance is not totally cancelled, by reducing the inductance, it is possible to raise the transmission capability of the transmission line dramatically. In particular, significant advantages can be expected in raising the transmission capability of minor transmission lines.

Moreover, if, for some reason, electrical oscillation phenomena occur in the transmission line, these oscillation phenomena can be suppressed by outputting a compensating current from the compensation current generating means.

Furthermore, in order to achieve the above-mentioned objects, in the present invention, it is possible to cancel out the greater part of the inductance of a transmission line by connecting first capacitors. In this case, resonance phenomena may be generated between the inductance of the transmission line and the capacitors. Moreover, power fluctuations may also occur at the power station (transmitting end) or at the substation or load (receiving end). By controlling the output current of the compensation current generating means, the voltage applied to the above-mentioned second capacitors is regulated and hence power oscillation in the system is suppressed and the system can be operated at zero equivalent reactance.

Consequently, long-distance AC power transmission becomes possible and the transmission capability of minor transmission lines can be improved. Furthermore, the capacity of the compensation current generating means is small, so it is possible to provide an AC transmission system.

Furthermore, in order to achieve the above-mentioned objects, in the present invention, it is possible to cancel out the greater part of the inductance of a transmission line by connecting first capacitors. In this case, resonance phenomena may be generated between the inductance of the transmission line and the capacitors. Moreover, power fluctuations may also occur at the power station (transmitting end) or at the substation or load side (receiving end). By controlling the output current of the compensation current generating means, the voltage applied to second capacitors is regulated and hence power oscillation in the system is suppressed and the system can be operated at zero equivalent reactance.

Also, since the capacitance of the first capacitors can be changed in step fashion, it is also possible to control slow power oscillations by changing the capacitance of the first capacitors in steps.

Consequently, long-distance AC power transmission becomes possible and the transmission capability of minor transmission lines can be improved. Furthermore, the capacity of the compensation current generating means is small, so it is possible to provide an AC transmission system.

Furthermore, in order to achieve the above-mentioned objects, in the present invention, it is possible to cancel out the greater part of the inductance of a transmission line by connecting first capacitors. In this case, resonance phenomena may be generated between the inductance of the transmission line and the capacitors. Moreover, power fluctuations may also occur at the power station (transmitting end) or at the substation or load side (receiving end). By controlling the output current of the compensation current generating means, the voltage applied to second capacitors is regulated and hence power oscillation in the system is suppressed and the system can be operated at zero equivalent reactance.

Since the first capacitors, which are split and installed in multiple locations on the transmission line, compensate for the reactance of the transmission line from one capacitor to the next capacitor, they have small capacitances. Moreover, since voltage drops can be compensated in a detailed fashion by installing the split capacitors in multiple locations, it is possible to achieve a uniform voltage distribution in the transmission line.

Consequently, long-distance AC power transmission becomes possible and the transmission capability of minor transmission lines can be improved Furthermore, the capacity of the compensation current generating means is small, so it is possible to provide an AC transmission system.

Furthermore, in order to achieve the above-mentioned objects, in the present invention, it is possible to cancel out the greater part of the inductance of a transmission line by connecting first capacitors. In this case, resonance phenomena may be generated between the inductance of the transmission line and the capacitors. Moreover, power fluctuations may also occur at the power station (transmitting end) or at the substation or load side (receiving end). By controlling the output current of the compensation current generating means, the voltage applied to the above-mentioned second capacitors is regulated and hence power oscillation in the system is suppressed, and the system can be operated at zero equivalent reactance.

If an overcurrent is generated in the transmission line system, then the inductance of the transmission line has the effect of easing the change in current, but in cases where capacitors are connected to the system in series, this effect is reduced and changes in current can be extreme. By providing bypass circuits that short the two ends of the capacitors, the equivalent inductance of the transmission line is increased in such a manner that no extreme changes in current are produced. Moreover, this also has the action of protecting the capacitors from overvoltages, and the like.

Consequently, long-distance AC power transmission becomes possible and the transmission capability of minor transmission lines can be improved. Furthermore, the capacity of the compensation current generating means is small, so it is possible to provide an AC transmission system.

Furthermore, in order to achieve the above-mentioned objects, in the present invention, it is possible to cancel out the greater part of the inductance of a transmission line by connecting first capacitors. In this case, resonance phenomena may be generated between the inductance of the transmission line and the capacitors. Moreover, power fluctuations may also occur at the power station (transmitting end) or at the substation or load side (receiving end). By controlling the output current of the compensation current generating means, the voltage applied to the second capacitors is regulated and hence power oscillation in the system is suppressed, and the system can be operated at zero equivalent reactance.

If an overcurrent is generated in the transmission line system, the compensation current generating means is isolated from the system by a shorting bypass circuit, which has the effect of protecting the compensation current generating means.

Consequently, long-distance AC power transmission becomes possible and the transmission capability of minor transmission lines can be improved. Furthermore, the capacity of the compensation current generating means is small, so it is possible to provide an AC transmission system.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
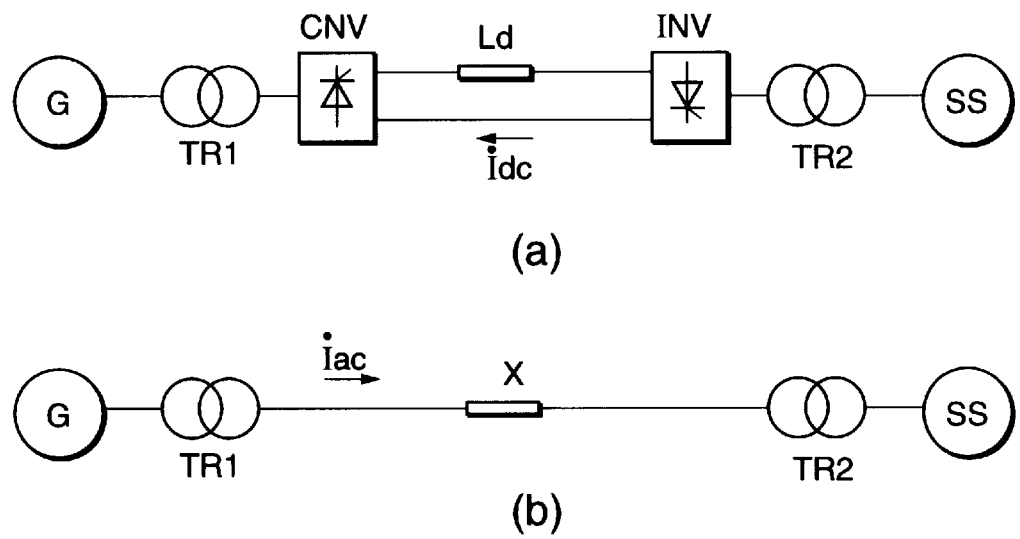
FIG. 1 is block diagrams showing a DC power transmission system and an AC power transmission system according to the prior art.
Figure 2:
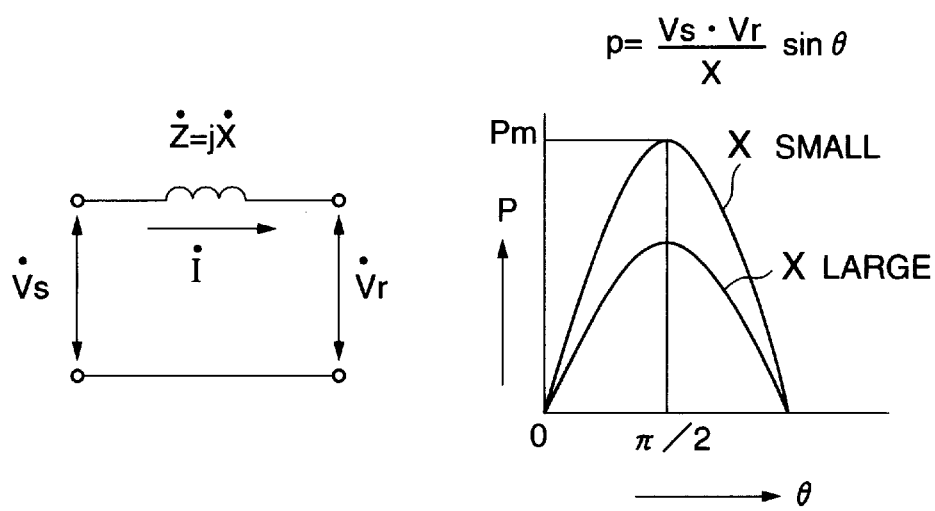
FIG. 2 shows a characteristic graph of a prior art AC power transmission system.

Referring now to the drawings, wherein like reference numerals designate identical or corresponding parts throughout the several views, and more particularly to FIG. 3 thereof, one embodiment of the present invention will be described.

Figure 3:
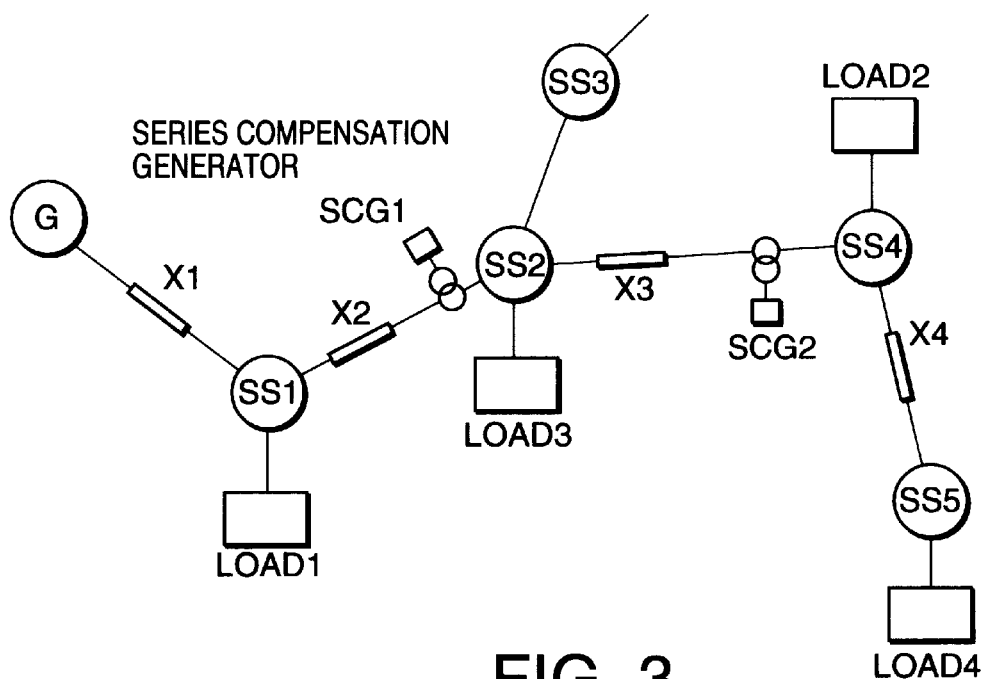
FIG. 3 is a block diagram showing a first embodiment of an AC long-distance power transmission system according to the present invention.

FIG. 3 is a block diagram showing a first embodiment of an AC power transmission system according to the present invention.

In the diagram, G is a generator, SS1~SS5 are substations, LOAD1~LOAD4 are loads, SCG1 and SCG2 are series compensation generators, and X1~X4 are transmission line reactance values.

The electrical power generated by generator G is transmitted over a long distance, via multiple substations SS1→SS2→SS4→SS5, to a load, LOAD4, which is a bulk consumer.

Series compensation generator SCG1 generates a compensating voltage which cancels out reactance X2 of the transmission line, thereby reducing the equivalent reactance and hence improving the transmission capability in that section. Similarly, series compensation generator SCG2 generates a compensating voltage which cancels out reactance X3 of the transmission line, thereby reducing the equivalent reactance and hence improving the transmission capability in that section.

Moreover, if power oscillation occurs in the transmission line, the series compensation generator generates a voltage in such a manner that it controls this oscillation, and hence power oscillations are suppressed.

Figure 4:
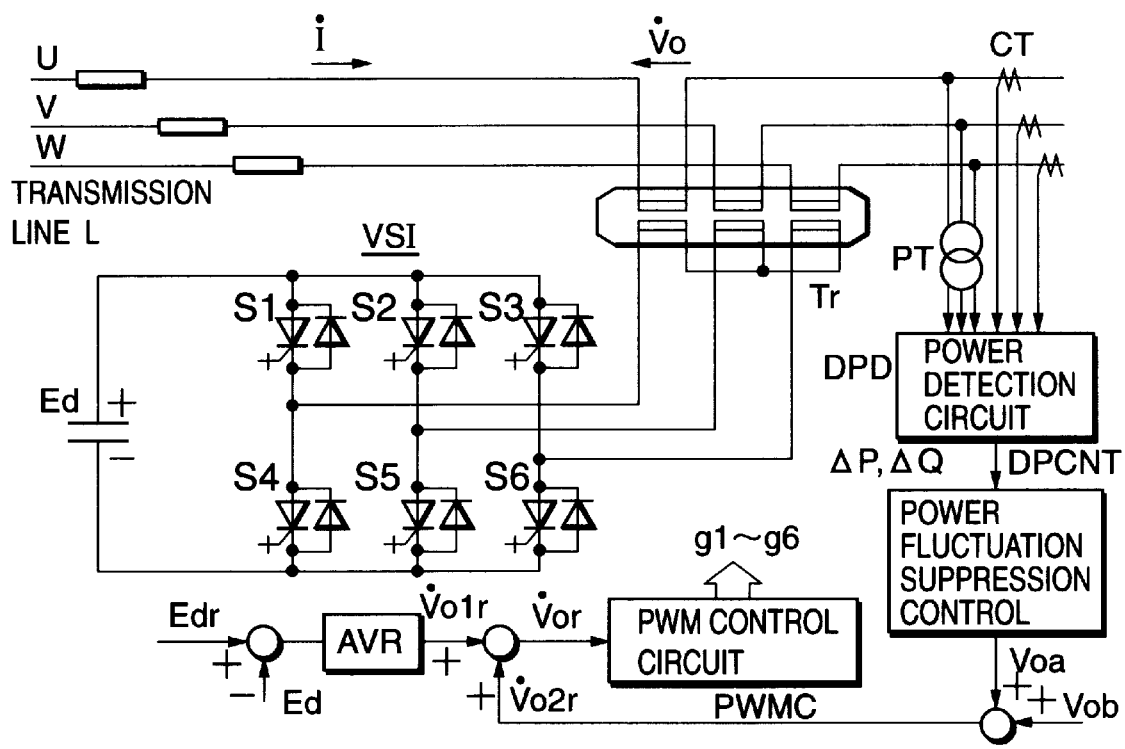
FIG. 4 is a block diagram showing an embodiment of a series compensation generator in the system in FIG. 3.

FIG. 4 is a block diagram showing an embodiment of a series compensation generator in the system in FIG.3;

In the diagram: UVW is a three-phase AC transmission line; L is the inductance of the transmission line; Tr is a series transformer; VSI is a voltage source PWM control inverter; Ed is a DC voltage source; CT is a current detector; PT is a voltage detector; DPD is a power detector; DPCNT is a power fluctuation suppression control circuit; AVR is a voltage control circuit; and PWMC is a pulse width modulation (PWM) control circuit.

The primary side of series transformer Tr is connected in series to each of the phases of the transmission line, and the secondary side of transformer Tr is connected to voltage source inverter VSI for pulse-width modulation control (PWM control).

Voltage source inverter VSI is wired to a three-phase bridge, and an AC voltage Vo proportional to voltage command value Vor is generated by PWM control. S1~S6 are self-turn-off devices, such as GTOs, and a diode is connected inversely in parallel to each of these devices. In the steady state, compensating voltage Vo generates a component that is orthogonal to current I flowing in the transmission line, thereby regulating the equivalent reactance of the transmission line. Vob is a command value (a reference value), and by regulating this value, it is possible to regulate reactance X of the transmission line in such a manner that it becomes substantially zero.

On the other hand, if power oscillation occurs in the transmission line, then suppression control is carried out in the following manner.

Namely, the three-phase AC voltage and current of the transmission line is detected by current detector CT and voltage detector PT, and active power P and reactive power Q are determined using these values. If there is power oscillation, then these P and Q values will change, and hence the corresponding amounts of change $\Delta P$ and $\Delta Q$ are derived and supplied to the subsequent power fluctuation suppression control circuit DPCNT. Compensating voltage Voq for the component that is orthogonal to current I flowing in the transmission line is regulated in accordance with change in active power $\Delta P$, and furthermore, compensating voltage Vop (omitted from the diagram) for the component having the same phase as (or the component having the opposite phase to) current I is regulated in accordance with change in reactive power $\Delta Q$. In the diagram, Voa indicates the combined compensating voltage command. When power oscillation occurs, compensating voltage Voa changes in response to $\Delta P$ and $\Delta Q$, thereby suppressing the power oscillation.

DC voltage source Ed may be provided as a separate power source, but here, a DC voltage source is already created integrally. In other words, a DC smoothing capacitor is provided as the DC voltage source, and voltage Ed thereof is controlled to a uniform value. Firstly, DC command value Edr and DC voltage detection value Ed are compared, and the deviation between them is amplified by DC voltage control circuit AVR. DC voltage Ed is then controlled by means of AVR output signal Vo1 (omitted from the diagram) applying a compensating voltage command for the same-phase component (or opposite-phase component) with respect to current I flowing in the transmission line.

Figure 5:
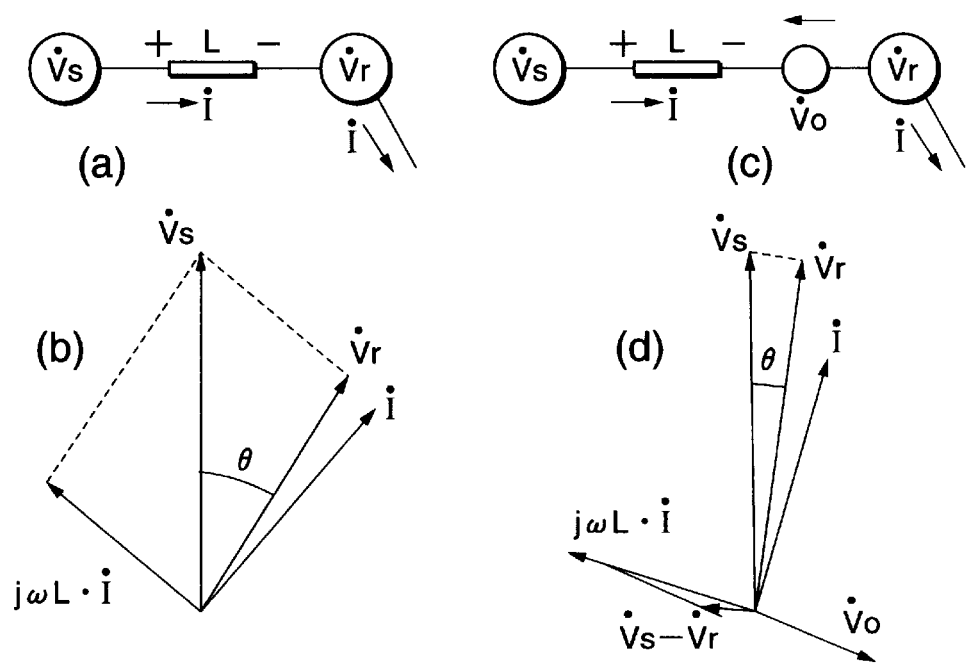
FIG. 5 is a voltage/current vector diagram to illustrate the operation of the system in FIG. 3.

Below, the respective operations involved are described using voltage and current vector diagrams for the AC side. FIG. 5 shows transmission line equivalent circuit diagrams and voltage/current vector diagrams for the purpose of describing the steady state operation of the system in FIG. 3.(a) is an equivalent circuit of a transmission line having no series compensation generator; (b) is a voltage/current vector diagram of the equivalent circuit in (a); (c) is an equivalent circuit of a case where a series compensation generator is inserted into the transmission line; and (d) is a voltage/current vector diagram of the equivalent circuit in (c).

In the diagram, Vs is the transmitting-side voltage; Vr is the receiving-side voltage; L is the inductance of the transmission line; I is the current; Vo is the compensating voltage; and ω is the angular frequency of the power source. The resistance of the transmission line is sufficiently small to be ignored.

Essentially, since Es, Er, Vs, Vr, I, Vo, and the like, are vector quantities, then vector notation such as Es, Er, Vs, Vr, I, Vo, and the like, should be almost used.

FIG. 5(b) is a vector diagram of a case where no series compensation generator is provided, and here, when current I is flowing, this produces a voltage drop of jωL·I and causes phase difference θ between transmission voltages Vs and Vr to increase. If current I becomes larger, then this phase difference θ will also increase, and if it exceeds 90°, it becomes impossible to transmit active power P above this level. In a generator, this means that the synchronising speed is not maintained and step-out occurs. In a long-distance transmission line, inductance L is large and so this limit is quickly reached.

On the other hand, FIG. 5(d) shows a vector diagram of a case where a series compensation generator according to the present invention is introduced, and here, voltage drop jωL·I due to inductance L of the transmission line is cancelled out by generating compensating voltage Vo for a component substantially orthogonal to current I flowing in the transmission line, thereby making it possible to reduce the equivalent reactance of the transmission line. Consequently, phase difference θ between transmission voltage Vs and reception voltage Vr is restricted, and hence the transmission capability of the line can be increased. Assuming that Vo=−jωL·I, then transmission at equivalent reactance X=0 becomes possible. In this case, it is possible to achieve matching values for Vr and Vs. In zero-reactance transmission, no phase difference θ is produced between Vs and Vr, even if current I increases, thus yielding a system that is resistant to power oscillations. However, in the series compensation generator in FIG. 4, it is necessary to increase compensating voltage Vo in proportion to current I of the transmission line.

Figure 6:
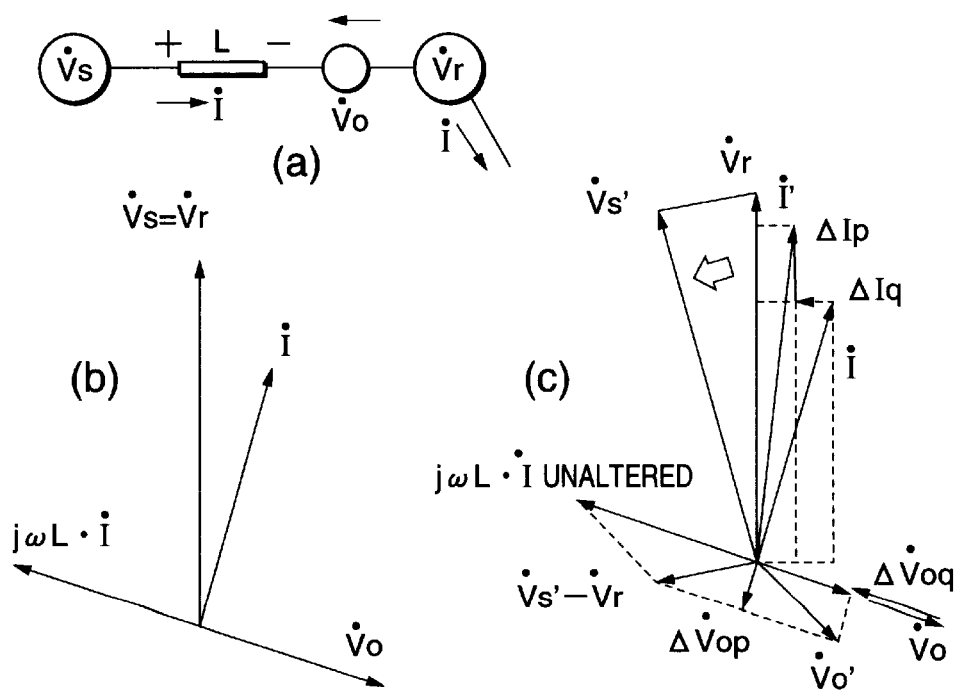
FIG. 6 is a voltage/current vector diagram to illustrate the power oscillation suppressing action of the system in FIG. 3.

FIG. 6 shows equivalent circuits of a transmission line and voltage/current vector diagrams for the purpose of describing the power oscillation suppressing operation of the system in FIG. 3. The reference numerals in this diagram are based on those in FIG. 5.

FIG. 6(b) is a voltage/current vector diagram of a steady state, wherein a compensating voltage of Vo=−jωL·I is generated, and equivalent reactance X is substantially zero.

FIG. 6(c) is an operational vector diagram of a case where, for some reason, the voltage phase on the transmission side has changed and a power oscillation has occurred. In other words, in a case where transmission voltage Vs has changed to Vs', it is assumed that a voltage differential of Vs'−Vr arises, and current I increases to I'. When the power fluctuation is detected at the receiving side, current component ΔIp in the same phase as Vr is taken as the increase in the active current component, and in order to suppress this, compensating voltage ΔVoq that is orthogonal to current I is generated in the opposite direction to original voltage Vo. Furthermore, current component ΔIq that is orthogonal to Vr is taken as the increase in the reactive current component, and in order to suppress this, compensating voltage ΔVop of opposite phase to current I is generated. Thereby, compensating voltage Vo changes to Vo'. Consequently, voltage jωL·I applied to transmission line L becomes voltage differential Vs'−Vr−Vo', which is the same as the previous value, and current I returns to the original current value. In other words, it is possible to suppress power oscillations by regulating compensating voltage Vo in accordance with changes in Vs (or Vr).

Figure 7:
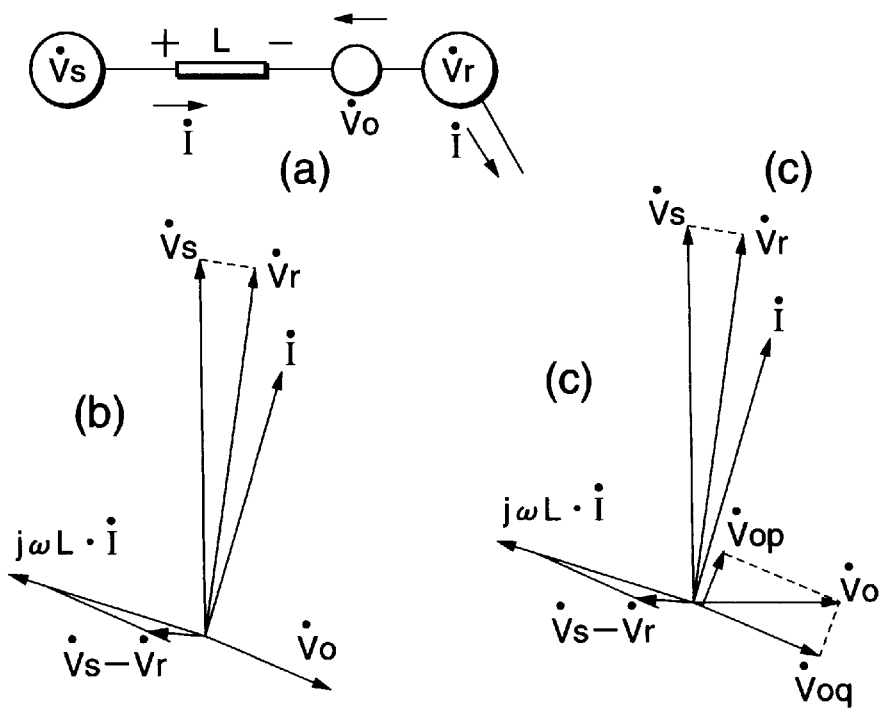
FIG. 7 is a voltage/current vector diagram to illustrate the control operation of the series compensation generator in FIG. 4.

FIG. 7 shows an equivalent circuit of a transmission line and voltage/current vector diagrams for the purpose of describing the control operation of the series compensation generator in FIG. 4. The reference numerals in this diagram are based on those in FIG. 5.

FIG. 7(b) is a voltage/current vector diagram of a certain steady state. In the device in FIG. 4, if DC voltage Ed is smaller than command value Edr, then deviation E is a positive value and Vo1r is increased. FIG. 7(c) is a vector diagram illustrating this case, wherein compensating voltage Vop for the component of the same phase as current I is generated by command value Vo1r. Consequently, active power that is proportional to I×Vop is supplied to voltage source inverter VSI, thereby raising DC voltage Ed. If, conversely, Edr<Ed, then the direction of Vop is reversed and active power is transmitted from inverter VSI into the transmission line, thereby reducing DC voltage Ed. In this way, it is possible to guarantee the DC voltage source of the voltage source inverter, in an integral fashion. Naturally, a voltage source inverter may also be constituted by introducing a separate power source.

Figure 8:
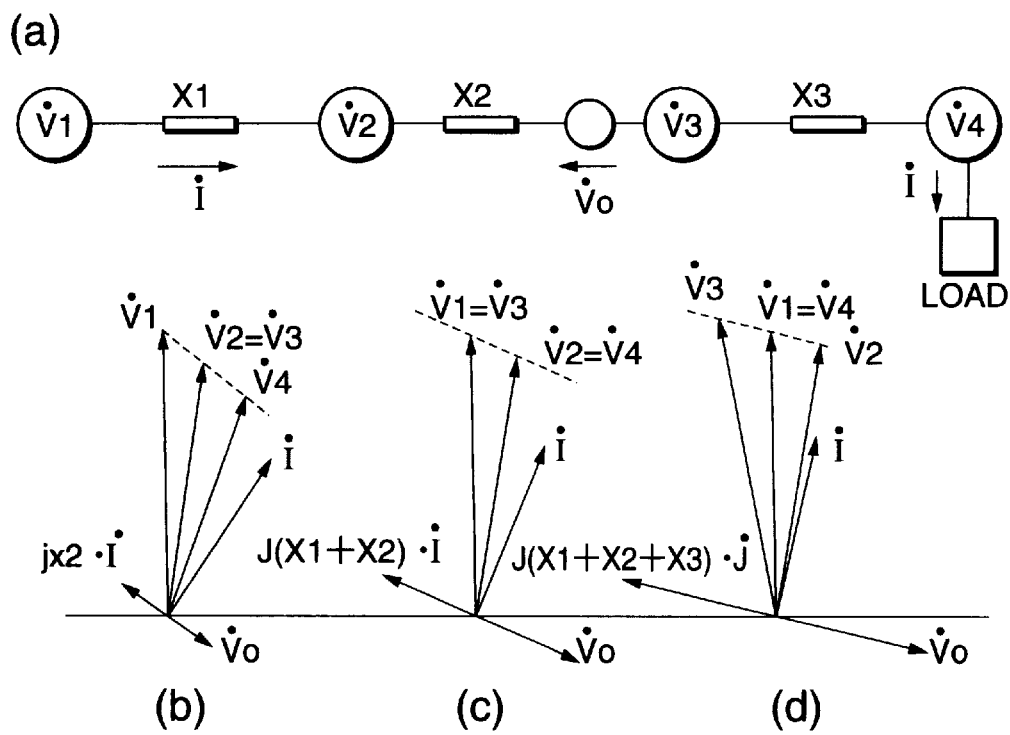
FIG. 8 is a block diagram showing a second embodiment of an AC long-distance power transmission system according to the present invention.

FIG. 8 shows a block diagram and voltage/current vector diagrams illustrating a second embodiment of an AC long-distance power transmission system according to the present invention. In the diagram, LOAD is a load, V1~V4 are voltages at different substations, X1~X3 are the reactance values of transmission lines, Vo is the voltage generated by a series compensation generator, and I is the transmission current.

In the vector diagram in FIG. 8(b), the series compensation generator generates compensating voltage Vo such that voltage drop jX2·I due to reactance X2 is cancelled out. Therefore, V2 and V3 become equal, and when current I flows, V2=V3 lags slightly behind voltage V1, and V4 lags slightly further behind.

In the vector diagram in FIG.8(c), V1 and V3 become equal by means of the series compensation generator generating compensating voltage Vo=−j(X1+X2). In this case, if X1=X3, then V2=V4, forming a vector slightly lagging behind V1=V3, and thereby mitigating the voltage variations in the four substations.

Moreover, in the vector diagram in FIG. 8(d), the compensating voltage is taken as Vo=−(X1+X2+X3)·I, and hence V1 and V4 can be made equal vectors. In this case, the V3 vector is slightly leading, and the V2 voltage vector lags slightly behind V1=V4.

In this way, it is possible to compensate for reactance in adjoining transmission lines, and hence the transmission capability can be raised by providing the minimum required number of series compensation generators.

Figure 9:
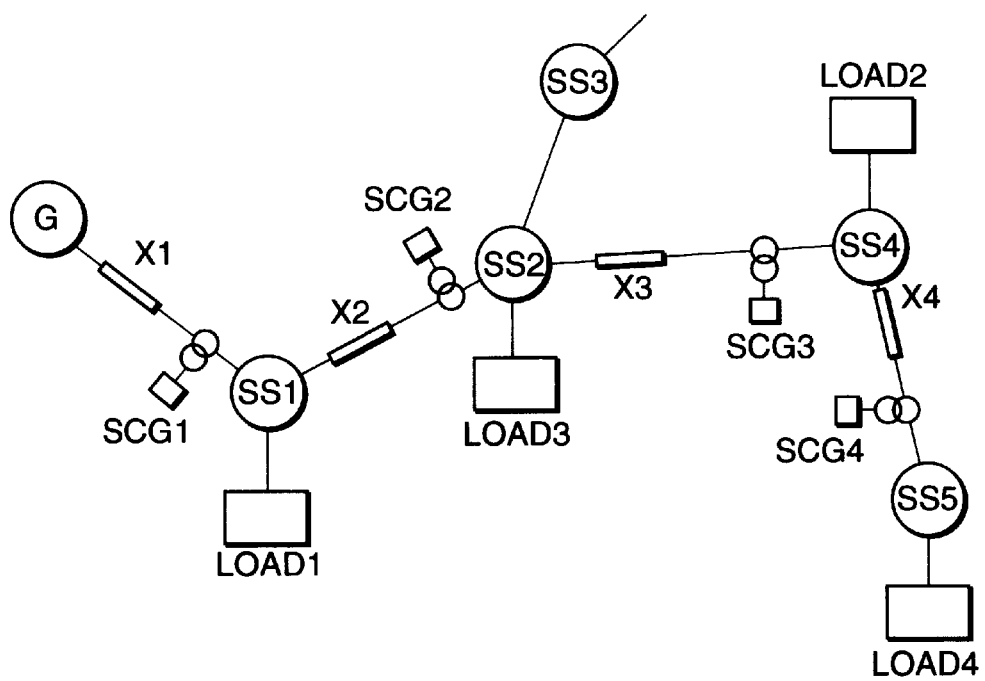
FIG. 9 is a block diagram showing a third embodiment of an AC long-distance power transmission system according to the present invention.

FIG. 9 is a block diagram showing a third embodiment of an AC long-distance power transmission system according to the present invention.

In the diagram, G is a generator, SS1~SS5 are substations, LOAD1~LOAD4 are loads, SCG1~SCG4 are series compensation generators, and X1~X4 are the reactance values of transmission lines.

If long-distance AC power transmission is being carried out through multiple substations, then series compensation generators SCG1~SCG4 are provided on every transmission line corresponding to the transmission path. By this means, the equivalent reactance of the transmission path can be reduced to substantially zero, reactance effects which have conventionally presented problems can be eliminated completely, and power transmission that is equivalent to DC transmission can be achieved. Moreover, the capacities of the series compensation generators provided are merely 10%, approximately, of the capacities of converters used in DC power transmission, and hence an economical system can be achieved.

Moreover, in DC power transmission, it is extremely difficult to extract power midway along a transmission line, but in the AC long-distance power transmission system according to the present invention, power can be extracted freely from any substation in the transmission path, or alternatively, power from another generator can be received freely at any substation.

Moreover, in zero-reactance power transmission, the transmission capability is dramatically improved and a system that is resistant to external power disturbances can be achieved; even if external disturbances enter into the system, causing power oscillations, those oscillations can be suppressed rapidly.

Figure 10:
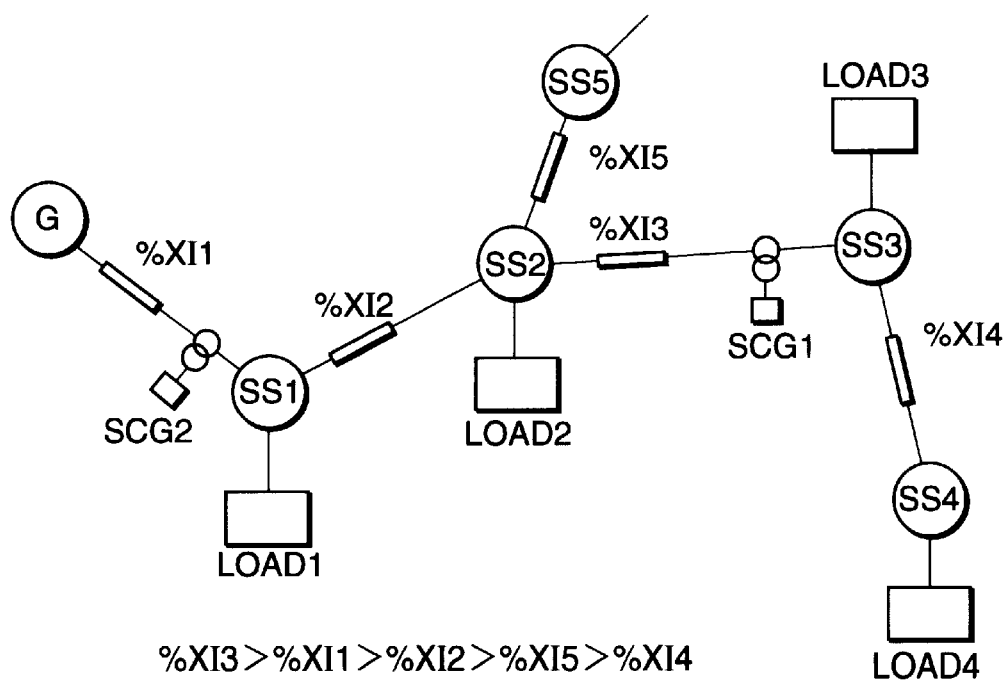
FIG. 10 is a block diagram showing a fourth embodiment of an AC long-distance power transmission system according to the present invention.

FIG. 10 is a block diagram showing a fourth embodiment of an AC long-distance power transmission system according to the present invention.

In the diagram, G is a generator, SS1~SS5 are substations, LOAD1~LOAD4 are loads, SCG1~SCG2 are series compensation generators, and % XI1~% XI5 are the percentage reactance values of transmission lines.

In the drawing, in a case where the relationship between the percentage reactance values of each transmission line is such that % XI3>% X I1>% XI2>% XI5>% XI4, firstly, series compensation generator SCG1 is installed such that it compensates for % XI3, and secondly, series compensation generator SCG2 is installed such that it compensates for % XI1. In cases involving long-distance power transmission from generator G to bulk consumer LOAD4, the voltage drop due to reactance in the whole system is reduced and the transmission capability is significantly increased, by compensating firstly for the sections of the transmission path having a high percentage reactance. Moreover, it is also possible thereby to achieve a maximum effect using a minimum requirement of compensation generators.

Figure 11:
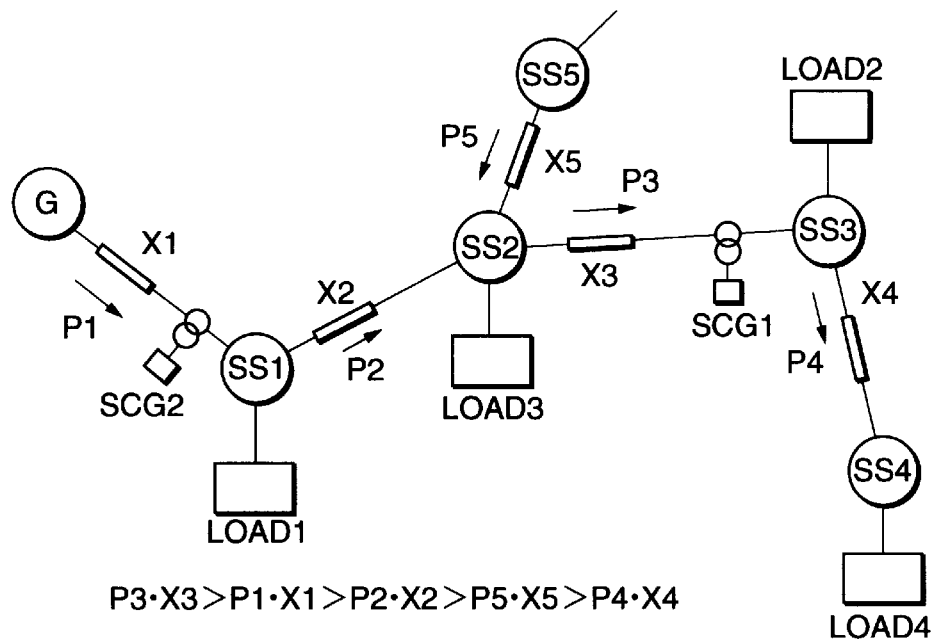
FIG. 11 is a block diagram showing a fifth embodiment of an AC long-distance power transmission system according to the present invention.

FIG. 11 is a block diagram showing a fifth embodiment of an AC long-distance power transmission system according to the present invention. In the diagram, G is a generator, SS1~SS5 are substations, LOAD1~LOAD4 are loads, SCG1 and SCG2 are series compensation generators, X1~X5 are the reactance values of transmission lines, and P1~P5 are the power values flowing in each transmission line.

In the case of long-distance power transmission from generator G to bulk consumer LOAD4, the product (multiplication) of the reactance of each transmission line and the power flowing in that line is found, and the lines producing high values are selected for installation of a series compensation generator. In FIG. 9, in a case where P3·X3>P1·X1>P2·X2>P5·X5>P4·X4, firstly, series compensation generator SCG1 is installed in order to reduce transmission line reactance X3, and secondly, series compensation generator SCG2 is installed in order to reduce transmission line reactance X1. Accordingly, the transmission capability of transmission lines having high power flow P and high transmission line reactance X is increased, and hence the transmission capability of the whole transmission path can be improved significantly. Moreover, the minimum required number of series compensation generators is used, thereby allowing economical AC long-distance power transmission to be achieved.

Figure 12:
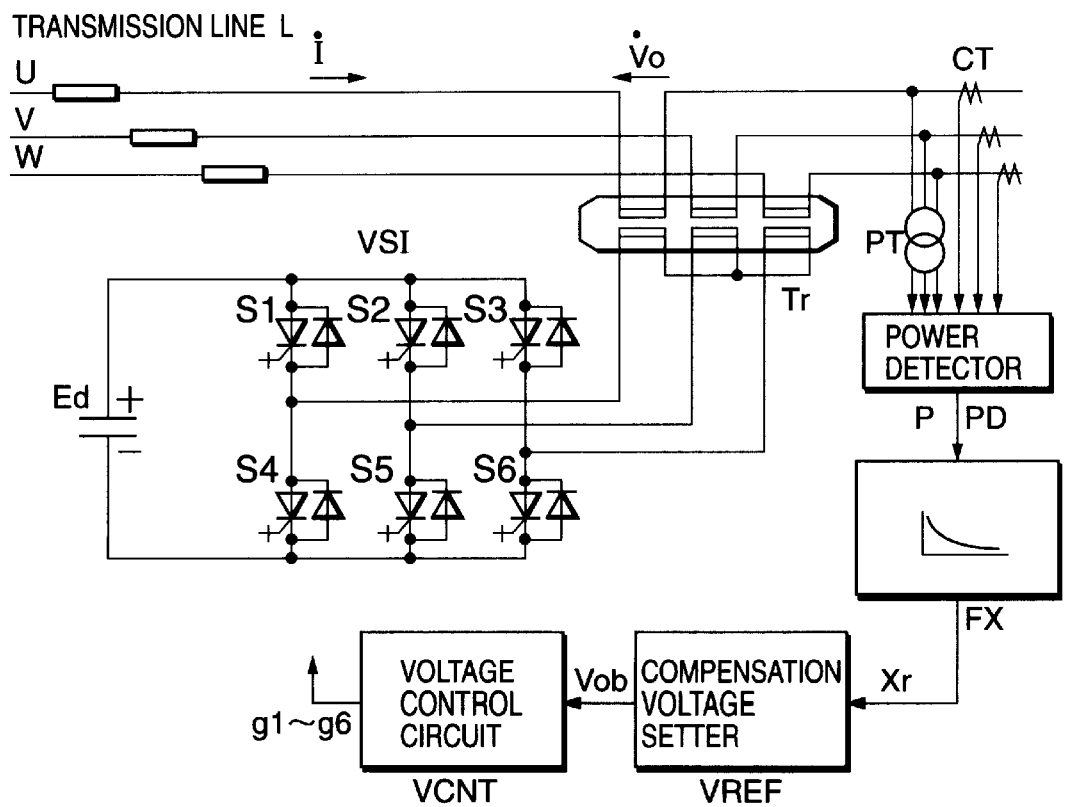
FIG. 12 is a block diagram showing an embodiment of a control system for the series compensation generator according to the present invention.

FIG. 12 is a block diagram showing an embodiment of a control system for a series compensation generator according to the present invention.

In the diagram, UVW is a three-phase AC power transmission line, L is the inductance of the transmission line, Tr is a series transformer, VSI is a voltage source PWM control inverter, Ed is a DC voltage source, CT is a current detector, PT is a voltage detector, PD is a power detector, FX is a function generator, VREF is a compensating voltage setting device, and VCNT is a voltage control circuit.

The primary side of series transformer Tr is connected in series to each phase of the transmission line respectively, and the secondary side thereof is connected to voltage source inverter VSI for pulse width modulation control (PWM control).

Voltage source inverter VSI is connected to a three-phase bridge, and generates AC voltage Vo proportional to command value Vob, in accordance with voltage control circuit VCNT. S1~S6 are self-turn-off devices, such as GTOs, and a diode is connected inversely in parallel to each of these devices. In a steady state, compensating voltage Vo generates a component that is orthogonal to current I flowing in the transmission line, thereby regulating the equivalent reactance of the transmission line.

Active power P is determined using the voltage and current values detected by voltage detector PT and current detector CT. Function generator FX supplies the relationship between active power P and equivalent reactance setting value Xr for the transmission line, and it has, for example, the characteristics shown in FIG. 13.

Figure 13:
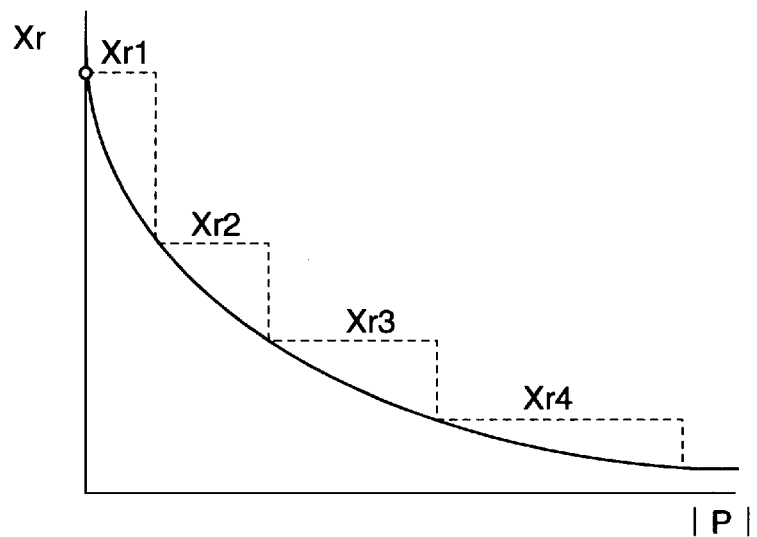
FIG. 13 is a graph to illustrate the operation of the system in FIG. 12.

In FIG. 13, equivalent reactance command Xr is changed as indicated by the solid line with respect to the absolute value of active power P. In other words, when active power P is small, then equivalent reactance command Xr is set to a large value, and this set value Xr is reduced as active power P increases.

Compensating voltage setting device VREF determines command value Vob of compensating voltage Vo output from the series compensation generator, in accordance with above-mentioned equivalent reactance setting Xr. For example, if the current is I and the reactance of the transmission line is XL, then voltage command value Vob will be Vob=(XL−Xr)·I. Consequently, the equivalent reactance of the transmission line after compensation will be $$Xr = XL - Vob/I$$

which can be matched to the Xr set value supplied by function generator FX.

Thus, by changing equivalent reactance Xr of a transmission line in accordance with active power P flowing in the transmission line, it is possible to create a transmission line which is not affected by power tides. Consequently, it is possible to maintain substantially uniform values for the size of the transmitting-side voltage and the receiving-side voltage, and the phase difference between them, regardless of the magnitude of tidal currents, and hence a stable system voltage can be obtained.

Power command value Vob is the same as command value Vob shown in FIG. 4, and it is added to power oscillation suppressing signal Voa, and the like, to give actual compensating voltage command value Vor. In FIG. 13, the broken line indicates stepped changes in equivalent reactance setting Xr in response to active power P, which allow the number of settings for Xr to be reduced, thereby enabling substantially the same advantages as a system based on the solid line of the graph to be obtained, by means of a simple method.

Figure 14:
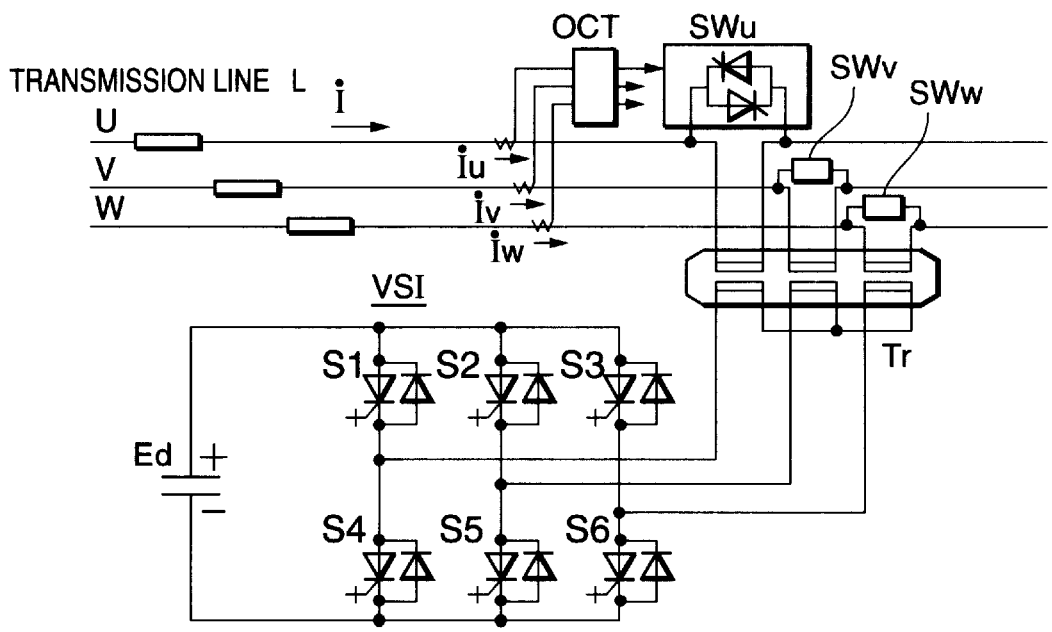
FIG. 14 is a block diagram showing a further modification of a series compensation generator according to the present invention.

FIG. 14 is a block diagram showing a further modification of the series compensation generator according to the present invention.

In the diagram, UVW is a three-phase AC power transmission line, L is the inductance of the transmission line, Tr is a series transformer, VSI is a voltage source PWM control inverter, Ed is a DC voltage source, SWu, SWv and SWw are bypass circuits, and OCT is an overcurrent detector.

U-phase bypass circuit SWu is constituted by two thyristors connected inversely in parallel, and it is connected in parallel to the primary side of series transformer Tr. The V-phase and W-phase bypass circuits are also constituted in a similar manner.

If an overcurrent flows in the transmission line, due to an earthing fault, or the like, then this overcurrent is detected by overcurrent detector OCT, and firstly, the output voltage of voltage source inverter VSI is controlled to zero. Thereupon, a turn-on signal is supplied to the thyristors in above-mentioned bypass circuits SWu, SWv, SWw, and the overcurrent flowing in the transmission line flows through the bypass circuits. In this manner, the equivalent reactance of the transmission line is increased, any increase in current is suppressed, and furthermore, the series compensation generators can be protected from the overcurrent. Moreover, by opening the bypass circuits at the moment that the overcurrent has ended, it is possible to suppress power oscillations rapidly by operating the series compensation generators.

The bypass circuits also have a similar effect if they are installed on the secondary side of the series transformer.

Figure 15:
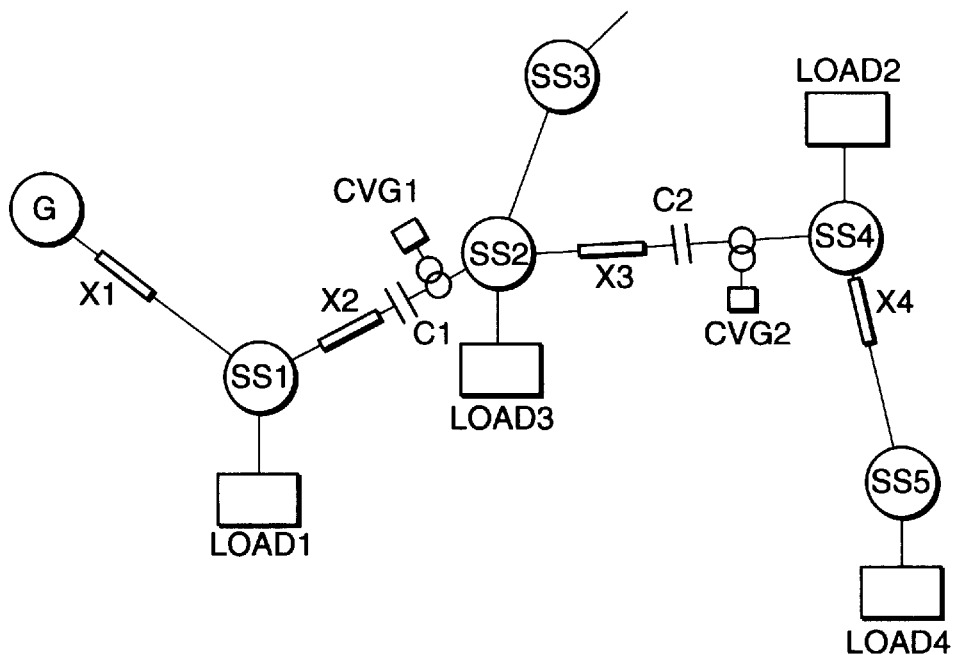
FIG. 15 is a block diagram showing a sixth embodiment of an AC long-distance power transmission system according to the present invention.

FIG. 15 is a block diagram showing a sixth embodiment of an AC long-distance power transmission system according to the present invention.

In the diagram, G is a generator, SS1~SS5 are substations, LOAD1~LOAD4 are loads, C1 and C2 are series capacitors, CVG1 and CVG2 are compensation voltage generators, and X1~X4 are transmission line reactance values.

The power generated by generator G is transmitted over a long distance, via multiple substations SS1→SS2→SS3→SS4→SS5, to load LOAD4, which is a bulk consumer.

Series capacitor C1 and compensation voltage generator CVG1 generate a compensating voltage which cancels out transmission line reactance X2, thereby reducing the equivalent reactance and hence increasing the transmission capability of that section. Similarly, series capacitor C2 and compensation voltage generator CVG2 generate a compensating voltage which cancels out transmission line reactance X3, thereby reducing the equivalent reactance and hence increasing the transmission capability of that section. Furthermore, if power oscillation arises in the transmission line, then compensating voltages are generated by compensation voltage generators CVG1 and CVG2 in order to regulate this, and hence power oscillations are suppressed. In other words, a first series compensation generator is constituted by series capacitor C1 and compensation voltage generator CVG1, and a second series compensation generator is constituted by series capacitor C2 and compensation voltage generator CVG2.

Figure 16:
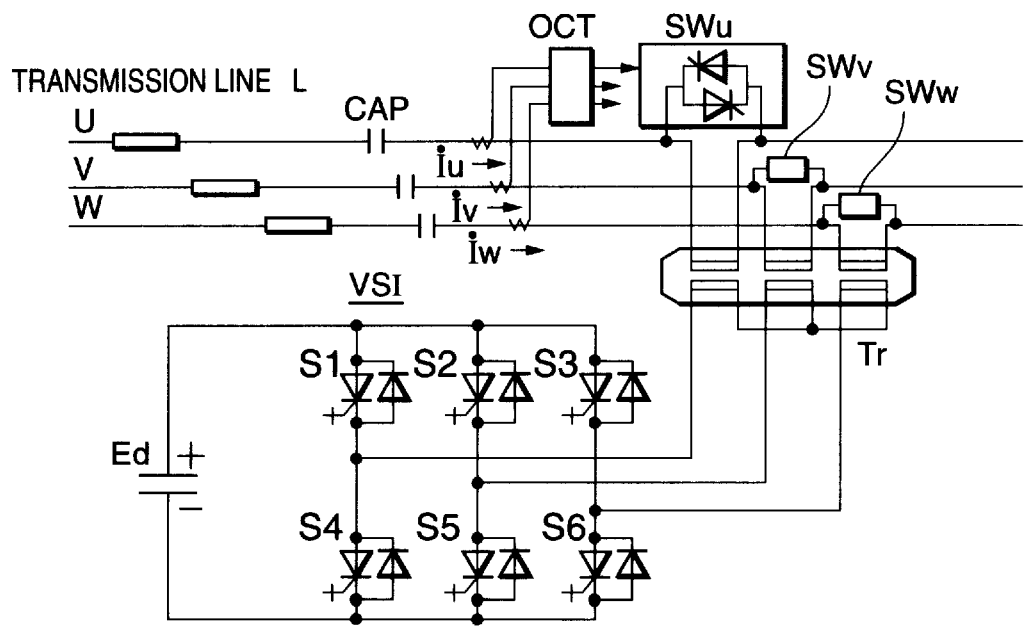
FIG. 16 is a block diagram showing an embodiment of a series compensation generator of the system in FIG. 15.

FIG. 16 is a block diagram showing an embodiment of a series compensation generator of the system in FIG. 15.

In the diagram, UVW is a three-phase AC power transmission line, L is the inductance of the transmission line, CAP is a series capacitor, Tr is a series transformer, VSI is a voltage source PWM control inverter, Ed is a DC voltage source, SWu, SWv and SWw are bypass circuits, and OCT is an overcurrent detector.

Series capacitor CAP acts in such as manner as to cancel out inductance L of the transmission line. Furthermore, a compensation voltage generator, which regulates the reactance of the transmission line and suppresses and controls power oscillations in the transmission line, is constituted by series transformer Tr and voltage source self-commutating inverter VSI. When compared with the system illustrated in FIG. 4, voltage source inverter VSI has only a small capacity. Therefore, more economical AC long-distance power transmission can be achieved.

If an overcurrent flows in the transmission line, bypass circuits SWu, SWv and SWw are set to a conducting state, such that the overcurrent flows through them. In this way, the above-mentioned compensation voltage generators can be protected from overcurrents.

Figure 17:
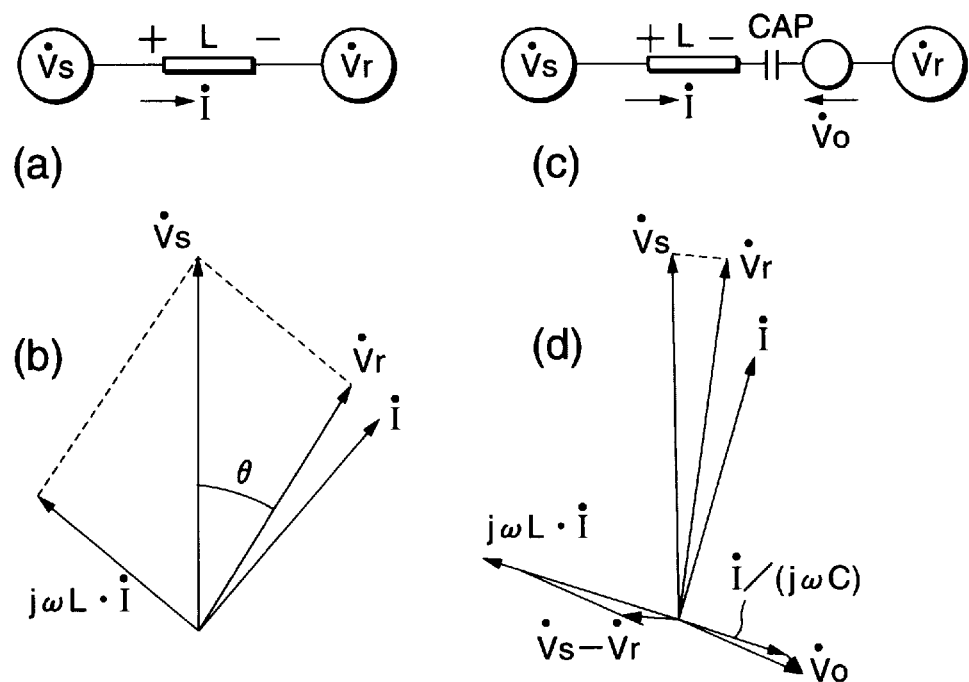
FIG. 17 is a voltage/current vector diagram to illustrate the operation of the system in FIG. 15.

FIG. 17 shows equivalent circuits of transmission lines and corresponding voltage/current vector diagrams for the purpose of describing the operation of the system in FIG. 15. In the diagram, Vs is the transmitting-side voltage, Vr is the receiving-side voltage, L is the transmission line inductance, CAP is a series capacitor, I is the current, Vo is the compensating voltage, and ω is the angular frequency of the power source. Here, the resistance of the transmission line is sufficiently small to be ignored.

In FIG. 17,(a) and (b) are, respectively, an equivalent circuit and a voltage/current vector diagram of a transmission line which does not contain a series compensation generator, and (c) and (d) are, respectively, an equivalent circuit and a voltage/current vector diagram of a transmission line which contains a series compensation generator.

In the vector diagram in FIG. 17(b), when current I flows in the transmission line, a voltage drop of jωL·I is produced and phase difference θ appears between transmitting-side voltage Vs and receiving-side voltage Vr. Furthermore, if current I lags behind voltage Vr, then voltage Vr will be smaller than voltage Vs.

In the vector diagram in FIG. 17(d), when current I flows in the transmission line, a voltage drop of jωL·I is produced by the inductance of the transmission line, and a voltage drop of I/(jωC) is generated by series capacitor CAP. These two factors act in opposing directions, and hence the equivalent reactance of the transmission line is reduced. Moreover, by means of the compensation voltage generator generating compensating voltage Vo, the difference between transmitting-side voltage Vs and receiving-side voltage Vr becomes smaller, as shown in the diagram, and phase difference θ between them also becomes smaller. Moreover, the magnitudes of voltage Vr and voltage Vs are substantially the same.

If power oscillation occurs in the transmission line, then the compensation voltage generator generates a compensating voltage, thereby suppressing the oscillation.

In this system, the voltage generated by the compensation voltage generator is only small, so the capacity of the power converter (voltage source self-commutating inverter, or the like) used for this device can be reduced.

Figure 18:
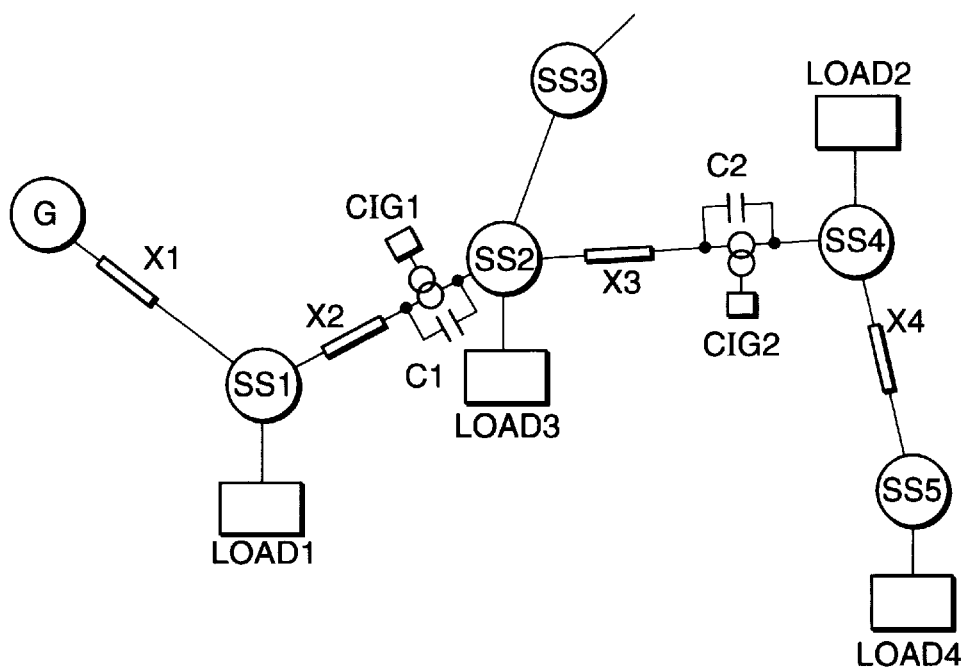
FIG. 18 is a block diagram showing a seventh embodiment of an AC long-distance power transmission system according to the present invention.

FIG. 18 is a block diagram showing a seventh embodiment of an AC long-distance power transmission system according to the present invention.

In the diagram, G is a generator, SS1~SS5 are substations, LOAD1~LOAD4 are loads, C1 and C2 are series capacitors, CIG1 and CIG2 are compensation current generators, and X1~X4 are transmission line reactance values.

The power generated by generator G is transmitted over a long distance, via multiple substations SS1→SS2→SS3→SS4→SS5, to load LOAD4, which is a bulk consumer.

Series capacitor C1 and compensation current generator CIG1 generate a compensating voltage which cancels out transmission line reactance X2, thereby reducing the equivalent reactance and hence increasing the transmission capability of that section. Similarly, series capacitor C2 and compensation current generator CIG2 generate a compensating voltage which cancels out transmission line reactance X3, thereby reducing the equivalent reactance and hence increasing the transmission capability of that section. Furthermore, if power oscillation occurs in the transmission line, compensating currents are generated by compensation current generators CIG1 and CIG2 in order to regulate this, and hence power oscillations are suppressed. In other words, a first series compensation generator is constituted by series capacitor C1 and compensation current generator CIG1 and a second series compensation generator is constituted by series capacitor C2 and compensation current generator CIG2.

Figure 19:
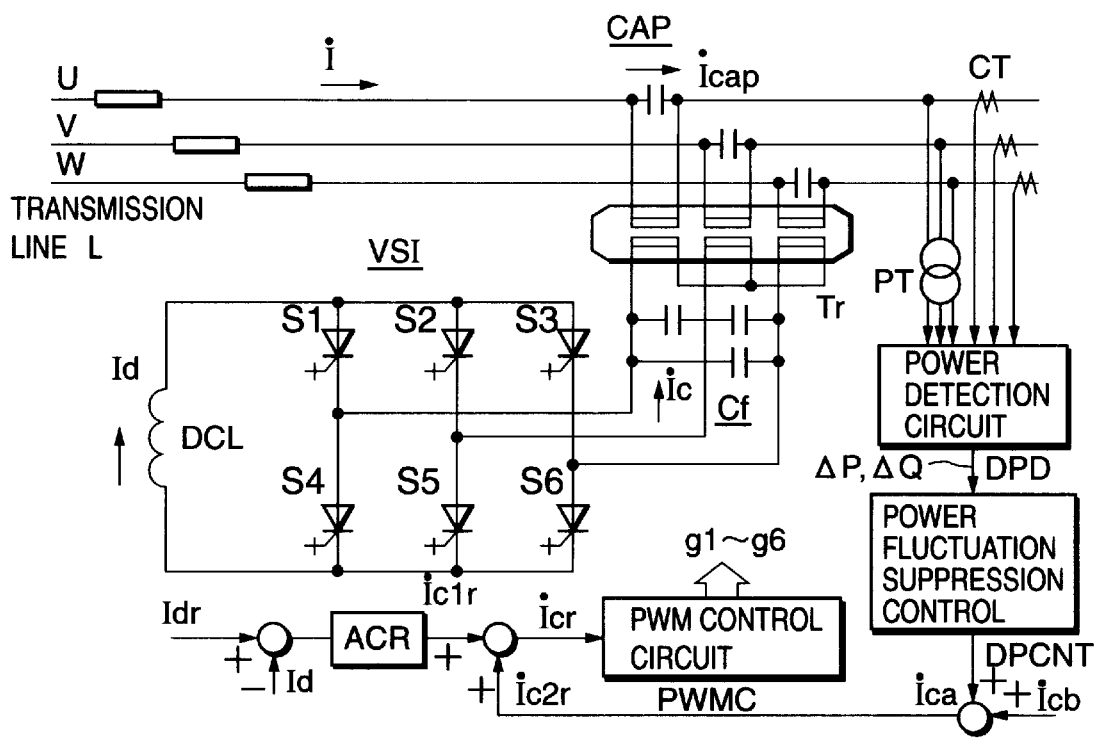
FIG. 19 is a block diagram showing an embodiment of a series compensation generator of the system in FIG. 18.

FIG. 19 is a block diagram showing an embodiment of a series compensation generator of the system in FIG. 16.

In the diagram, UVW is a three-phase AC power transmission line, L is the inductance of the transmission line, CAP is a series capacitor, Tr is a series transformer, CSI is a current source PWM control inverter, DCL is a DC current source, Cf is a filter capacitor, CT is a current detector, PT is a voltage detector, DPD is a power detecting circuit, DPCNT is a power fluctuation suppressing circuit, ACR is a current control circuit, and PWMC is a PWM control circuit.

Series capacitor CAP acts in such a manner that it cancels out inductance L of the transmission line respectively. A compensation current generator is constituted by series transformer Tr and current source self-commutating inverter CSI, which regulates the transmission line reactance and suppresses and controls power oscillations in the transmission line.

The primary side of series transformer Tr is connected in parallel to each phase of series capacitor CAP respectively, and the secondary side thereof is connected to current source inverter CSI for pulse width modulation control (PWM control).

Current source inverter CSI is constituted by self-turn-off devices S1~S6, such as non-inverting GTOs, or the like, and is constituted as a three-phase bridge. Current source inverter CSI supplies AC current Ic proportional to current command value Icr to series capacitor CAP, by means of PWM control. Filter capacitor Cf absorbs the higher harmonic wave current generated by PWM control. Applied voltage Vo for series capacitor UP is determined by the sum of current I flowing in the transmission line and above-mentioned compensating current Ic, and it forms a compensating voltage for the series compensation generator. In a steady state, this compensating voltage Vo generates a component that is orthogonal to current I flowing in the transmission line, thereby regulating the equivalent reactance of the transmission line.

Icb is a command value for the steady state compensating current of the compensation current generator, and by regulating this value, it is possible to regulate reactance X of the transmission line in such a manner that it becomes substantially zero.

On the other hand, if power oscillation arises in the transmission line, it is controlled and suppressed in the following manner.

Specifically, the three-phase AC voltage and current in the transmission line is detected by current detector CT and voltage detector PT, and active power P and reactive power Q are determined using these values. If power oscillation occurs, the values of P and Q change, and consequently amounts of change $\Delta P$ and $\Delta Q$ are derived and supplied to the subsequent power fluctuation suppression control circuit DPCNT. Compensating current (reactive) Icq of the component in the same phase as (or the opposite phase to) current I flowing in the transmission line is regulated in accordance with active power change $\Delta P$, and compensating current (active) Icp of the component orthogonal to current I is regulated in accordance with reactive power change $\Delta Q$. In the diagram, Ica indicates the combined compensating voltage command. If power oscillation occurs, then compensating voltage Ica is changed in accordance with $\Delta P$ and $\Delta Q$, thereby suppressing the power oscillation.

DC current source Id may be provided separately, but here, it is created integrally. In other words, DC reactor DCL is prepared as a DC current source, and current Id thereof is controlled such that it maintains a uniform value (constant value). Firstly, DC command value Idr and DC current detection value Id are compared, and that deviation is amplified by DC current control circuit ACR. Output signal Ic1r from ACR supplies a compensating current command for the component orthogonal to current I flowing in the transmission line (the component having the same phase or opposite phase with respect to voltage V1 applied to series capacitor CAP: active component), thereby controlling DC current Id.

Figure 20:
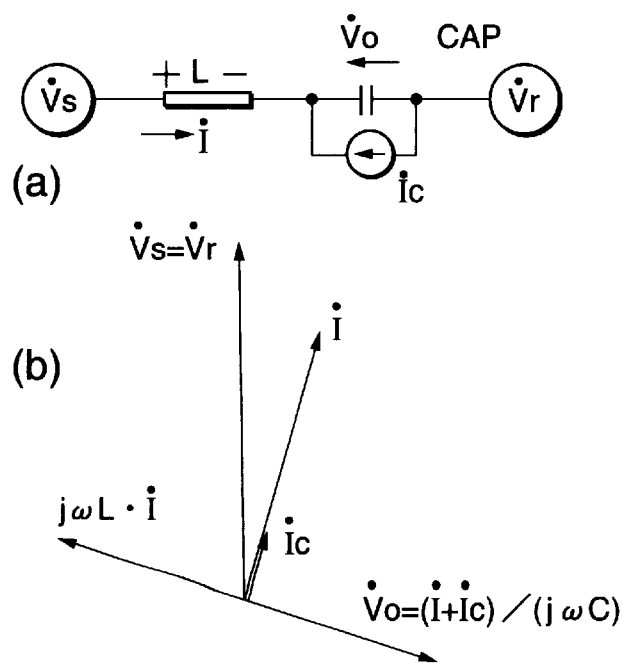
FIG. 20 is a voltage/current vector diagram to illustrate the operation of the system in FIG. 18.

FIG. 20 is an equivalent circuit of a transmission line and a corresponding voltage/current vector diagram for the purpose of describing the operation of the system in FIG. 18.

In the diagram, Vs is the transmitting-side voltage, Vr is the receiving-side voltage, L is the inductance of the transmission line, CAP is a series capacitor, I is the transmission current, Vo is the applied voltage (compensating voltage) of series capacitor CAP, Ic is the compensating current, and $\omega$ is the angular frequency of the power source. The resistance of the transmission line is sufficiently small to be ignored.

In the vector diagram in FIG. 20(b), when current I flows, this produces a voltage drop of $j\omega L \cdot I$ due to inductance L of the transmission line. Furthermore, by supplying compensating current Ic of the same phase component as transmission current I from the compensation current generator to series capacitor CAP, a voltage of $Vo=(I+Ic)/(j\omega C)$ is applied. These two factors act in opposing directions, and hence the equivalent reactance of the transmission line is reduced. By regulating compensating current Ic such that $Vo=-j\omega L \cdot I$, it is possible to reduce equivalent reactance X of the transmission line substantially to zero, thereby enabling matching values to be achieved for transmitting-side voltage Vs and receiving-side voltage Vr, as shown in the vector diagram in FIG. 20(b).

If power oscillation arises in the transmission line, this oscillation is suppressed by means of the compensation current generator generating compensating current Ic.

In this system, by making transmission current I flow through series capacitor CAP, and cancelling out the greater part of inductance L of the transmission line by means of this series capacitor CAP, steady state current Ic generated by the compensation current generator will only be small, and the capacity of the power converter (current source self-commutating inverter, or the like) used for this can be reduced.

Moreover, even if an overcurrent flows in the transmission line, due to an earthing fault, or the like, since almost all of this overcurrent will flow through the series capacitor, it will have little effect on the compensation current generator.

Figure 21:
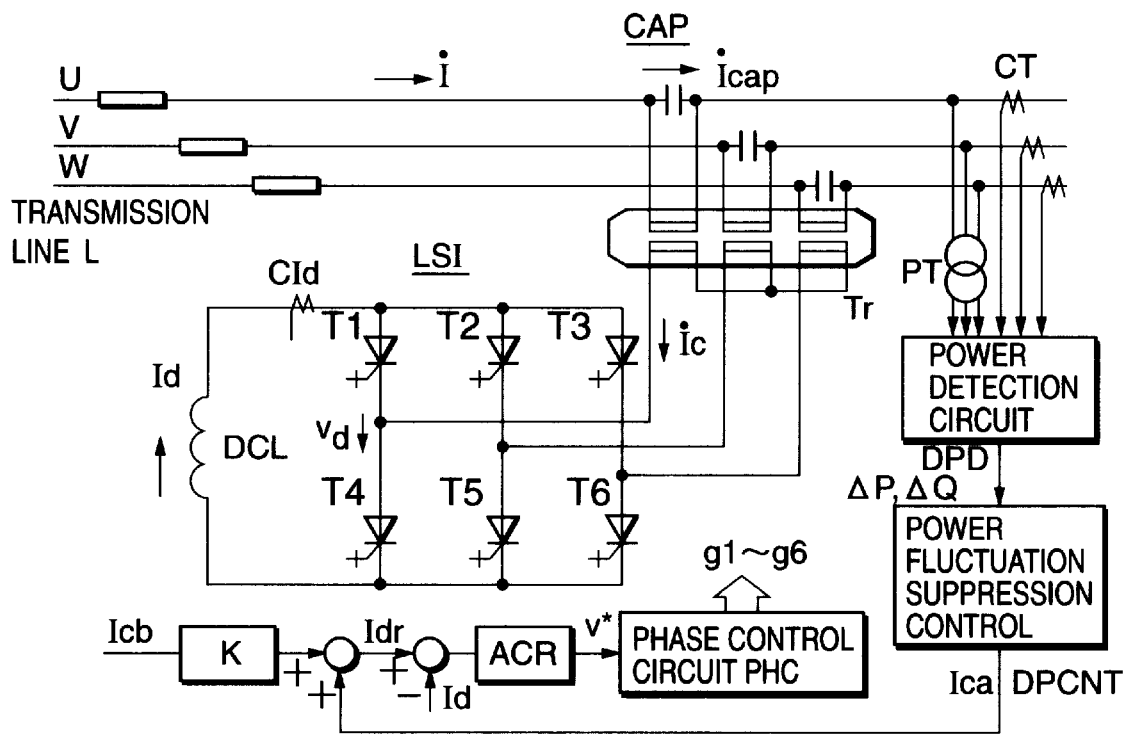
FIG. 21 is a block diagram showing a further modification of the series compensation generator of the system in FIG. 18.

FIG. 21 is a block diagram showing a further modification of the series compensation generator of the system in FIG. 18;

In the diagram, UVW is a three-phase AC power transmission line, L is the inductance of the transmission line, CAP is a series capacitor, Tr is a series transformer, LCI is an externally commutated inverter, DCL is a DC current source, CT is a current detector, PT is a voltage detector, DPD is a power detecting circuit, DPCNT is a power fluctuation suppressing circuit, K is a proportional element, ACR is a current control circuit, and PHC is a phase control circuit.

Series capacitor CAP acts in such a manner that it cancels out inductance L of the transmission line. Furthermore, a compensation current generator is constituted by series transformer Tr and externally commutated inverter LCI, which regulates the reactance of the transmission line and suppresses and controls power oscillations in the transmission line.

The primary side of series transformer Tr is connected in parallel to each phase of series capacitor CAP, and the secondary side thereof is connected to externally commutated inverter LCI.

Externally commutated inverter LCI is constituted by six thyristors T1~T6, and is connected to a three-phase bridge. This externally commutated inverter LCI performs natural commutation by utilising the applied voltage of series capacitor CAP, and it supplies required compensating current Ic to series capacitor CAP by regulating the magnitude of DC current Id. In FIG. 21, since the direction of compensating current Ic is reversed, applied voltage Vo to series capacitor CAP is determined by the current difference between current I flowing in the transmission line and above-mentioned compensating current Ic, and this forms the compensating voltage of the series compensation generator. In a steady state, this compensating voltage Vo generates a component orthogonal to current I flowing in the transmission line, thereby regulating the equivalent reactance of the transmission line.

Icb is a command value for the steady state compensating current of the compensation current generator, and by regulating this value, it is possible to regulate reactance X of the transmission line such that it becomes substantially zero.

DC current source Id may be provided separately, but here a DC current source is created integrally. In other words, DC reactor DCL is prepared as a DC current source, and current Id therefrom is controlled such that it maintains a uniform value. Firstly, DC command value Idr and DC voltage detection value Id are compared, and the deviation between them is amplified by DC current control circuit ACR. ACR output signal v* (in some cases, this becomes phase control input signal V*) forms the phase control input signal for the externally commutated inverter, and it controls turning-on control angle α of the thyristors therein. This control angle α (also called phase angle α) is the angle of lag of compensating current Ic with respect to voltage Vo applied to series capacitor CAP.

If v*=0, then α=90°, and DC voltage Vd of LCI becomes zero.

If Idr>Id, then v*>0, control angle (phase angle) α<90°, DC voltage Vd of LCI will be positive, and current Id flowing in DC reactor DCL will be increased.

In addition, if Idr<Id, then v*<0, α>90°, DC voltage Vd of LCI will be negative, and current Id flowing in DC reactor DCL will be reduced.

By this means it is possible to control current Id flowing in DC reactor DCL. If DC current Id increases, the size of compensation current Ic can be varied in proportion to this.

In the steady state, v*=0 and compensation current Ic has a lag of about 90° relative to voltage Vo applied to series capacitor CAP. Accordingly, Ic is in reverse-phase relative to transmission current I, and voltage Vo applied to series capacitor CAP is proportional to (I−Ic)/(jωC), so if Ic is increased, Vo increases.

Also, if power oscillation arises in the transmission line, this oscillation is inhibited and controlled as follows.

That is, the three-phase AC voltage and current are detected using current detector CT and voltage detector PT, and active power P and reactive power Q are found from these values. If power oscillation arises, the values of P and Q change, so changes ΔP and ΔQ in these values are identified and supplied to the following power fluctuation inhibiting control circuit DPCNT. DC current command Idr is regulated in proportion to active power change ΔP, and phase control input signal v* is regulated in proportion to reactive power change ΔQ. If power oscillation arises, it can be inhibited by changing the size of compensation current Ic and phase angle α in proportion to ΔP and ΔQ. FIG. 21 shows a situation in which DC current command Idr is regulated in proportion to ΔP.

Figure 22:
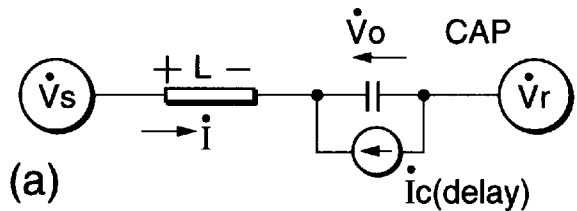
FIG. 22 is a voltage/current vector diagram to illustrate the operation of the device in FIG. 21.
Figure 22:
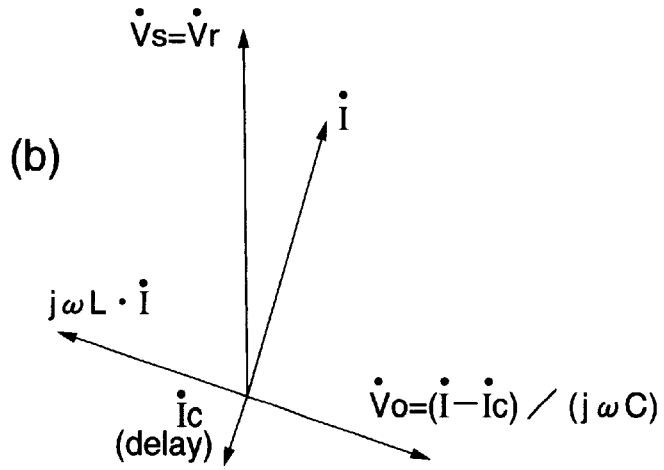

FIG. 22 shows an equivalent circuit and a voltage-current vector diagram to explain the action of the series compensation generator in FIG. 21.

If current I flows in the transmission line, voltage drop jωL·I is generated as a result of inductance L, and moreover, voltage I/(jωC) is applied to series capacitor CAP. This voltage works in a direction that cancels out the above-mentioned voltage drop due to inductance L, and reduces the equivalent reactance of the transmission line. In relation to voltage Vo applied to series capacitor CAP, externally-commutated inverter LCI usually takes lag current Ic and, in the steady state, Ic is delayed 90° relative to Vo. Consequently, if the direction of compensation current Ic is fixed in the direction shown in FIG. 21, Ic and the transmission current I will be in same phase. Accordingly, by causing compensation current Ic to flow, current I−Ic that flows in series capacitor CAP increases, and voltage Vo applied to series capacitor CAP (the compensation voltage) also increases.

Figure 23:
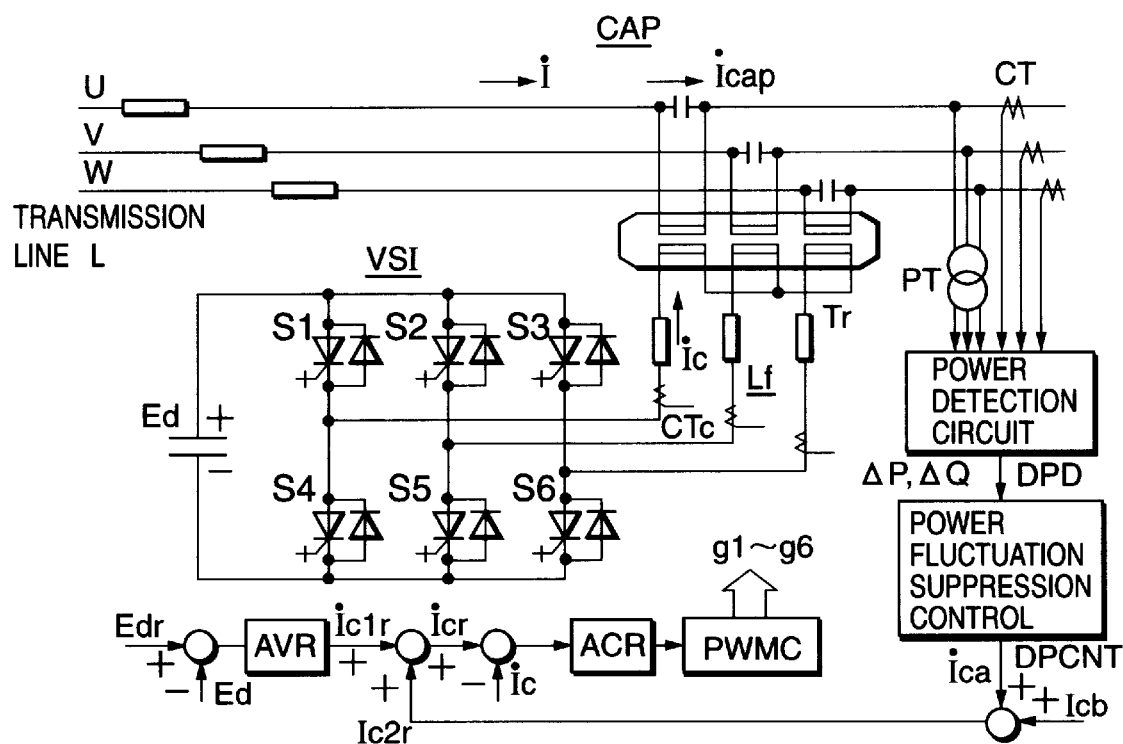
FIG. 23 is a block diagram showing yet a further modification of the series compensation generator of the system in FIG. 18.

FIG. 23 is a block diagram that shows a further different modification of the series compensation generator of the system shown in FIG. 18.

In this diagram, UVW is a three-phase AC transmission line, L is the inductance of the transmission line, CAP is a series capacitor, Tr is a series transformer, Lf is a filter reactor, VSI is a current-controlled voltage source inverter, Ed is a DC voltage source, CT and CTc are current detectors, PT is a voltage detector, DPD is a power detector, DPCNT is a power fluctuation inhibition control circuit, AVR is a voltage control circuit, ACR is a current control circuit, and PWMC is a pulse width modulation (PWM) control circuit.

The primary side of series transformer Tr is connected in parallel to series capacitor CAP separately for each phase, and the secondary side of the series transformer is connected to pulse width modulation control (PWM control) current-controlled voltage source inverter VSI via filter reactor Lf.

Current-controlled voltage source inverter VSI is composed of self-turn-off devices S1~S6, for example GTOs, and diodes connected in inverse parallel with each of these devices, connected as a three-phase bridge. Current-controlled voltage source inverter VSI compares current command value Icr with the value detected for the current flowing in filter reactor Lf, and carries out feedback control. Inverter output current Ic is supplied to series capacitor CAP, and controls voltage Vo applied to series capacitor CAP.

Voltage Vo applied to series capacitor CAP is determined by the total current found by adding current I flowing in the transmission line and above-mentioned compensation current Ic, and forms the compensation voltage in relation to the series compensation generator. In the steady state, compensation voltage Vo generates a component orthogonal to current I flowing in the transmission line, and this regulates the equivalent reactance of the transmission line.

Icb is the steady-state compensation current command value for the compensation current generator, and by regulating this value it is also possible to regulate reactance X of the transmission line to approximately zero.

Also, if power oscillation arises in the transmission line, this oscillation is inhibited and controlled as follows.

That is, the three-phase AC voltage and current are detected using current detector CT and voltage detector PT, and active power P and reactive power Q are found from these values. If a power fluctuation arises, the values of P and Q change, so changes $\Delta P$ and $\Delta Q$ in these values are identified and supplied to the following power fluctuation inhibition control circuit DPCNT. Compensating current voltage component Icq that is in-phase (or in reverse phase) with current I flowing in the transmission line, is regulated in proportion to change $\Delta P$ in the active power; whereas compensating current component Icp that is orthogonal to current I is regulated in proportion to reactive power change $\Delta Q$. In the diagram Ica indicates this composite compensation voltage command. If a power fluctuation arises, compensation voltage command Ica changes in proportion to $\Delta P$ and $\Delta Q$, and the power oscillation is inhibited.

For DC voltage source Ed, a separate power source may be provided, but here, a custom DC voltage source has been produced. That is, DC smoothing capacitor Cd is provided as the DC voltage source and is controlled so that applied voltage Ed is constant. Firstly, DC voltage command value Edr is compared to the actual DC voltage value detected, Ed, and the deviation is amplified using DC voltage control circuit AVR. AVR output signal Iclr controls DC voltage Ed by sending a command with respect to the compensation current component orthogonal to current I flowing in the transmission line (the component in-phase (or in reverse phase) relative to voltage Vo applied to series capacitor CAP).

Figure 24:
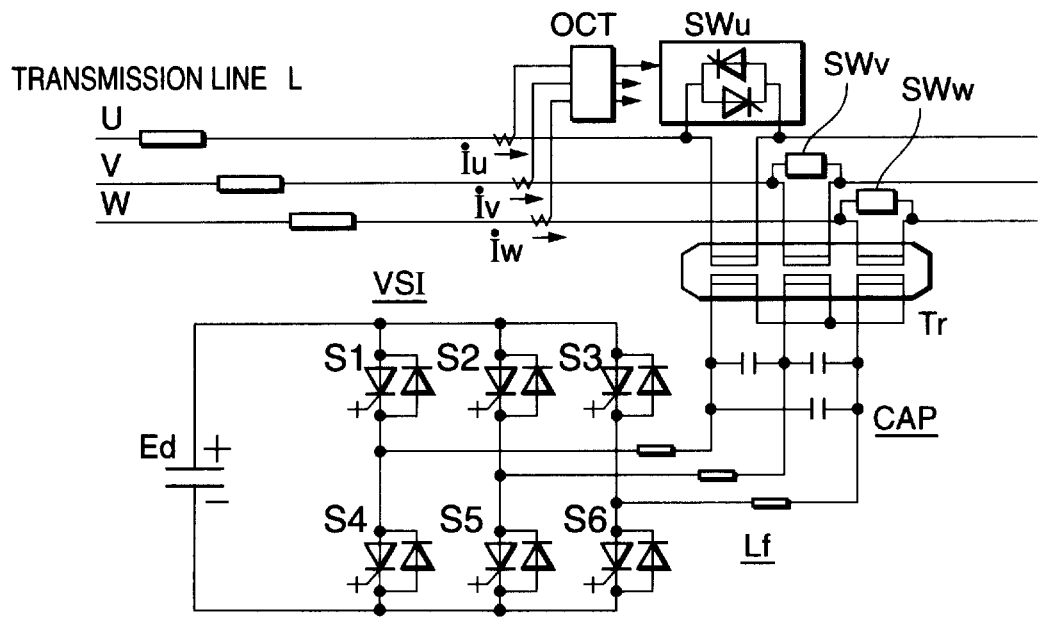
FIG. 24 is a block diagram showing yet a further modification of the series compensation generator of the system in FIG. 18.

FIG. 24 is a block diagram showing a further different modified example of the series compensation generator of the system shown in FIG. 18.

In this diagram, UVW is a three-phase AC transmission line, L is inductance of the transmission line, Tr is a series transformer, CAP is a series capacitor, Lf is a filter reactor, VSI is a current-controlled voltage source inverter, Ed is a DC voltage source, SWu, SWV, and SWw are bypass circuits constructed of thyristor switches, and OCT is an overcurrent detection circuit.

The primary side of series transformer Tr is connected in series to the transmission line separately for each phase, and the secondary side is connected to series capacitor CAP. Also, pulse width modulation control (PWM control) current-controlled voltage source inverter VSI is connected to series capacitor CAP via a filter reactor Lf.

Current-controlled voltage source inverter VSI is composed of self-turn-off devices S1~S6, for example GTOs, and diodes connected in inverse parallel with each of these devices, connected as a three-phase bridge. Current-controlled voltage source inverter VSI detects current Ic flowing in filter reactor Lf, and carries out feedback control to regulate this current to current command value Icr. Output current Ic of the inverter is supplied to series capacitor CAP, and controls voltage Vo applied to series capacitor CAP.

Voltage Vo applied to series capacitor CAP is determined by the total current found by adding current I flowing in the transmission line and above-mentioned compensation current Ic, and forms the compensation voltage in relation to the series compensation generator. In a steady state, compensation voltage Vo generates a component orthogonal to current I flowing in the transmission line, and this regulates the equivalent reactance of the transmission line.

U-phase bypass circuit SWu is composed of two thyristors connected in inverse parallel, and is connected in parallel to the primary side of series transformer Tr. The V-phase and W-phase bypass circuits are similarly constructed.

If an overcurrent flows due to an incident such as a line-to-earth fault in the transmission line, this is detected by overcurrent detection circuit OCT which sends a turn-on signal to thyristors SWu, SWv, and SWw, and the overcurrent flowing in the transmission line flows through the bypass circuits. In this way, increases in the current can be inhibited by increasing the equivalent reactance of the transmission line, and moreover, the series compensation generator can be protected from overcurrent.

In addition, at the point at which the overcurrent has been suppressed, the bypass circuits open and the power oscillation can be promptly inhibited by the operation of the series compensation generator.

The same outcome can also be obtained by placing the bypass circuits on the secondary side of the series transformer.

Figure 25:
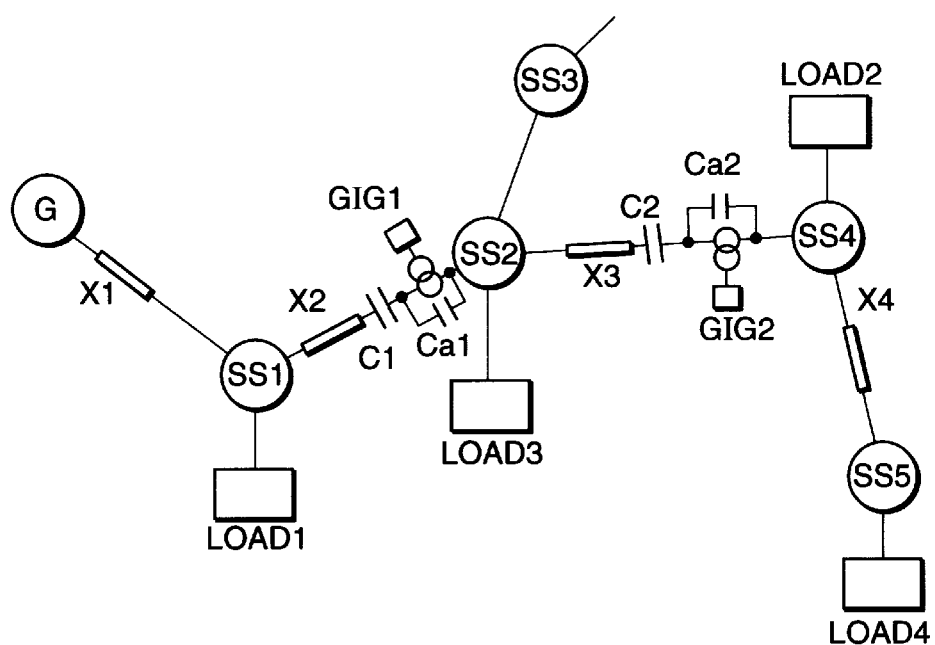
FIG. 25 is a block diagram showing an eighth embodiment of an AC long-distance power transmission system according to the present invention.

FIG. 25 is a block diagram showing an eighth embodiment of a long-distance AC transmission system of the present invention.

In this diagram, G is a power station, SS1~SS5 are substations, LOAD1~LOAD4 are loads, C1 and C2 are main series capacitors, Ca1 and Ca2 are auxiliary series capacitors, CIG1 and CIG2 are compensation current generators, and X1~X4 are transmission line reactances.

Power generated at power station G is transmitted via substations SS1→SS2→SS4→SS5 over a long distance to load LOAD4 comprising a major consumption area.

Main series capacitor C1, auxiliary series capacitor Ca1, and compensation current generator CIG1 generate compensation voltage that cancels out reactance X2 of the transmission line, and the transmission capacity over that section is improved as a result of a reduction in the equivalent reactance. Similarly, main series capacitor C2, auxiliary series capacitor Ca2, and compensation current generator CIG2 generate compensation voltage that cancels out reactance X3 of the transmission line, and the transmission capacity over that section is improved as a result of a reduction in the equivalent reactance.

In addition, if power oscillation arises in the transmission line, the oscillation is inhibited by generating compensation currents from compensation current generators CIG1 and CIG2) in order to inhibit the fluctuation. That is, main series capacitor C1, auxiliary series capacitor Ca1, and compensation current generator CIG1 constitute the first series compensation generator, and main series capacitor C2, auxiliary series capacitor Ca2, and compensation current generator CIG2 constitute the second series compensation generator.

Figure 26:
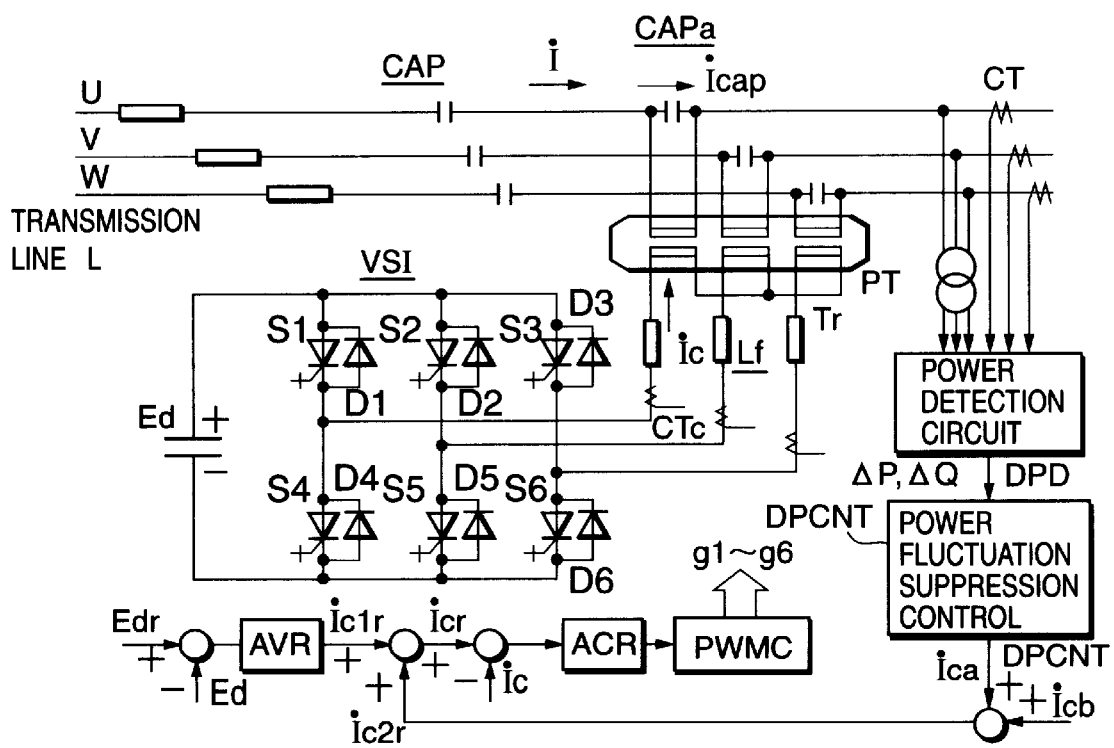
FIG. 26 is a block diagram showing an embodiment of a series compensation generator of the system in FIG. 25.

FIG. 26 is a block diagram that shows the embodiment of the series compensation generator of the system shown in FIG. 25.

In this diagram, UVW is a three-phase AC transmission line, L is inductance of the transmission line, CAP is the main series capacitor, CAPa is an auxiliary series capacitor, Tr is a series transformer, Lf is a filter reactor, VSI is a current-controlled voltage source inverter, Ed is a DC voltage source, CT is a current detector, PT is a voltage detector, DPD is a power detector, DPCNT is a power fluctuation inhibition control circuit, AVR is a voltage control circuit, ACR is a current control circuit, and PWMC is a pulse width modulation (PWM) control circuit.

The primary side of series transformer Tr is connected in parallel to auxiliary series capacitor CAPa separately for each phase, and the secondary side of the series transformer is connected to pulse width modulation control (PWM control) current-controlled voltage source inverter VSI via the filter reactor Lf.

Current-controlled voltage source inverter VSI is composed of self-turn-off devices S1~S6, for example GTOs, and diodes connected in inverse parallel with each of these devices, connected as a three-phase bridge. Current-controlled voltage source inverter VSI compares current command value Icr with the value detected for the current flowing in the filter reactor Lf, and carries out feedback control. Inverter output current Ic is supplied to auxiliary series capacitor CAPa, and controls voltage Vo applied to auxiliary series capacitor CAPa.

Voltage Vo applied to auxiliary series capacitor CAPa is determined by the total current found by adding current I flowing in the transmission line and above-mentioned compensation current Ic, and forms the compensation voltage in relation to the series compensation generator. In a steady state, compensation voltage Vo generates a component orthogonal to current I flowing in the transmission line, and this regulates the equivalent reactance of the transmission line.

On the other hand, a voltage that cancels the voltage drop due to inductance L of the transmission line is produced by transmission current I flowing in main series capacitor CAP, and this works to reduce equivalent reactance X of the transmission line.

Icb is the steady-state compensation current command value for the compensation current generator, and by regulating this value, in combination with main series capacitor CAP, it is also possible to regulate equivalent reactance X of the transmission line to approximately zero.

Also, if power oscillation arises in the transmission line, this oscillation is inhibited and controlled as follows.

That is, the three-phase AC voltage and current are detected using current detector CT and voltage detector PT, and active power P and reactive power Q are found from these values. If power oscillation arises, the values of P and Q change, so changes $\Delta P$ and $\Delta Q$ in these values are identified and supplied to the following power fluctuation inhibiting control circuit, DPCNT. Compensating current voltage component Icq that is in-phase (or in reverse phase) with current I flowing in the transmission line is regulated in proportion to active power change $\Delta P$; whereas compensation current component Icp that is orthogonal to current I is regulated in proportion to reactive power change $\Delta Q$. In the diagram Ica indicates this composite compensation voltage command. If power oscillation arises, compensation voltage Ica changes in proportion to $\Delta P$ and $\Delta Q$, and the power oscillation is inhibited.

For the DC voltage source Ed, a separate power source may be provided, but here, a custom DC voltage source has been produced. That is, DC smoothing capacitor Cd is provided as the DC voltage source, and is controlled so that the voltage applied, Ed, is constant. Firstly, DC voltage command value Edr is compared with actually detected DC voltage value Ed, and the deviation is amplified using DC voltage control circuit AVR. AVR output signal Iclr controls DC voltage Ed by sending a compensating current command for the component orthogonal to current I flowing in the transmission line (the component in-phase (or in reverse phase) with voltage Vo applied to auxiliary series capacitor CAPa).

Figure 27:
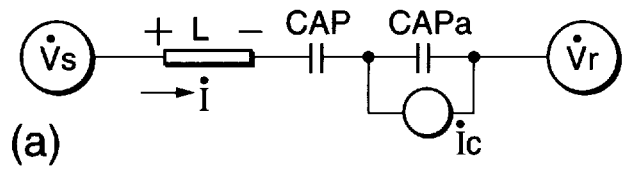
FIG. 27 is a voltage/current vector diagram to illustrate the operation of the system in FIG. 25.
Figure 27:
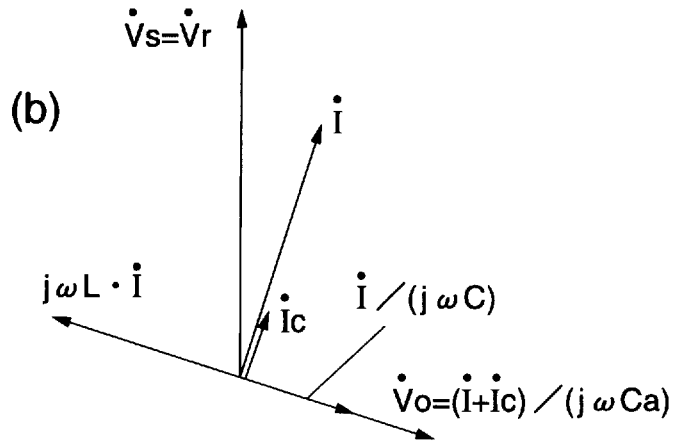

FIG. 27 shows a transmission line equivalent circuit and a voltage/current vector diagram to explain the working of the system shown in FIG. 25.

In this diagram, Vs is the transmitting-side voltage, Vr is the receiving-side voltage, L is the inductance in the transmission line, CAP is a main series capacitor, CAPa is an auxiliary series capacitor, I is the transmission current, Vo is the voltage applied to auxiliary series capacitor CAPa (the compensation voltage), Ic is the compensation current, and $\omega$ is the power supply angular frequency. The resistance of the transmission line is considered to be small enough to be ignored.

In the vector diagram of FIG. 27(b), if current I flows, voltage drop $j\omega L \cdot I$ is generated as a result of inductance L of the transmission line. In addition, voltage $I/(j\omega C)$ is generated in main series capacitor CAP. Both of these work in directions that cancel out, and the equivalent reactance of the transmission line is reduced. Furthermore, as a result of supplying the component of compensation current Ic that is in-phase with the transmission current I to auxiliary series capacitor CAPa from the compensation current generator, voltage $Vo=(I+Ic)/(j\omega Ca)$ is applied to auxiliary series capacitor CAPa.

Accordingly, if compensation current IC is regulated so that $Vo=-j(\omega L-1/\omega C)\cdot I$, it is possible to regulate equivalent reactance X of the transmission line to approximately zero and, as shown in the vector diagram of FIG. 27(b), it is possible to make transmitting-side voltage Vs and receiving-side voltage Vr equal.

If power oscillation arises in the transmission line, the oscillation is inhibited by generating compensation current Ic from the compensation current generator.

In this system, if transmission current I is made to flow through main series capacitor CAP and most of inductance L of the transmission line is cancelled out by main series capacitor CAP, the steady-state current Ic produced from the compensation current generator only needs to be small, so the capacity of the power converter (for example, a current source self-commutating inverter) can be reduced.

In addition, if an overcurrent flows in the transmission line due to an incident such as a line-to-earth fault, most of this overcurrent will flow via auxiliary series capacitor CAPa, so the effect on the compensation current generator will be small.

Figure 28:
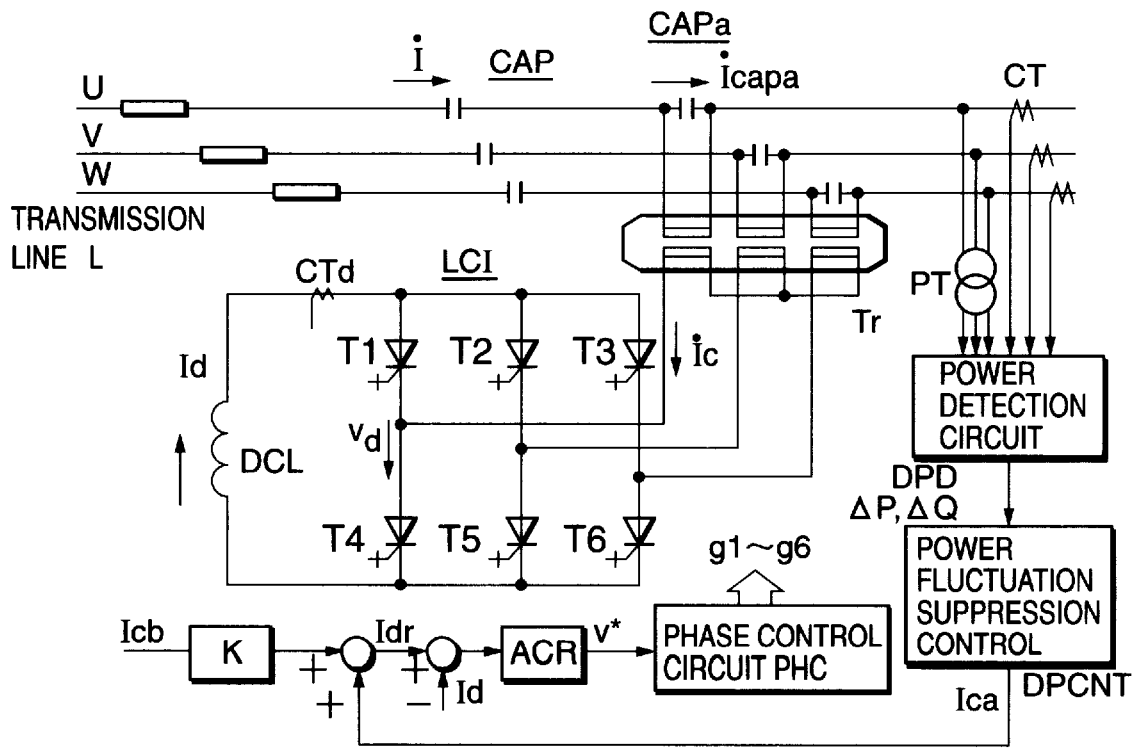
FIG. 28 is a block diagram showing a further modification of the series compensation generator of the system in FIG. 25.

FIG. 28 is a block diagram showing a different modified example of the series compensation generator of the system shown in FIG. 25.

In this diagram, UVW is a three-phase AC transmission line, L is inductance of the transmission line, CAP is a main series capacitor, CAPa is an auxiliary series capacitor, Tr is a series transformer, Lf is a filter reactor, LCI is an externally-commutated inverter, DCL is a DC current source, CT is a current detector, PT is a voltage detector, DPD is a power detection circuit, DPCNT is a power fluctuation inhibiting circuit, K is a proportional element, ACR is a current control circuit, and PHC is a phase control circuit.

Main series capacitor CAP and auxiliary series capacitor CAPa operate to cancel out inductance L of the transmission line. Also, the primary winding of series transformer Tr is connected in parallel with auxiliary series capacitor CAPa, and the secondary side is connected to the externally-commutated inverter. The compensation current generator is composed of series transformer Tr and externally-commutated inverter LCI, and regulates the reactance of the transmission line, and also inhibits and controls transmission line power oscillation.

Externally-commutated inverter LCI is composed of six thyristors T1~T6 connected as a three-phase bridge. Externally-commutated inverter LCI carries out natural commutation using the voltage applied to auxiliary series capacitor CAPa, and supplies required compensation current Ic to auxiliary series capacitor CAPa by regulating the size of DC current Id. If the orientation of the compensation current is set up in the direction shown in FIG. 28, voltage Vo applied to auxiliary series capacitor CAPa will be determined by the difference in current between current I flowing in the transmission line and above-mentioned compensation current Ic. In the steady state, compensation voltage Vo generates a component orthogonal to current I flowing in the transmission line, and regulates the equivalent reactance of the transmission line.

Icb is the steady-state compensation current command value (reference value) for the compensation current generator, and by regulating this value, in combination with main series capacitor CAP, it is also possible to regulate reactance X of the transmission line to approximately zero.

For the source of DC current Id, a separate power source may be provided, but here a custom DC current source has been produced. That is, DC reactor DCL is provided as the DC current source and is controlled so that its current Id is constant. Firstly, DC command value Idr is compared to actually detected DC current value Id, and any deviation is amplified using DC current control circuit ACR. ACR output signal v* becomes the externally-commutated inverter's phase control input signal, and controls firing (turning-on) control angle α of the thyristors. Control angle α (phase angle α) becomes the lag angle of compensation current Ic relative to voltage Vo applied to auxiliary series capacitor CAPa.

If v*=0, then α=90°, and DC voltage Vd of LCI will be zero.

If Idr>Id, then v*>0, phase angle α<90°, DC voltage Vd of LCI will be positive, and current Id flowing in DC reactor DCL will be increased.

In addition, if Idr<Id, then v*<0, α>90°, DC voltage Vd of LCI will be negative, and current Id flowing in DC reactor DCL will be reduced.

By this means it is possible to control current Id flowing in DC reactor DCL. If DC current Id increases, the size of compensation current Ic can be varied in proportional to this.

In the steady state, v*=0 and compensation current Ic has a lag of about 90° relative to voltage Vo applied to auxiliary series capacitor CAPa. Accordingly, Ic is in reverse phase relative to I, and voltage Vo applied to auxiliary series capacitor CAPa is proportional to (I−Ic), so if Ic is increased, Vo increases.

Also, if power oscillation arises in the transmission line, this oscillation is inhibited and controlled as follows.

That is, the three-phase AC voltage and current are detected using current detector CT and voltage detector PT, and active power P and reactive power Q are found from these values. If power oscillation arises, the values of P and Q change, so the changes in these values ΔP and ΔQ are identified and supplied to the following power fluctuation inhibition control circuit, DPCNT. DC current command Idr is regulated in proportion to active power change ΔP, and phase control input signal v* is regulated in proportion to reactive power change ΔQ. If power oscillation arises, it can be inhibited by changing the size and control angle α (phase angle α) of compensation current Ic in proportion to ΔP and ΔQ. FIG. 28 shows a situation in which Idr is regulated in proportion to ΔP.

In this system, if transmission current I is made to flow through main series capacitor CAP and most of inductance L of the transmission line cancelled out by main series capacitor CAP, the steady-state current Ic produced from the compensation current generator only needs to be small, so the capacity of the power converter can be reduced.

In addition, if an overcurrent flows in the transmission line due to an incident such as a line-to-earth fault, most of this overcurrent will flow via auxiliary series capacitor CAPa, so the effect on the compensation current generator will be small.

Figure 29:
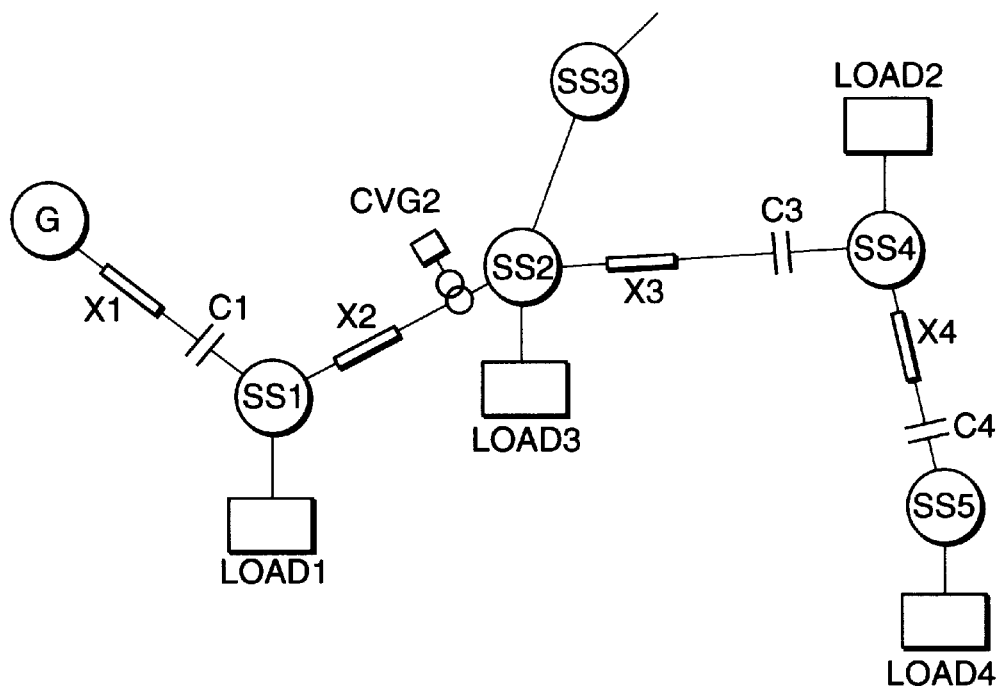
FIG. 29 is a block diagram showing a ninth embodiment of an AC long-distance power transmission system according to the present invention.

FIG. 29 is a block diagram showing a ninth embodiment of a long-distance AC transmission system of this invention.

In this diagram, G is a power station, SS1~SS5 are substations, LOAD1~LOAD4 are loads, C1, C3 and C4 are series capacitors, CVG2 is a compensation voltage generator, and X1~X4 are transmission line reactances.

Power generated at the power station G is transmitted via multiple substations SS1→SS2→SS4→SS5 over a long distance to load LOAD4 comprising a major consumption area.

The value of series capacitor C1 is selected to compensate for reactance X1 of the transmission line between power station G substation SS1, the value of series capacitor C3 is selected to compensate for reactance X3 of the transmission line between substation SS2 and substation SS4, and the value of series capacitor C4 is selected to compensate for reactance X4 of the transmission line between substation SS4 and substation SS5. In addition, compensation voltage generator CVG2 produces a voltage that compensates for reactance X2 between substation SS1 and substation SS2, and also inhibits and controls power oscillation throughout the whole transmission route. This design leads to a reduction in the equivalent reactance of the whole of a long-distance transmission route that passes through multiple substations, and an improvement in transmission capability, and moreover, power system stabilization can be expected.

Figure 30:
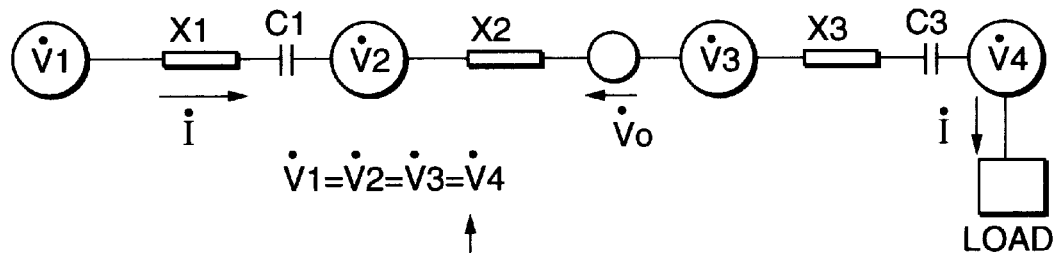
FIG. 30 is a voltage/current vector diagram to illustrate the operation of the system in FIG. 29.

FIG. 30 shows a transmission line equivalent circuit and a voltage/current vector diagram to explain the working of the system shown in FIG. 29.

In this diagram, I is the transmission line current, V1~V4 are the voltages at each substation, X1~X3 are the reactances of each transmission line, C1 and C3 are series capacitors, Vo is the output voltage of the compensation voltage generator, LOAD is the load, and ω is the power supply angular frequency.

The vector diagram of FIG. 30(b) shows that by this means it is possible to compensate the reactance of each transmission line to approximately zero, and to make voltages V1~V4 at each substation equal.

That is, in the transmission line between substations V1 and V2, reactance X1 of the transmission line is compensated for by series capacitor C1. In other words, if the current flowing in the transmission line is I, the capacitance of capacitor C1 is selected so that $$I/(j\omega C1) = -jX1 \cdot I$$

By this means V1 and V2 can be made equal.

In addition, in the transmission line between substations V2 and V3 reactance X2 of the transmission line is compensated for by compensation voltage Vo from a compensation voltage generator. In other words, if the current flowing in the transmission line is I, this gives compensation voltage Vo such that $$Vo = -jX2 \cdot I$$

By this means V2 and V3 can be made equal.

In the same way, in the transmission line between substations V3 and V4 reactance X3 of the transmission line is compensated for by series capacitor C3. In other words, if the current flowing in the transmission line is I, the capacitance of capacitor C3 is selected so that $$I/(j\omega C3) = -jX3 \cdot I$$

By this means V3 and V4 can be made equal.

In this way, as shown in the vector diagram of FIG. 30(*b*), the voltage at each substation can be made equal so that V1=V2=V3=V4.

In a long-distance AC transmission system, if compensation of all of the transmission line reactances is attempted using series capacitors alone, the system becomes unstable due to LC resonance. The compensation voltage generator functions to stabilize the system. By using only the minimum number of compensation voltage generators necessary, the system cost can be reduced and it is possible to provide a more economical long-distance AC transmission system.

Figure 31:
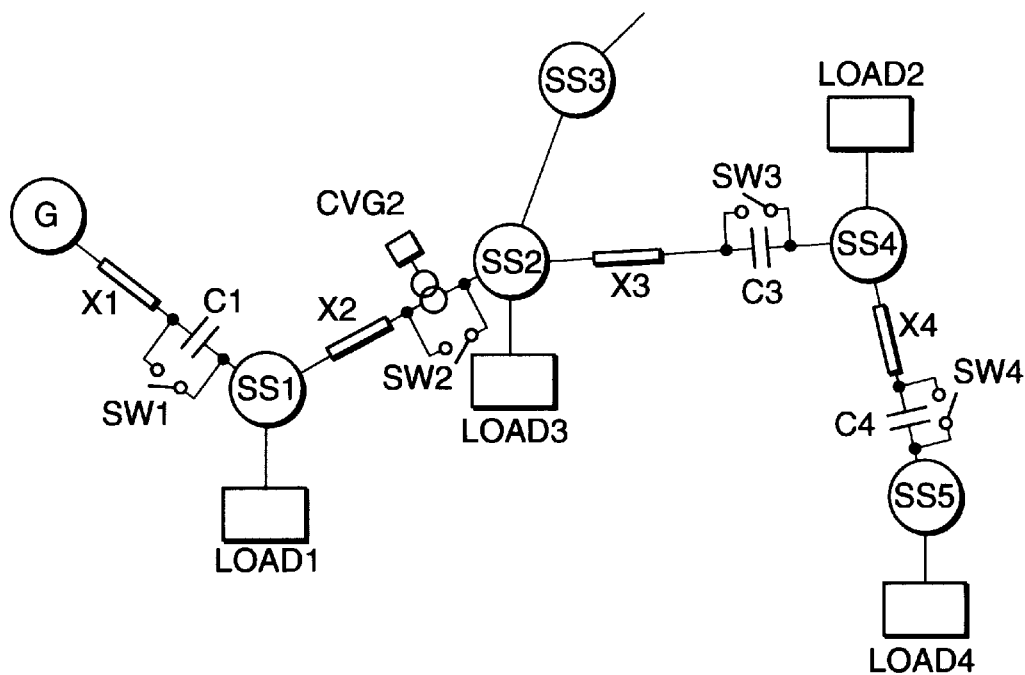
FIG. 31 is a block diagram showing a tenth embodiment of an AC long-distance power transmission system according to the present invention.

FIG. 31 is a block diagram showing a tenth embodiment of a long-distance AC transmission system of this invention.

In this diagram, G is a power station, SS1~SS5 are substations, LOAD1~LOAD4 are loads, C1, C3 and C4 are series capacitors, CVG2 is a compensation voltage generator, SW1~SW4 are bypass circuits, and X1~X4 are transmission line reactances.

Power generated at power station G is transmitted via multiple substations SS1→SS2→SS4→SS5 over a long distance to load LOAD4 comprising a major consumption area.

The value of series capacitor C1 is selected to compensate for reactance X1 of the transmission line between power station G and substation SS1, the value of series capacitor C3 is selected to compensate for reactance X3 of the transmission line between substation SS2 and substation SS4, and the value of series capacitor C4 is selected to compensate for reactance X4 of the transmission line between substation SS4 and substation SS5. In addition, compensation voltage generator CVG2 produces a voltage that compensates for reactance X2 between substation SS1 and substation SS2, and also inhibits and controls power oscillation throughout the whole transmission route.

By this means a reduction in the equivalent reactance of the whole of a long-distance transmission route that passes through multiple substations, an improvement in transmission capability, and moreover, power system stabilization can be expected.

If an overcurrent flows due to an incident such as a line-to-earth fault in the transmission line, bypass circuits SW1, SW3 and SW4 for series capacitors C1, C3 and C4, and bypass circuit SW2 for compensation voltage generator CVG2 close, and the overcurrent is made to flow through bypass circuits SW1~SW4. As a result, the reactances of the transmission lines can be returned to their original values X1~X4, and escalation of the overcurrent is prevented. In addition, the flow of overcurrent to the series capacitors, compensation voltage generator, and the like, can be prevented, and the reliability of the system can be improved.

Figure 32:
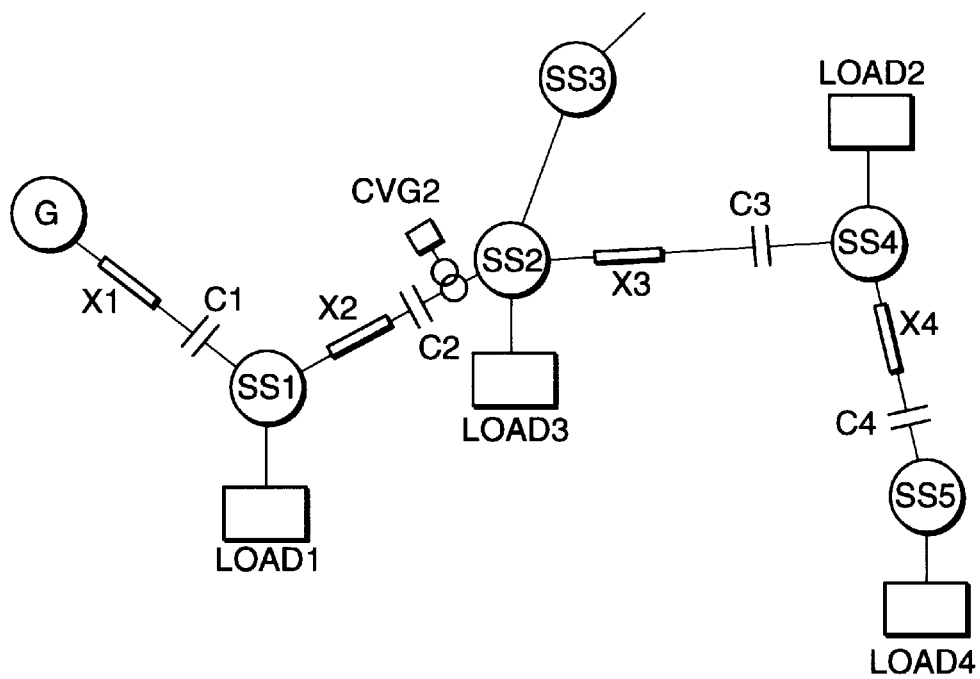
FIG. 32 is a block diagram showing an eleventh embodiment of an AC long-distance power transmission system according to the present invention.

FIG. 32 is a block diagram showing an eleventh embodiment of a long-distance AC transmission system of this invention.

In this diagram, G is a power station, SS1~SS5 are substations, LOAD1~LOAD4 are loads, C1, C3 and C4 are series capacitors, CVG2 is a compensation voltage generator, and X1~X4 are transmission line reactances.

Power generated at power station G is transmitted via multiple substations SS1→SS2→SS4→SS5 over a long distance to load LOAD4 comprising a major consumption area.

The value of series capacitor C1 is selected to compensate for reactance X1 of the transmission line between power station G and substation SS1, the value of series capacitor C3 is selected to compensate for reactance X3 of the transmission line between substation SS2 and substation SS4, and the value of series capacitor C4 is selected to compensate for reactance X4 of the transmission line between substation SS4 and substation SS5. In addition, series capacitor C2 and compensation voltage generator CVG2 produce a voltage that compensates for reactance X2 between substation SS1 and substation SS2, and also inhibits and controls power oscillation throughout the whole transmission route.

That is, when the reactance of the transmission route is regulated to approximately zero, compensation is carried out as follows.

First, in the transmission line between power station G and substation SS1, reactance X1 of the transmission line is compensated for by series capacitor C1. In other words, if the current flowing in the transmission line is I, the capacitance of capacitor C1 is selected so that $$I/(j\omega C1) = -jX1 \cdot I$$

The voltage at power station G and the voltage at substation SS1 can be made approximately equal by this means.

In addition, in the transmission line between substations SS1 and SS2, reactance X2 of the transmission line is compensated for by series capacitor C2 and compensation voltage generator CVG2. In other words, if the current flowing in the transmission line is I, the capacitance of capacitor C2 and compensation voltage Vo are selected so that $$Vo + I/(j\omega C2) = -jX2 \cdot I$$

The voltage at substation SS1 and the voltage at substation SS2 can be made approximately equal by this means.

In the transmission line between substations SS2 and SS4, reactance X3 of the transmission line is compensated for by series capacitor C3. In other words, if the current flowing in the transmission line is I, the capacitance of capacitor C3 is selected so that $$I/(j\omega C3) = -jX3 \cdot I$$

The voltage at substation SS2 and the voltage at substation SS4 can be made approximately equal by this means.

In the transmission line between substations SS4 and SS5, reactance X4 of the transmission line is compensated for by series capacitor C4. In other words, if the current flowing in the transmission line is I, the capacitance of capacitor C4 is selected so that $$I/(j\omega C4) = -jX4 \cdot I$$

The voltage at substation SS4 and the voltage at substation SS5 can be made approximately equal by this means.

By this means, a reduction in the equivalent reactance of the whole of a long-distance transmission route that passes through multiple substations, an improvement in transmission capability, and moreover, power system stabilization can be expected.

In long-distance AC transmission systems, if compensation of all of the transmission line reactances is attempted using series capacitors alone, the system becomes unstable due to LC resonance. The compensation voltage generator functions to stabilize the system. By using only the minimum number of compensation voltage generators necessary, the system cost can be reduced and it is possible to provide a more economical long-distance AC transmission system. Also, the capacity of the compensation voltage generator can be reduced if main series capacitor C2 is set to cancel out most of reactance X2 of the transmission line, because the steady-state current generated by the compensation current generator only needs to be small.

The diagram does not show them, but bypass circuits are provided for the series capacitors and the compensation voltage generator, so if an overcurrent is produced due to an incident such as a line-to-earth fault or the like in the transmission line, the overcurrent is made to flow via these bypass circuits. As a result, the reactances of the transmission lines can be returned to their original values, and escalation of the overcurrent prevented. In addition, the flow of overcurrent to the series capacitors, compensation voltage generator, and the like, can be prevented, and the reliability of the system improved.

Figure 33:
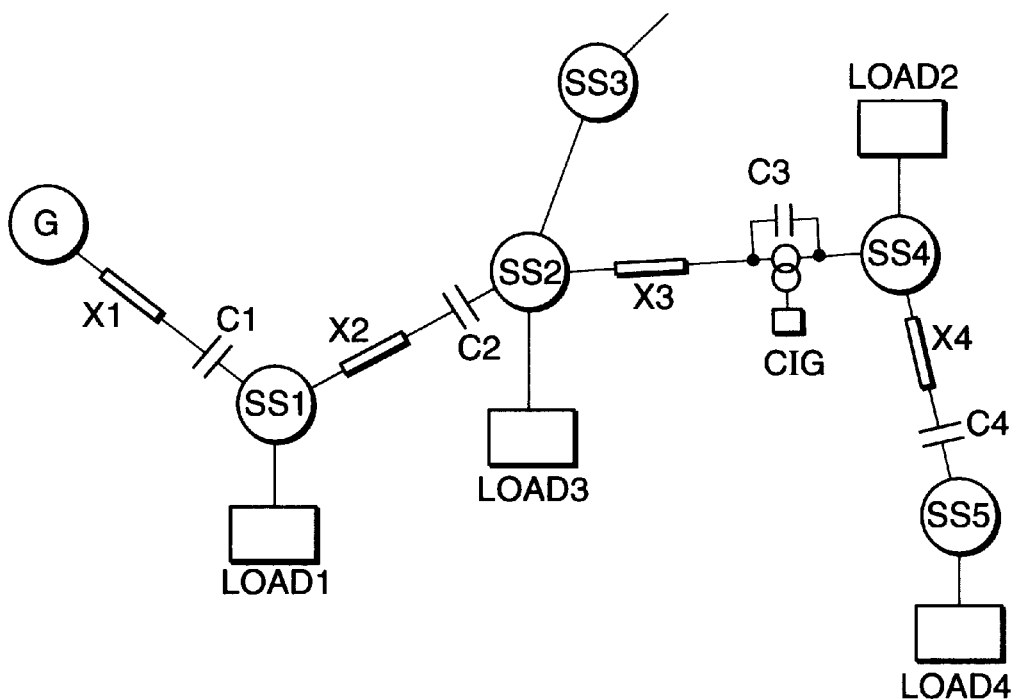
FIG. 33 is a block diagram showing a twelfth embodiment of an AC long-distance power transmission system according to the present invention.

FIG. 33 is a block diagram showing a twelfth embodiment of a long-distance AC transmission system of this invention.

In this diagram, G is a power station, SS1~SS5 are substations, LOAD1~LOAD4 are loads, C1, C2, C3 and C4 are series capacitors, CIG is a compensation current generator, and X1~X4 are transmission line reactances.

Power generated at power station G is transmitted via multiple substations SS1→SS2→SS4→SS5 over a long distance to load LOAD4 comprising a major consumption area.

The value of series capacitor C1 is selected to compensate for reactance X1 of the transmission line between power station G and substation SS1, the value of series capacitor C2 is selected to compensate for reactance X2 of the transmission line between substation SS1 and substation SS2, and the value of series capacitor C4 is selected to compensate for reactance X4 of the transmission line between substation SS4 and substation SS5. In addition, series capacitor C3 and compensation current generator CIG produce a voltage that compensates for reactance X3 between substation SS2 and substation SS4, and also inhibits and controls power oscillation throughout the whole transmission route.

That is, when the reactance of the transmission route is regulated to approximately zero, compensation is carried out as follows.

First, in the transmission line between power station G and substation SS1, reactance X1 of the transmission line is compensated for by series capacitor C1. In other words, if the current flowing in the transmission line is I, the capacitance of capacitor C1 is selected so that $$I/(j\omega C1) = -jX1 \cdot I$$

The voltage at power station G and the voltage at substation SS1 can be made approximately equal by this means.

In the transmission line between substations SS1 and SS2, reactance X2 of the transmission line is compensated for by series capacitor C2. In other words, if the current flowing in the transmission line is I, the capacitance of capacitor C2 is selected so that $$I/(j\omega C2) = -jX2 \cdot I$$

The voltage at substation SS1 and the voltage at substation SS2 can be made approximately equal by this means.

In addition, in the transmission line between substations SS2 and SS4, reactance X3 of the transmission line is compensated for by series capacitor C3 and compensation current generator CIG. In other words, if the current flowing in the transmission line is I and the compensation current from the compensation current generator CIG is Ic, the capacitance of capacitor C3 and compensation current Ic are selected so that $$(Ic+I)/(j\omega C3) = -jX3 \cdot I$$

The voltage at substation SS2 and the voltage at substation SS4 can be made approximately equal by this means.

In the transmission line between substations SS4 and SS5, reactance X4 of the transmission line is compensated for by series capacitor C4. In other words, if the current flowing in the transmission line is I, the capacitance of capacitor C4 is selected so that $$I/(j\omega C4) = -jX4 \cdot I$$

The voltage at substation SS4 and the voltage at substation SS5 can be made approximately equal by this means.

By this means, a reduction in the equivalent reactance of the whole of a long-distance transmission route that passes through multiple substations, an improvement in transmission capability, and moreover, power system stabilization can be expected.

In long-distance AC transmission systems, if compensation of all of the transmission line reactances is attempted using series capacitors alone, the system becomes unstable due to LC resonance. The compensation current generator functions to stabilize the system. By using only the minimum number of compensation current generators necessary, the system cost can be reduced and it is possible to provide a more economical long-distance AC transmission system.

Figure 34:
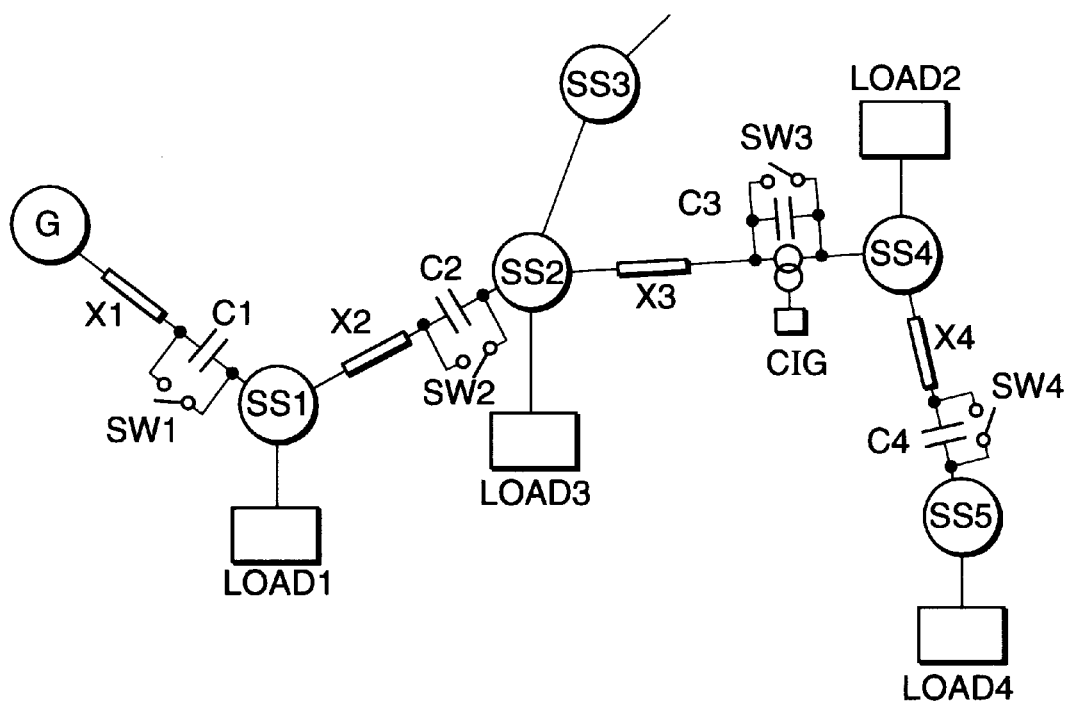
FIG. 34 is a block diagram showing a thirteenth embodiment of an AC long-distance power transmission system according to the present invention.

FIG. 34 is a block diagram showing a thirteenth embodiment of a long-distance AC transmission system of this invention.

In this diagram, G is a power station, SS1~SS5 are substations, LOAD1~LOAD4 are loads, C1, C2, C3 and C4 are series capacitors, CIG is a compensation current generator, SW1~SW4 are bypass circuits, and X1~X4 are transmission line reactances.

Power generated at power station G is transmitted via multiple substations SS1→SS2→SS4→SS5 over a long distance to load LOAD4 comprising a major consumption area.

The value of series capacitor C1 is selected to compensate for reactance X1 of the transmission line between power station G and substation SS1, the value of series capacitor C2 is selected to compensate for reactance X2 of the transmission line between substation SS1 and substation SS2, and the value of series capacitor C4 is selected to compensate for reactance X4 of the transmission line between substation SS4 and substation SS5. In addition, series capacitor C3 and compensation current generator CIG produce a voltage that compensates for reactance X3 between substation SS2 and substation SS4, and also inhibits and controls power oscillation throughout the whole transmission route.

By this means, a reduction in the equivalent reactance of the whole of a long-distance transmission route that passes through multiple substations, an improvement in transmission capability, and moreover, power system stabilization can be expected.

If an overcurrent flows due to an incident such as a line-to-earth fault or the like in the transmission line, bypass circuits SW1, SW2, SW3 and SW4 for series capacitors C1, C2, C3 and C4 close, and the overcurrent is made to flow through bypass circuits SW1~SW4. As a result, the reactances of the transmission lines can be returned to their original values, X1~X4, and escalation of the overcurrent is prevented. In addition, the flow of overcurrent to the series capacitors, compensation voltage generator, and the like, can be prevented, and the reliability of the system can be improved.

Figure 35:
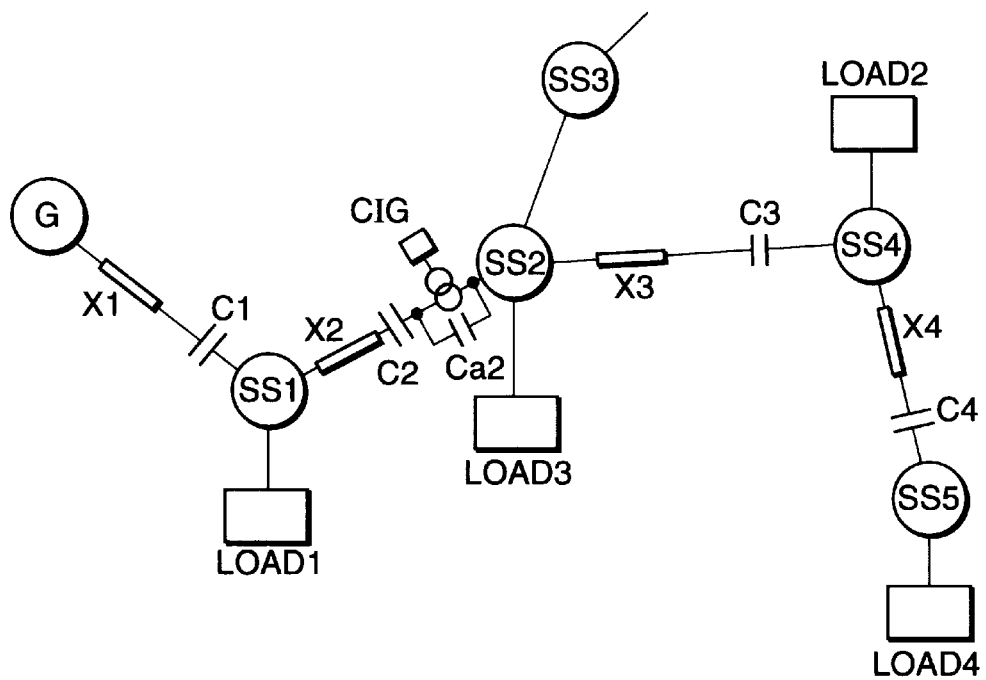
FIG. 35 is a block diagram showing a fourteenth embodiment of an AC long-distance power transmission system according to the present invention.

FIG. 35 is a block diagram showing a fourteenth embodiment of a long-distance AC transmission system of this invention.

In this diagram, G is a power station, SS1~SS5 are substations, LOAD1~LOAD4 are loads, C1, C2, C3 and C4 are main series capacitors, Ca2 is an auxiliary series capacitor, CIG is a compensation current generator, and X1~X4 are transmission line reactances.

Power generated at power station G is transmitted via multiple substations SS1→SS2→SS4→SS5 over a long distance to load LOAD4 comprising a major consumption area.

The value of main series capacitor C1 is selected to compensate for reactance X1 of the transmission line between power station G and substation SS1, the values of main series capacitor C2, auxiliary series capacitor Ca2, and compensation current generator CIG are selected to compensate for reactance X2 of the transmission line between substation SS1 and substation SS2, the value of main series capacitor C3 is selected to compensate for reactance X3 of the transmission line between substation SS2 and substation SS4, and the value of main series capacitor C4 is selected to compensate for reactance X4 of the transmission line between substation SS4 and substation SS5. In addition, auxiliary series capacitor Ca2 and compensation current generator CIG inhibit and control power oscillation throughout the whole transmission route.

That is, when the reactance of the transmission route is regulated to approximately zero, compensation is carried out as follows.

First, in the transmission line between power station G and substation SS1, reactance X1 of the transmission line is compensated for by main series capacitor C1. In other words, if the current flowing in the transmission line is I, the capacitance of main series capacitor C1 is selected so that $$I/(j\omega C1) = -jX1 \cdot I$$

The voltage at power station G and the voltage at substation SS1 can be made approximately equal by this means.

In addition, in the transmission line between substations SS1 and SS2, reactance X2 of the transmission line is compensated for by main series capacitor C2, auxiliary series capacitor Ca2, and compensation current generator CIG. In other words, if the current flowing in the transmission line is I and the compensation current from the compensation current generator CIG is Ic, the capacitance of main capacitor C2, the capacitance of auxiliary series capacitor Ca2, and compensation current Ic are selected so that $$I/(j\omega C2) + (Ic+I)/(j\omega Ca2) = -jX2 \cdot I$$

The voltage at substation SS1 and the voltage at substation SS2 can be made approximately equal by this means.

In the transmission line between substations SS2 and SS4, reactance X3 of the transmission line is compensated for by main series capacitor C3. In other words, if the current flowing in the transmission line is I, the capacitance of main series capacitor C3 is selected so that $$I/(j\omega C3) = -jX3 \cdot I$$

The voltage at substation SS2 and the voltage at substation SS4 can be made approximately equal by this means.

In the transmission line between substations SS4 and SS5, reactance X4 of the transmission line is compensated for by main series capacitor C4. In other words, if the current flowing in the transmission line is I, the capacitance of main series capacitor C4 is selected so that $$I/(j\omega C4) = -jX4 \cdot I$$

The voltage at substation SS4 and the voltage at substation SS5 can be made approximately equal by this means.

By this means, a reduction in the equivalent reactance of the whole of a long-distance transmission route that passes through multiple substations, an improvement in transmission capability, and moreover, power system stabilization can be expected.

In long-distance AC transmission systems, if compensation of all of the transmission line reactances is attempted using main series capacitors alone, the system becomes unstable due to LC resonance. The auxiliary series capacitor and the compensation current generator function to stabilize the system. By using only the minimum number of auxiliary series capacitors and compensation current generators necessary, the system cost can be reduced and it is possible to provide a more economical long-distance AC transmission system. Also, the capacity of the compensation current generator can be reduced if main series capacitor C2 is set to cancel out most of reactance X2 of the transmission line, because the steady-state current generated by the compensation current generator only needs to be small.

Figure 36:
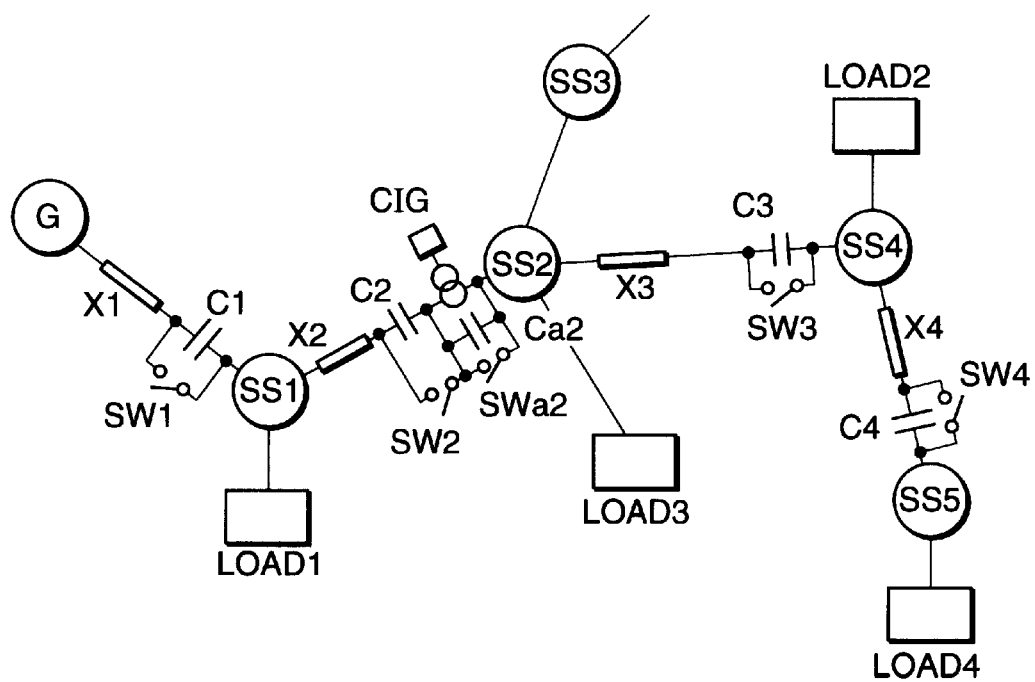
FIG. 36 is a block diagram showing a fifteenth embodiment of an AC long-distance power transmission system according to the present invention.

FIG. 36 is a block diagram show a fifteenth embodiment of a long-distance AC transmission system of this invention.

In this diagram, G is a power station, SS1~SS5 are substations, LOAD1~LOAD4 are loads, C1, C2, C3 and C4 are main series capacitors, Ca2 is an auxiliary series capacitor, CIG is a compensation current generator, SW1~SW4 and Swa2 are bypass circuits, and X1~X4 are transmission line reactances.

Power generated at the power station G is transmitted via multiple substations SS1→SS2→SS4→SS5 over a long distance to load LOAD4 comprising a major consumption area.

The value of main series capacitor C1 is selected to compensate for reactance X1 of the transmission line between power station G and substation SS1, the values of main series capacitor C2, auxiliary series capacitor Ca2, and compensation current generator CIG are selected to compensate for reactance X2 of the transmission line between substation SS1 and substation SS2, the value of main series capacitor C3 is selected to compensate for reactance X3 of the transmission line between substation SS2 and substation SS4, and the value of main series capacitor C4 is selected to compensate for reactance X4 of the transmission line between substation SS4 and substation SS5. In addition, auxiliary series capacitor Ca2 and compensation current generator CIG inhibit and control power oscillation throughout the whole transmission route.

By this means, a reduction in the equivalent reactance of the whole of a long-distance transmission route that passes through multiple substations, an improvement in transmission capability, and moreover, power system stabilization can be expected.

If an overcurrent flows due to an incident such as a line-to-earth fault or the like in the transmission line, bypass circuits SW1, SW2, SW3 and SW4 for main series capacitors C1, C2, C3 and C4 and bypass circuit Swa2 for auxiliary series capacitor Ca2 close, and the overcurrent is made to flow through bypass circuits SW1~SW4 and Swa2. As a result, the reactances of the transmission lines can be returned to their original values, X1~X4, and escalation of the overcurrent is prevented. In addition, the flow of overcurrent to the main series capacitors, auxiliary series capacitor, compensation voltage generator, and the like, can be prevented, and the reliability of the system can be improved.

Figure 37:
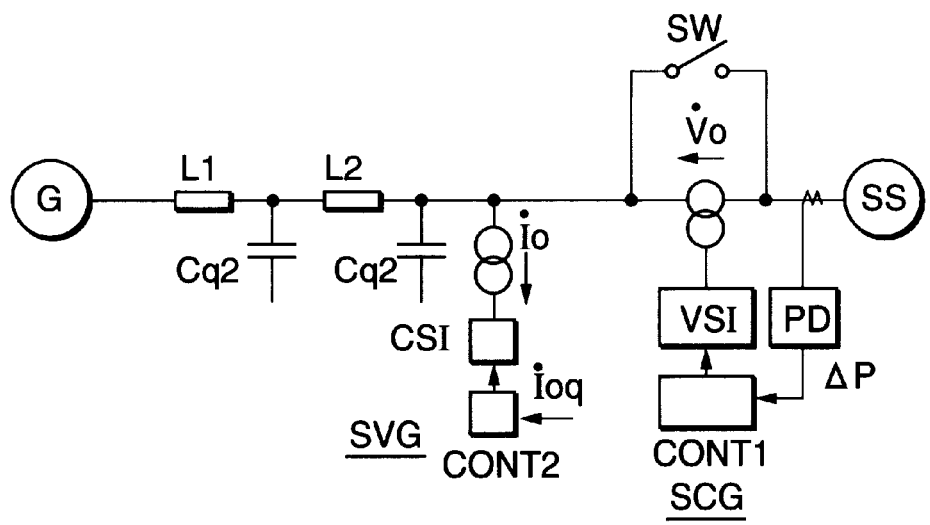
FIG. 37 is a block diagram showing a sixteenth embodiment of an AC long-distance power transmission system according to the present invention.

FIG. 37 is a block diagram showing a sixteenth embodiment of a long-distance AC transmission system of this invention.

In this diagram, G is a power station, SS is a substation, L1 and L2 are transmission line inductances, Cq1 and Cq2 are transmission line floating capacitances, SVG is a static var generator, SCG is a series compensation generator, SW is a bypass circuit, CSI is a current source inverter, VSI is a voltage source inverter, PD is a power detector, CONT1 is a VSI control circuit, and CONT2 is a CSI control circuit.

Floating capacitances exist between transmission lines and between transmission lines and earth, and when transmitting power over long distances these cannot be ignored. Floating capacitances are distributed constants, but here they will be expressed as centralized constants Cq1 and Cq2. In addition, the transmission line inductance is also shown divided into two parts, L1 and L2. Leading current Iq flows in floating capacitances Cq1 and Cq2, and static var generator SVG is provided to compensate for these leading currents. Also, series compensation generator SCG is provided to compensate for transmission line inductance L1+L2.

Series compensation generator SCG outputs the following compensation voltage Vo in order to compensate for the voltage drop due to the transmission line inductance L1+L2. I is the current flowing in the transmission line.

$$Vo = -j\omega(L1+L2)\cdot I$$

In addition, static var generator SVG causes compensation current Io to flow to cancel out leading current Iq that flows in floating capacitances Cq1 and Cq2.

By this means the equivalent reactance of transmission lines can be regulated, and the transmission capability of long-distance transmission lines greatly improved.

If an overcurrent flows due to an incident such as a line-to-earth fault or the like in the transmission line, bypass circuit SW connected in parallel with series compensation generator SCG closes, and the overcurrent is caused to flow through bypass circuit SW. As a result, reactance $X=\omega(L1+L2)$ of the transmission line can be returned to its original value, and escalation of the overcurrent prevented. In addition, the flow of overcurrent to the series compensation generator can be prevented, and the reliability of the system can be improved.

Figure 38:
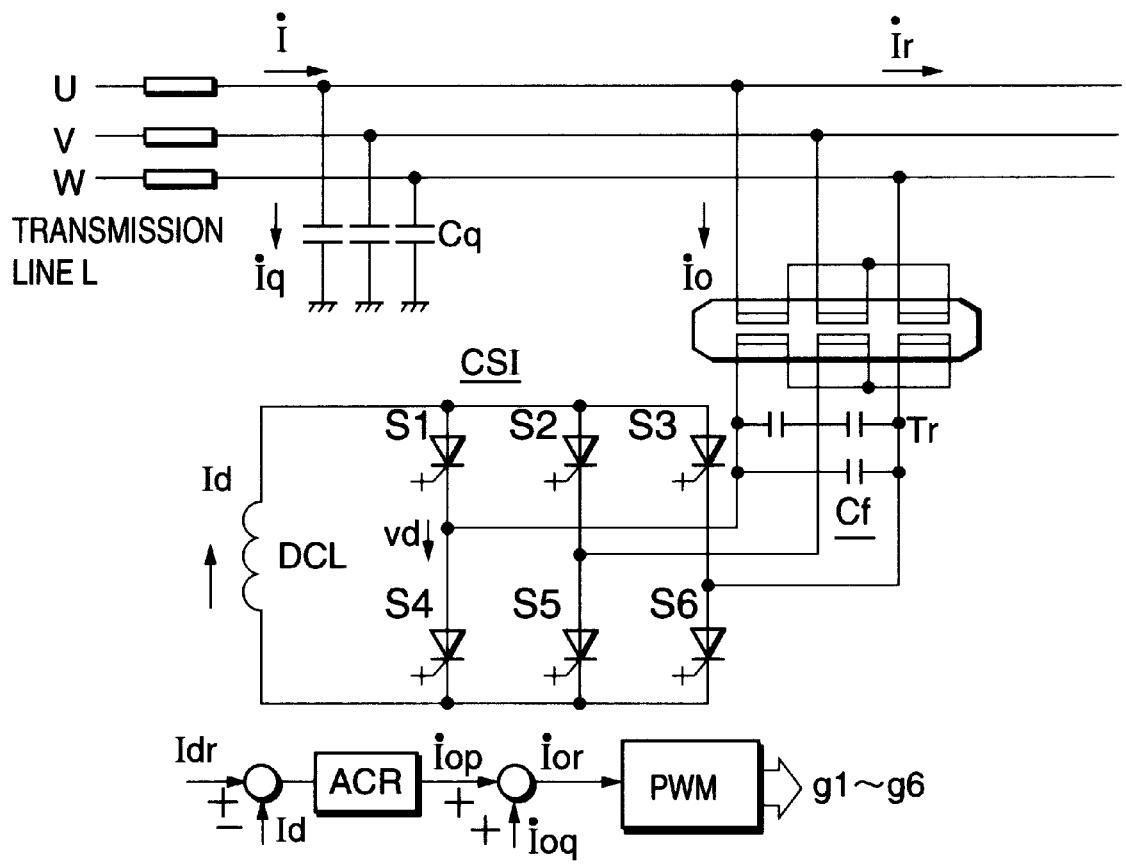
FIG. 38 is a block diagram showing an embodiment of a static var generator of the system in FIG. 37.

FIG. 38 is a block diagram that shows the embodiment of the static var generator of the system shown in FIG. 37.

In this diagram, UVW is a three-phase AC transmission line, L is the inductance of the transmission line, Cq is the floating capacitance, Tr is a series transformer, CSI is a current source inverter, DCL is a DC reactor, Cf is a filter capacitor, ACR is a DC current control circuit, and PWMC is a pulse width modulation (PWM) control circuit.

The static var generator is composed of parallel transformer Tr, filter capacitor Cf, and current source inverter CSI, and supplies compensation current Io of any size and phase to the transmission line.

Current source inverter CSI is composed of six self-turn-off devices (for example GTOs), and outputs compensation current Io proportional to current command value Ior by means of PWM control. Harmonic current arises in the output current of the inverter, due to switching, and filter capacitor Cf is provided to absorb this.

DC reactor DCL is connected as the DC current source for current source inverter CSI, and feedback control is carried out to make current Id that flows in DC reactor DCL equal to command value Idr. That is, when actual current Id falls to less than command value Idr, the deviation is a positive value and is amplified via the current control circuit ACR. Output Iop from ACR is an active current command value, and if Idr>Id, deviation ε will be positive, Iop>0, and DC current Id will be increased because active current is removed from the system. Conversely, if Idr<Id, deviation ε will be negative, and Iop will be a negative value. Accordingly, active current is released into the system so the DC current is reduced. In this way DC current Id of the current source inverter can be kept approximately constant.

In the diagram, Ioq is the steady-state reactive current command value, and by regulating this value it is possible to cancel out leading current Iq that flows in the floating capacitance of the transmission line.

Figure 39:
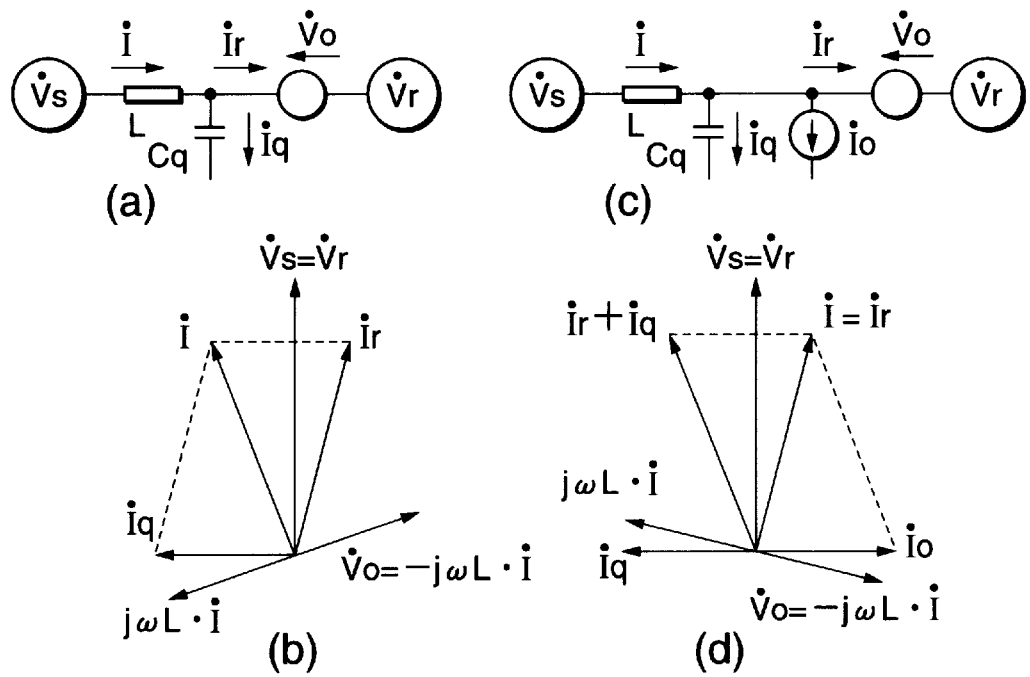
FIG. 39 is a voltage/current vector diagram to illustrate the operation of the system in FIG. 37.

FIG. 39 shows voltage/current vector diagrams provided to explain the operation of the system shown in FIG. 37. FIG. 39(*a*) and (*b*) show an equivalent circuit and a voltage/current vector diagram for a transmission line without a static var generator, whereas FIG. 39(*c*) and (*d*) show an equivalent circuit and a voltage/current vector diagram for a transmission line which includes a static var generator.

In this diagram, Vs is the transmitting-side voltage, Vr is the receiving-side voltage, L is the inductance in the transmission line, I is the transmitting-side current, Ir is the receiving-side current, Vo is the output voltage of the compensation voltage generator, Iq is the leading current that flows in the floating capacitance of the transmission line, Io is the compensation current generated from the static var generator, and ω is the power supply angular frequency.

In the vector diagram of FIG. 39(*b*), receiving-side current Ir and transmitting-side current I become different because leading current Iq flows in floating capacitance Cq of the transmission line. Hypothesizing from the equivalent circuit shown in FIG. 39(*a*), the voltage drop jωL·I due to inductance L of the transmission line will be approximately orthogonal to current I. On the other hand, compensation is carried out so that the voltage drop due to inductance L of the transmission line is cancelled out by series compensation generator SCG, in order to make transmitting-side voltage Vs and receiving-side voltage Vr approximately equal. To achieve this it is necessary that Vo=−jωL·I, where Vo is the compensation voltage output from the series compensation generator. Because the vector of compensation voltage Vo is 90° out of phase relative to receiving-side current Ir, active power must be constantly supplied (or regenerated) from the series compensation generator. Accordingly, an energy supply source (or an energy regeneration source) is needed in the compensation voltage generator, and this will require a larger generator and lead to higher costs.

In the vector diagram of FIG. 39(*d*), compensation current Io is supplied from static var generator SVG to cancel out leading current Iq flowing in the floating capacitance. As a result, transmitting-side current I and receiving-side current Ir become equal, and compensation voltage vector Vo supplied from series compensation generator SCG to cancel out the voltage drop due to inductance L in the transmission line becomes orthogonal to the I=Ir vector. Accordingly, in the steady state, the active power exchanged with the series compensation generator is zero, and it is no longer necessary to include an energy supply source (or an energy regeneration source).

Static var generator SVG can also compensate for harmonic current flowing in the transmission line, and provide a compensation current that balances unbalanced three-phase current. As a result, the transmission capability of the transmission line will be improved, and moreover, the load on series compensation generator SCG will be reduced, and a more economical long-distance AC transmission system can be provided.

Figure 40:
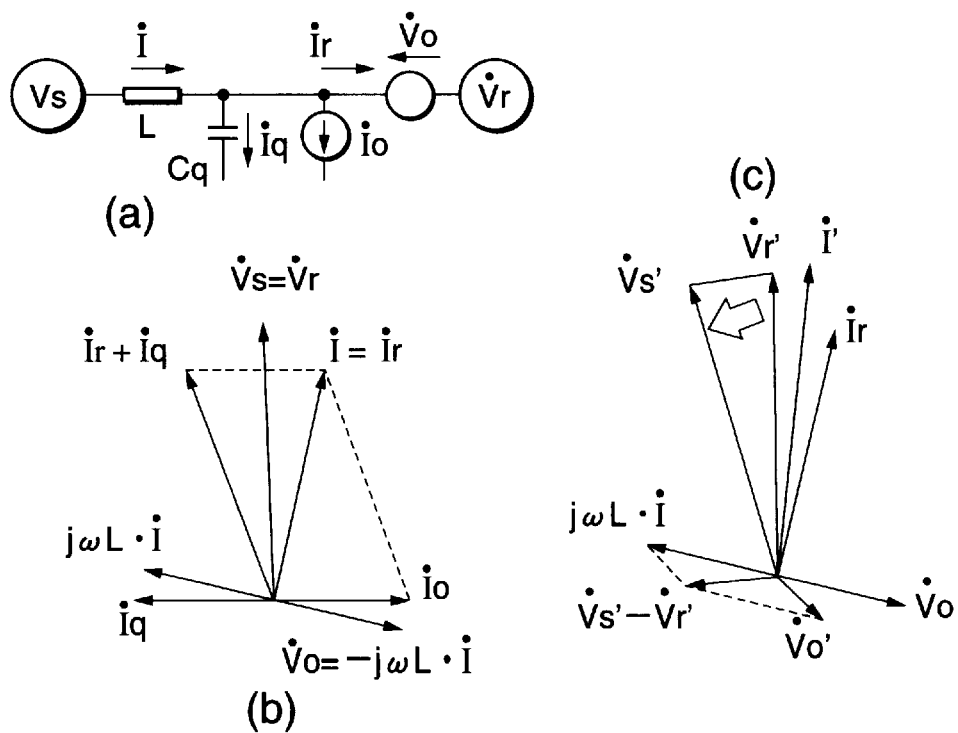
FIG. 40 is a voltage/current vector diagram to illustrate the power oscillation suppressing action of the system in FIG. 37.

FIG. 40 shows voltage/current vector diagrams provided to explain the power oscillation inhibiting action of the system shown in FIG. 37. FIG. 40(a) shows a transmission line equivalent circuit, (b) shows a voltage/current vector diagram in the steady state, and (c) shows a voltage/current vector diagram when the transmission line power has fluctuated.

In the diagrams, Vs is the transmitting-side voltage, Vr is the receiving-side voltage, L is the inductance in the transmission line, I is the transmitting-side current, Ir is the receiving-side current, Vo is the output voltage of the compensation voltage generator, Iq is the leading current that flows in the floating capacitance of the transmission line, Io is the compensation current generated from the static var generator, and $\omega$ is the power supply angular frequency.

In the steady-state situation shown in FIG. 40(b), compensation current Io is supplied from static var generator SVG to cancel out leading current Iq flowing in the floating capacitance. In addition, series compensation generator SCG outputs voltage Vo to compensate for voltage drop $j\omega L \cdot I$ due to inductance L of the transmission line. As a result, the size and phase of transmitting-side voltage Vs and receiving-side voltage Vr are equal, and long-distance transmission that is unaffected by the inductance of the transmission line is achieved.

FIG. 40(c) is a vector diagram showing a situation in which the power in the transmission line has fluctuated due to the effects of an incident such as a line-to-earth fault or the like, and explains, for example, the action that occurs when the phase of the transmitting-side voltage has deviated, as in Vs'. If the phase of the transmitting-side voltage has deviated, as in Vs', voltage difference Vs'-Vr occurs, and the transmission current that up to this point was I=Ir attempts to increase to I'. As a result, both active power P and reactive power Q of the transmission line change. The changes are detected as $\Delta P$ and $\Delta Q$, and these changes control compensation voltage Vo of series compensation generator SCG. In concrete terms, the power fluctuation can be rapidly inhibited by controlling compensation voltage component Voq orthogonal to the current Ir in the transmission line in proportion to active power change $\Delta P$, and controlling compensation voltage component Vop in-phase (or in reverse phase) to current Ir in the transmission line in proportion to reactive power change $\Delta Q$.

In other words, in FIG. 40(c), it is possible to inhibit the power oscillation because, in response to the change in transmitting-side voltage Vs', compensation voltage Vo instantly changes to Vo', and as a result, the voltage applied to the inductance of the transmission line is maintained at its original value $j\omega L \cdot I$, and the current becomes I=Ir. Even in this situation static var generator SVG works to cancel out leading current Iq flowing in the floating capacitance, and this assists the action of series compensation generator SCG.

Figure 41:
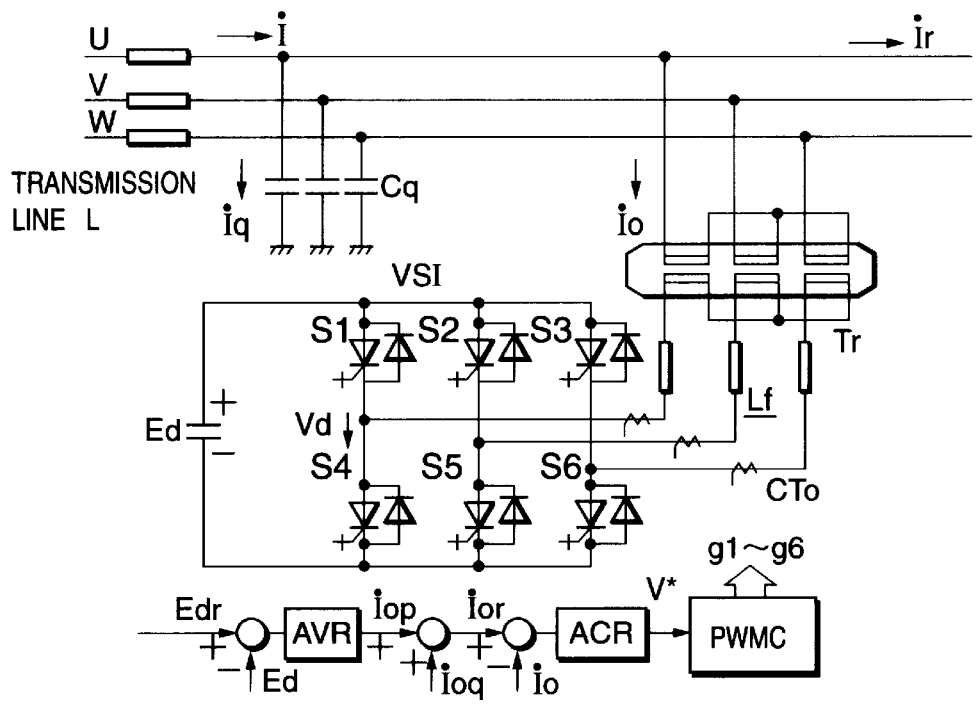
FIG. 41 is a block diagram showing a further modification of the static var generator of the system in FIG. 37.

FIG. 41 is a block diagram that shows the modification of the static var generator of the system shown in FIG.37.

In this diagram, UVW is a three-phase AC transmission line, L is the inductance of the transmission line, Cq is the floating capacitance, Tr is a parallel transformer, VSI is a current-controlled voltage source inverter, Ed is a DC voltage source, Lf is a filter reactor, AVR is a DC voltage control circuit, and PWMC is a pulse width modulation (PWM) control circuit.

The static var generator is composed of parallel transformer Tr, filter reactor Lf, and current controlled voltage source inverter VSI, and supplies compensation current Io of any size and phase to the transmission line.

Current controlled voltage source inverter VSI is composed of six self-turn-off devices (for example GTOs) and six diodes connected in parallel to these devices. Output current Io of inverter VSI is detected by current detector CTo, compared to command value Ior, and any deviation $\epsilon$ amplified by current control circuit ACR. The output of ACR is input into PWM control circuit PWMC as voltage command value v*. Using PWM control, the inverter outputs voltage Vi proportional to voltage command value v*. Filter reactors Lf are provided for each phase, and these perform the role of inhibiting pulsation in inverter output current Io.

In this way, current controlled voltage source inverter VSI controls output current Io so that it is equal to compensation current command value Ior, and supplies the necessary compensation current Io to the transmission line.

As DC voltage source Ed for current controlled voltage source inverter VSI, a separate power source may be provided, but here DC smoothing capacitor Cd is used, and this is controlled so that its voltage is approximately constant. That is, voltage Ed applied to DC smoothing capacitor Cd is detected and compared with command value Edr, and feedback control is carried out to make these voltages equal. If actual voltage Ed is less than command value Edr the deviation is a positive value, and this is amplified via voltage control circuit AVR. Output Iop of AVR is an active current command value, so if Edr>Ed, deviation $\epsilon V$ (not shown in the diagram) will be positive, Iop>0, active current will be taken from the system, and DC voltage Ed will be increased. Conversely, if Edr<Ed, deviation $\epsilon v$ will be negative, and active current command value Iop will be a negative value. Accordingly, active current is released into the system and DC voltage Ed will be reduced. In this way DC voltage Ed of the current controlled voltage source inverter can be kept approximately constant.

In the diagram, Ioq is the steady-state reactive current command value, and by regulating this value it is possible to cancel out leading current Iq that flows in the floating capacitance of the transmission line.

Figure 42:
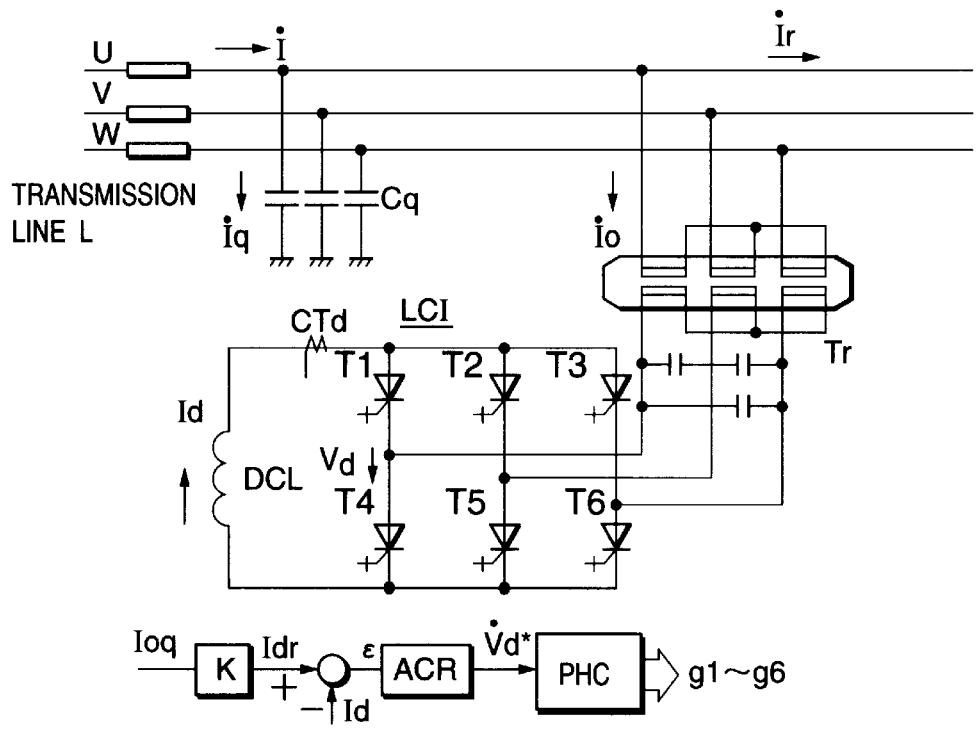
FIG. 42 is a block diagram showing yet a further modification of the static var generator of the system in FIG. 37.

FIG. 42 is a block diagram that shows a different modification example of static var generator SVG of the system shown in FIG. 37.

In this diagram, UVW is a three-phase AC transmission line, L is inductance of the transmission line, Cq is the floating capacitance, Tr is a parallel transformer, LCI is an externally-commutated inverter, DCL is a DC reactor, K is a proportional element, ACR is a current control circuit, and PHC is a phase control circuit.

The static var generator is composed of parallel transformer Tr and externally-commutated inverter LCI, and supplies compensation current Io to the transmission line.

Current source externally-commutated inverter LCI is composed of six thyristors T1~T6, and using phase control, controls DC side voltage Vd of DCL. The size of compensation current Io is proportional to DC current Id, and phase angle α of the compensation current relative to the voltage of the system is equal to the turning-on control angle of the LCI.

In externally-commutated inverter LCI, because thyristors T1~T6 cause natural commutation utilizing the power source voltage, above-mentioned phase angle α is controlled to within the range 0°~180°, and usually takes lagging current Io.

DC reactor DCL is connected as the DC current source for externally-commutated inverter LCI, and feedback control is carried out to make current Id flowing in DC reactor DCL equal command value Idr. That is, DC current command value Idr proportional to compensation current command value Ioq is given, this is compared with detected DC current value Id, and any deviation ε amplified via current control circuit ACR. ACR output signal vd* is given to phase control circuit PHC, and, using phase control, DC voltage Vd proportional to signal vd* is generated. If Idr>Id, deviation ε will be positive, vd*>0, and DC current Id will be increased. Conversely, if Idr<Id, deviation ε will be negative, vd*<0, and DC current Id will be reduced. In this way DC current Id of externally-commutated inverter LCI can be controlled so that it equals command value Idr. In the steady state, Vd* will be approximately zero, phase angle α of compensation current Io will be approximately 90°, and compensation current Io will be a lagging current.

In the diagram, Ioq is the steady-state reactive current command value, and by regulating this value it is possible to cancel out leading current Iq that flows in the floating capacitance of the transmission line.

Figure 43:
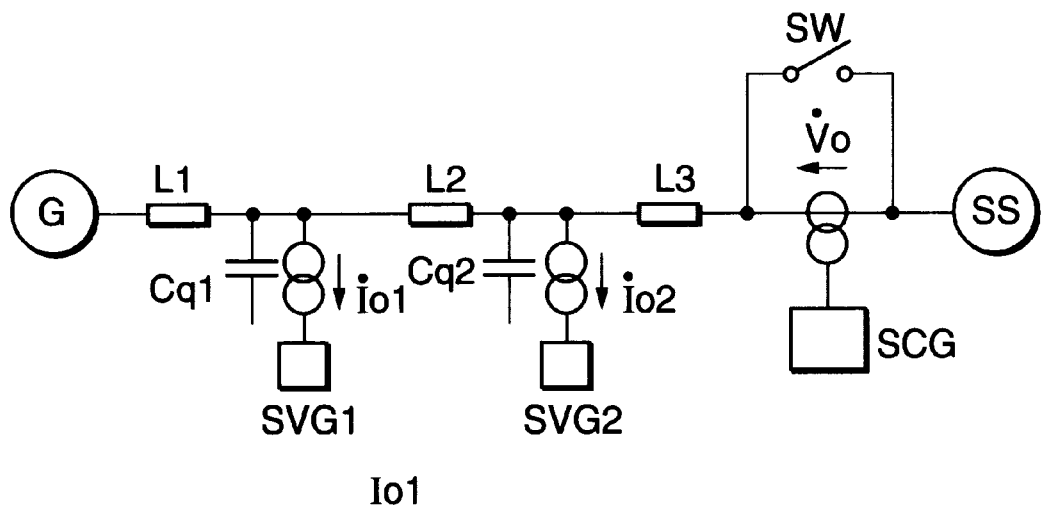
FIG. 43 is a block diagram showing a seventeenth embodiment of an AC long-distance power transmission system according to the present invention.

FIG. 43 is a block diagram showing a seventeenth embodiment of a long-distance AC transmission system of this invention.

In this diagram, G is a power station, SS is a substation, L1, L2 and L3 are transmission line inductances, Cq1 and Cq2 are transmission line floating capacitances, SVG1 and SVG2 are static var generators, SCG is a series compensation generator, and SW is a bypass circuit.

Floating capacitances exist between transmission lines and between transmission lines and earth, and when transmitting power over long distances these cannot be ignored. Floating capacitances are distributed constants, but here they will be expressed as centralized constants Cq1 and Cq2. In addition, the transmission line inductance is also shown divided into three parts, L1, L2 and L3. Leading currents Iq1 and Iq2 flow in floating capacitances Cq1 and Cq2, and static var generators SVG1 and SVG2 are provided to compensate for these leading currents. Also, series compensation generator SCG is provided to compensate for transmission line inductance L1+L2+L3.

Series compensation generator SCG outputs the following compensation voltage Vo in order to compensate for the voltage drop due to transmission line inductance L1+L2+L3.

$$Vo = -j\omega(L1+L2+L3) \cdot I$$

Here, the series compensation stated above works effectively when the same current I is flowing in the transmission line inductances L1, L2 and L3.

As stated above, transmission line floating capacitances are actually distributed constants, and due to the leading current flowing in these floating capacitances, the current flowing in above-mentioned transmission line inductances L1, L2 and L3 will not be the same.

To deal with this situation, two static var generators SVG1 and SVG2 are used, and these are distributed to different locations. Accordingly, static var generator SVG1 compensates for leading current Iq1 flowing in transmission line floating capacitance Cq1, and static var generator SVG2 compensates for leading current Iq2 flowing in transmission line floating capacitance Cq2. By this means, current I flowing in the transmission line can be equalized, and the above-mentioned compensation for the transmission line inductances using series compensation generator SCG can be used effectively. Even greater equalization of transmission current I can be expected if a larger number of static var generators are distributed along the transmission line. By this means the equivalent reactance of the transmission line can be regulated, and it is possible to greatly improve the transmission capability of long-distance transmission lines.

If an overcurrent flows due to an incident such as a line-to-earth fault or the like in the transmission line, bypass circuit SW connected in parallel with series compensation generator SCG closes, and the overcurrent is caused to flow through bypass circuit SW. As a result, reactance X=ω(L1+L2+L3) of the transmission line can be returned to its original value, and escalation of the overcurrent prevented. In addition, the flow of overcurrent to the series compensation generator can be prevented, and the reliability of the system can be improved.

Figure 44:
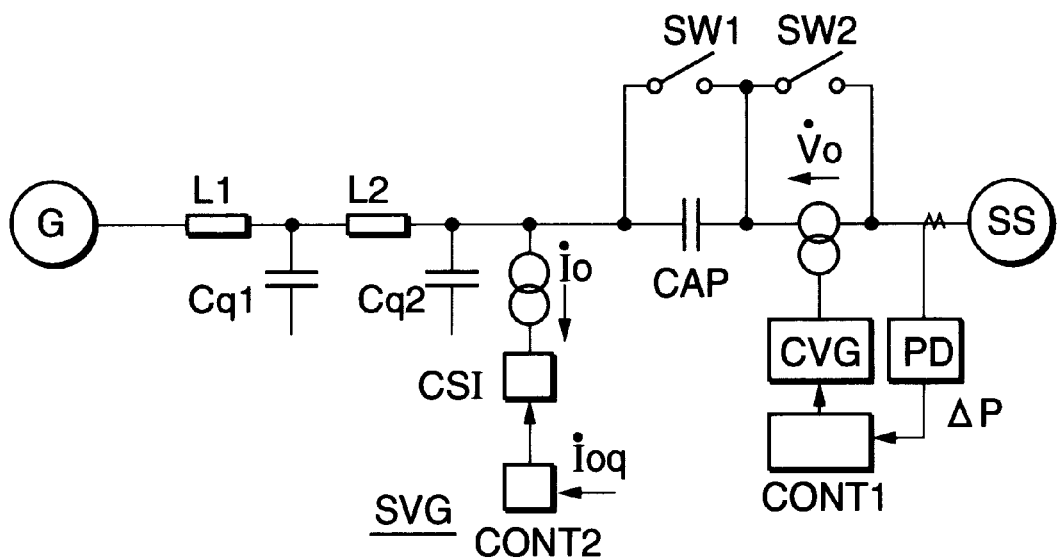
FIG. 44 is a block diagram showing an eighteenth embodiment of an AC long-distance power transmission system according to the present invention.

FIG. 44 is a block diagram showing an eighteenth embodiment of a long-distance AC transmission system of the present invention.

In this diagram, G is a power station, SS is a substation, L1 and L2 are transmission line inductances, Cq1 and Cq2 are transmission line floating capacitances, SVG is a static var generator, CAP is a series capacitor, CVG is a compensation voltage generator, SW1 and SW2 are bypass circuits, CSI is a current source inverter, PD is a power detector, CONT1 is a CVG control circuit, and CONT2 is a CSI control circuit respectively.

Floating capacitances exist between transmission lines and between transmission lines and earth, and when transmitting power over long distances these cannot be ignored. Floating capacitances are distributed constants, but here for the sake of convenience they will be expressed as centralized constants Cq1 and Cq2. In addition, the transmission line inductance is also shown divided into two parts, L1 and L2. Leading current Iq flows in floating capacitances Cq1 and Cq2, and static var generator SVG is provided to compensate for these leading currents. Also, series capacitor CAP and compensation voltage generator CVG are provided to compensate for transmission line inductance L1+L2.

The capacitance of series capacitor CAP is selected so that it cancels out most of inductance L1+L2 of the transmission line. In addition, compensation voltage generator CVG generates compensation voltage Vo to regulate the equivalent reactance of the transmission line and inhibit power oscillation. When the equivalent reactance of the transmission line has been compensated to zero, compensation voltage Vo in the steady-state is expressed in the following expression. Where C is the capacitance of series capacitor CAP, and I is the current flowing in the transmission line:

$$Vo = -jI\{\omega(L1+L2) - 1/(\omega C)\}$$

In addition, static var generator SVG causes compensation current Io to flow to cancel out leading currents Iq that flow in floating capacitances Cq1 and Cq2. As a result, the transmitting-side current and the receiving-side current are made approximately equal, and series capacitor CAP and compensation voltage generator CVG operate effectively.

By this means the equivalent reactance of transmission lines can be regulated, and the transmission capability of long-distance transmission lines greatly improved.

If an overcurrent flows due to an incident such as a line-to-earth fault or the like in the transmission line, series capacitor CAP bypass circuit SW1 and bypass circuit SW2 connected in parallel with compensation voltage generator CVG close, and the overcurrent is caused to flow through bypass circuits SW1 and SW2. As a result, reactance X=ω(L1+L2) of the transmission line can be returned to its original value, and escalation of the overcurrent prevented. In addition, the flow of overcurrent to series capacitor CAP and compensation voltage generator I-VG can be prevented, and the reliability of the system can be improved.

If the power in the transmission lines fluctuates due to the influence of an incident such as a line-to-earth fault or the like, change in active power P and reactive power Q are detected by power detector PD as ΔP and ΔQ, and these changes control output voltage Vo of compensation voltage generator CVG. In concrete terms, power oscillation can be rapidly inhibited by controlling compensation voltage component Voq orthogonal to current Ir in the transmission line in proportion to active power change ΔP, and controlling compensation voltage component Vop in-phase (or in reverse phase) to current Ir in the transmission line in proportion to reactive power change ΔQ. Even in this situation static var generator SVG works to cancel out leading current Iq flowing in the floating capacitance, and this assists the action of compensation voltage generator CVG.

Figure 45:
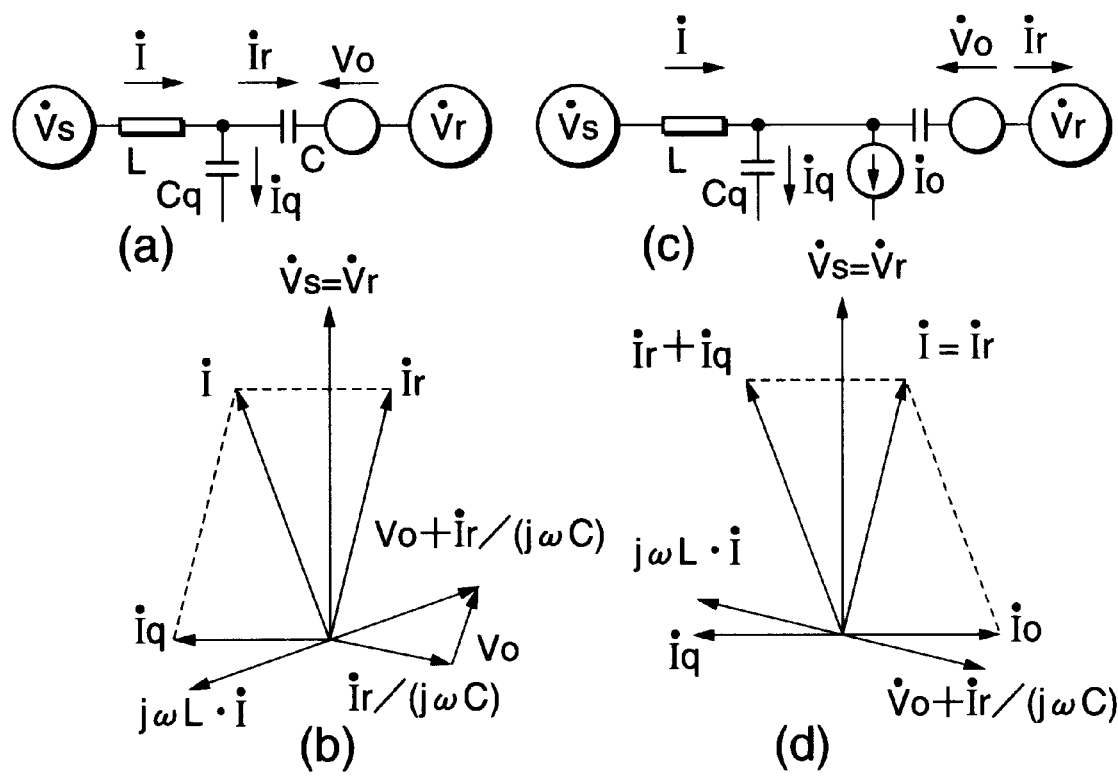
FIG. 45 is a voltage/current vector diagram to illustrate the operation of the system in FIG. 44.

FIG. 45 shows voltage/current vector diagrams provided to explain the operation of the system shown in FIG. 44.

FIG. 45(a) and (b) show an equivalent circuit and a voltage/current vector diagram for a transmission line without a static var generator, whereas FIG. 45(c) and (d) show an equivalent circuit and a voltage/current vector diagram for a transmission line which includes a static var generator.

In this diagram, Vs is the transmitting-side voltage, Vr is the receiving-side voltage, L is the inductance in the transmission line, C is the series capacitor, I is the transmitting-side current, Ir is the receiving-side current, Vo is the output voltage of the compensation voltage generator, Iq is the leading current that flows in the floating capacitance of the transmission line, Io is the compensation current generated from the static var generator, and ω is the power supply angular frequency.

In the vector diagram of FIG. 45(b), receiving-side current Ir and transmitting-side current I become different because leading current Iq flows in floating capacitance Cq of the transmission line. Hypothesizing from the equivalent circuit shown in FIG. 45(a), voltage drop jωL·I due to inductance L of the transmission line will be approximately orthogonal to current I.

On the other hand, compensation is carried out so that the voltage drop due to inductance L of the transmission line is cancelled out by series capacitor C and compensation voltage generator CVG, in order to make transmitting-side voltage Vs and receiving-side voltage Vr approximately equal. To achieve this it is essential voltage $$Vo=-j\omega L \cdot I - Ir/(j\omega C)$$

is output as the compensation voltage from the series compensation generator. In this case, the current flowing in series capacitor C is receiving-side current Ir, so it becomes impossible to effectively cancel out inductance L of the transmission line.

As a result of this, because output voltage Vo of the compensation voltage generator is 90° out of phase relative to receiving-side current Ir, active power must be constantly supplied (or regenerated) from the compensation voltage generator. Accordingly, an energy supply source (or an energy regeneration source) is needed in the compensation voltage generator, and this will require a larger generator and lead to higher costs.

In the vector diagram of FIG. 45(d), compensation current Io is supplied from static var generator SVG to cancel out leading current Iq flowing in the floating capacitance. As a result, transmitting-side current I and receiving-side current Ir become equal, and it is possible to effectively cancel out transmission line inductance L using series capacitor C. Therefore, compensation voltage Vo output from compensation voltage generator CVG will be reduced, and moreover, vector Vo of this voltage will become orthogonal to the I=Ir vector. Accordingly, a smaller capacity compensation voltage generator CVG can be used, and moreover, in the steady-state, the active power exchanged with compensation voltage generator CVG becomes zero, and it is no longer necessary to include an energy supply source (or an energy regeneration source).

As a result, the transmission capability of the transmission line will be improved, and moreover, the load on compensation voltage generator CVG will be reduced, and a more economical long-distance AC transmission system can be provided.

Figure 46:
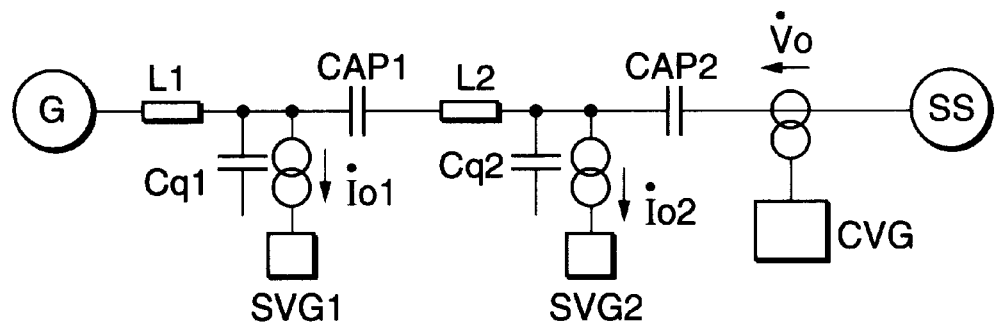
FIG. 46 is a block diagram showing a nineteenth embodiment of an AC long-distance power transmission system according to the present invention.

FIG. 46 is a block diagram showing a nineteenth embodiment of a long-distance AC transmission system of the present invention.

In this diagram, G is a power station, SS is a substation, Li and L2 are transmission line inductances, Cq1 and Cq2 are transmission line floating capacitances, SVG1 and SVG2 are static var generators, CAP1 and CAP2 are series capacitors, and CVG is a compensation voltage generator.

Floating capacitances exist between transmission lines and between transmission lines and earth, and when transmitting power over long distances these cannot be ignored. Floating capacitances are distributed constants, but here they will be expressed as the centralized constants Cq1 and Cq2. In addition, the transmission line inductance is also shown divided into two parts, L1 and L2. Leading currents Iq1 and Iq2 flow in floating capacitances Cq1 and Cq2, and static var generators SVG1 and SVG2 are provided to compensate for these leading currents. Also, series capacitors CAP1 and CAP2 are provided at separate locations to compensate for transmission line inductance L1+L2. Furthermore, compensation voltage generator CVG is provided to regulate the equivalent reactance of the transmission line as a whole, and also to inhibit power oscillation.

In this example, two static var generators SVG1 and SVG2 are used, and these are distributed to different locations. Accordingly, static var generator SVG1 compensates for leading current Iq1 flowing in transmission line floating capacitance Cq1, and static var generator SVG2 compensates for leading current Iq2 flowing in transmission line floating capacitance Cq2.

Next, series capacitors CAP1 and CAP2 are positioned separately immediately after the two static var generators SVG1 and SVG2. As a result, the current flowing in transmission line inductance L1 is approximately equal to the current flowing in series capacitor CAP1, and the current flowing in transmission line inductance L2 is approximately equal to the current flowing in series capacitor CAP2. Accordingly, series capacitors CAP1 and CAP2 can effectively compensate for transmission line inductance L1 and L2, and the capacity of compensation voltage generator CVG can be greatly reduced.

Even greater equalization of transmission current I can be expected if a larger number of static var generators and series condensers are distributed along the transmission line, the equivalent reactance of the transmission line as a whole can be regulated, and it is possible to greatly improve the transmission capability of long-distance transmission lines.

Figure 47:
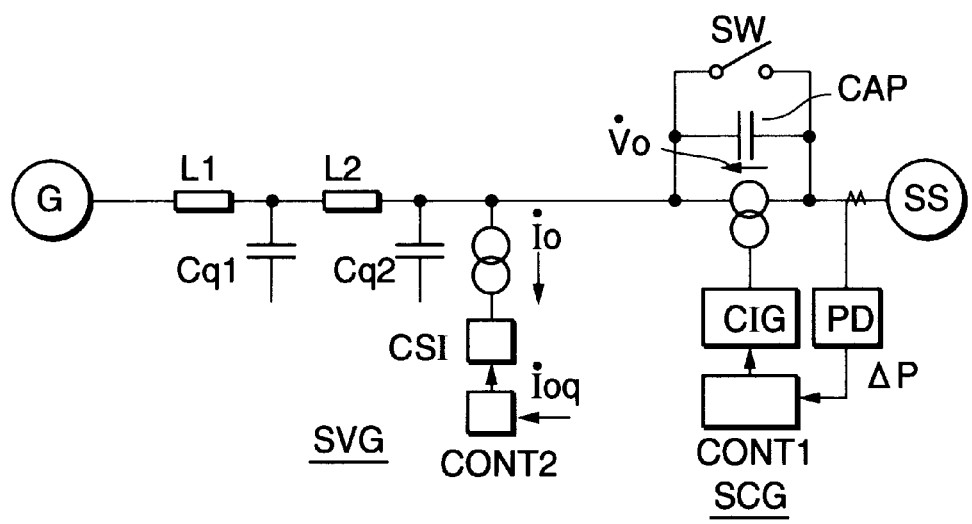
FIG. 47 is a block diagram showing a twentieth embodiment of an AC long-distance power transmission system according to the present invention.

FIG. 47 is a block diagram showing a twentieth embodiment of a long-distance AC transmission system of this invention.

In this diagram, G is a power station, SS is a substation, L1 and L2 are transmission line inductances, Cq1 and Cq2 are transmission line floating capacitances, SVG is a static var generator, CAP is a series capacitor, CIG is a compensation current generator, SW is a bypass circuit, CSI is a current source inverter, PD is a power detector, CONT1 is a CIG control circuit, and CONT2 is a CSI control circuit.

Floating capacitances exist between transmission lines and between transmission lines and earth, and when transmitting power over long distances these cannot be ignored. Floating capacitances are distributed constants, but here they will be expressed as centralized constants Cq1 and Cq2. In addition, the transmission line inductance is also shown divided into two parts, L1 and L2. Leading currents Iq flow in floating capacitances Cq1 and Cq2, and static var generator SVG is provided to compensate for these leading currents. Also, series capacitor CAP and compensation current generator CIG are provided to compensate for transmission line inductance L1+L2.

The capacitance of series capacitor CAP is selected so that it cancels out most of inductance L1+L2 of the transmission line. In addition, compensation current generator CIG is connected in parallel to series capacitor CAP, and supplies compensation current Ic to capacitor CAP. Voltage Vo applied to series capacitor CAP is determined from the sum of current I flowing in the transmission line and above-mentioned compensation current Ic.

The equivalent reactance of the transmission line is regulated and power oscillation is inhibited by regulating voltage Vo applied to series capacitor CAP. When the equivalent reactance of the transmission line has been compensated to zero, voltage Vo applied to series capacitor CAP in the steady state is expressed in the following expression. Where C is the capacitance of series capacitor CAP, and I is the current flowing in the transmission line:

$$Vo=-J\omega(L1+L2)\cdot I=(I+IC)/(j\omega C)$$

In addition, static var generator SVG causes compensation current Io to flow to cancel out leading currents Iq that flow in floating capacitances Cq1 and Cq2. As a result, the transmitting-side current and the receiving-side current become approximately equal, current I flowing in the transmission line and the current flowing in main series capacitor CAP become approximately equal, and the capacity of compensation current generator CIG can be reduced.

By this means the equivalent reactance of transmission lines can be regulated, and the transmission capability of long-distance transmission lines greatly improved.

If an overcurrent flows due to an incident such as a line-to-earth fault or the like in the transmission line, bypass circuit SW connected in parallel with series capacitor CAP closes, and the overcurrent is caused to flow through bypass circuit SW. As a result, reactance X=ω(L1+L2) of the transmission line can be returned to its original value, and escalation of the overcurrent prevented. In addition, the flow of overcurrent to series capacitor CAP and compensation current generator CIG can be prevented, and the reliability of the system can be improved.

Also, if the power in the transmission lines fluctuates due to the influence of an incident such as a line-to-earth fault or the like, changes in active power P and reactive power Q are detected by power detector PD as ΔP and ΔQ, and these changes control output current Ic of the compensation current generator CIG. In concrete terms, power oscillation can be rapidly inhibited by controlling compensation current component Ioq orthogonal to current Ir in the transmission line in proportion to active power change ΔP, and controlling compensation current component Iop in-phase (or in reverse phase) to current Ir in the transmission line in proportion to reactive power change ΔQ. Even in this situation static var generator SVG works to cancel out leading current Iq flowing in the floating capacitance, and this assists the action of compensation current generator CIG.

Figure 48:
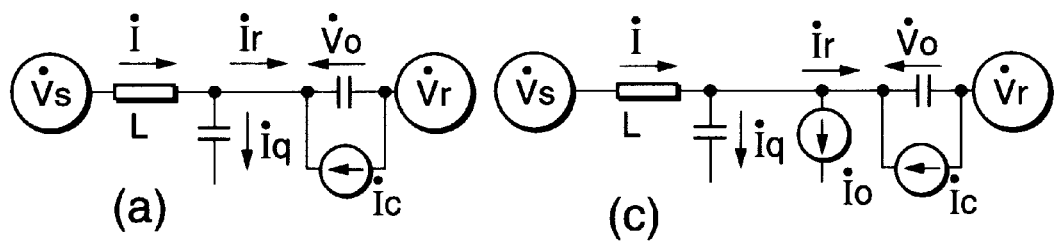
FIG. 48 is a voltage/current diagram to illustrate the operation of the system in FIG. 47.
Figure 48:
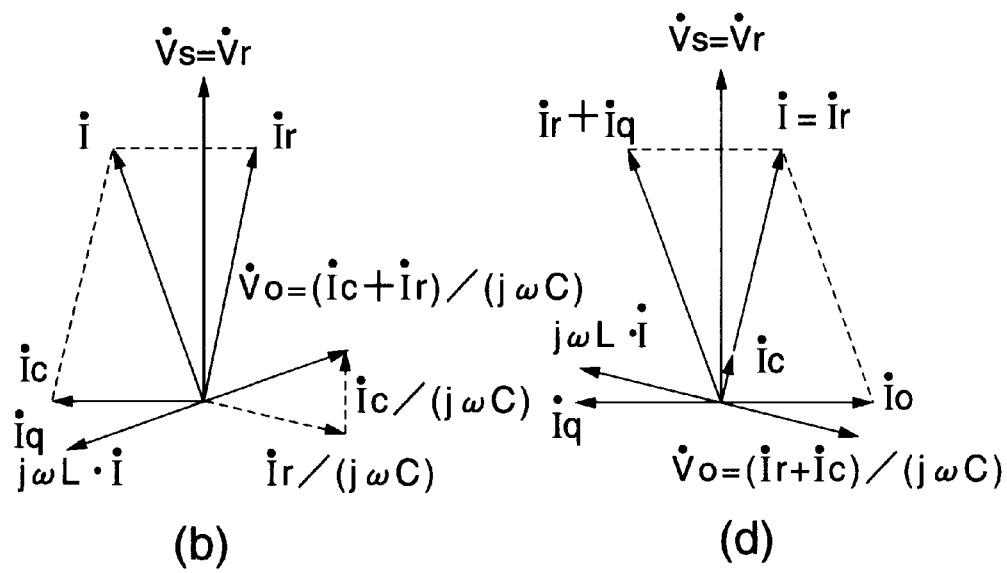

FIG. 48 shows voltage/current vector diagrams provided to explain the operation of the system shown in FIG. 47.

FIGS. 48(a) and (b) show an equivalent circuit and a voltage/current vector diagram for a transmission line without a static var generator, whereas FIGS. 48(c) and (d) show an equivalent circuit and a voltage/current vector diagram for a transmission line which includes a static var generator.

In this diagram, Vs is the transmitting-side voltage, Vr is the receiving-side voltage, L is in the inductance in the transmission line, C is the series capacitor, I is the transmitting-side current, Ir is the receiving-side current, Ic is the compensation current generator output current, Iq is the leading current that flows in the floating capacitance of the transmission line, Io is the compensation current generated from the static var generator, and r is the power supply angular frequency.

In the vector diagram of FIG. 48(b), receiving-side current Ir and transmitting-side current I become different because leading current Iq flows in floating capacitance Cq of the transmission line. Hypothesizing from the equivalent circuit shown in FIG. 48(a), voltage drop jωL·I due to inductance L of the transmission line will be approximately orthogonal to current I.

On the other hand, compensation is carried out so that the voltage drop due to inductance L of the transmission line is cancelled out by series capacitor C and compensation current generator CIG, in order to make transmitting-side voltage Vs and receiving-side voltage Vr approximately equal. To achieve this it is essential voltage $$Vo=(Ir+Ic)/(j\omega C)=-j\omega L\cdot I$$

is output as the voltage applied to the series capacitor. In this case, current Ir flowing in series capacitor C is the receiving-side current, so it becomes impossible to effectively cancel out inductance L of the transmission line.

As a result of this, output current Ic of the compensation current generator is $$Ic=\omega C\cdot\omega L\cdot I-Ir$$

and if, provisionally, a situation is selected in which I/(ωC)= ωL, then Ic=I−Ir. This current is equal to leading current Iq which flows in floating capacitance Cq of the transmission line, and it is constantly necessary to supply this current from compensation current generator CIG. In addition, compensation current Io comes close to being in-phase (or in reverse phase) relative to the voltage applied to series capacitor CAP, and active power must be constantly supplied (or regenerated) from the compensation current generator. Accordingly, an energy supply source (or an energy regeneration source) is needed in the compensation current generator, and this will require a larger generator, and lead to higher costs.

In comparison, in the vector diagram of FIG. 48(*d*), compensation current Io is supplied from static var generator SVG to cancel out leading current Iq flowing in the floating capacitance. As a result, transmitting-side current I and receiving-side current Ir are equalized, and it is possible to effectively cancel out transmission line inductance L using series capacitor C. Therefore, compensation current Ic output from compensation current generator CIG is reduced, and moreover, vector Ic of this current is in-phase (or in reverse phase) relative to the I=Ir vector, and is a component orthogonal to the voltage Vo applied to series capacitor CAP. Accordingly, a smaller capacity compensation current generator CIG can be used, and moreover, in the steady-state the active power exchanged with compensation current generator CIG is zero, and it is no longer necessary to include an energy supply source (or an energy regeneration source).

By this means, the transmission capability of the transmission line is improved, and moreover, the load on compensation current generator CIG is reduced, and a more economical long-distance AC transmission system can be provided.

Figure 49:
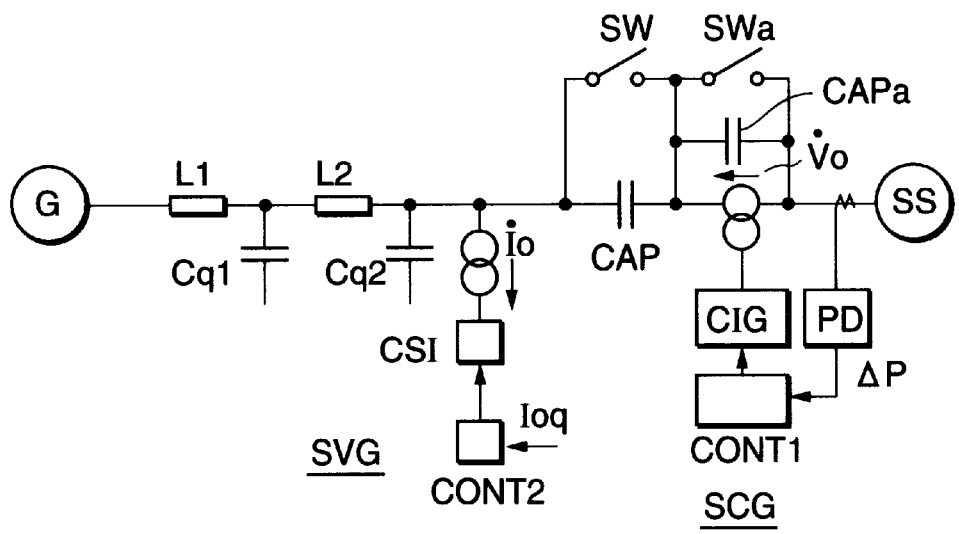
FIG. 49 is a block diagram showing a twenty-first embodiment of an AC long-distance power transmission system according to the present invention.

FIG. 49 is a block diagram showing a twenty-first embodiment of a long-distance AC transmission system of this invention.

In this diagram, G is a power station, SS is a substation, L1 and L2 are transmission line inductances, Cq1 and Cq2 are transmission line floating capacitances, SVG is a static var generator, CAP is a main series capacitor, CAPa is an auxiliary series capacitor, CIG is a compensation current generator, SW and SWa are bypass circuits, CSI is a current source inverter, PD is a power detector, CONT1 is a CIG control circuit, and CONT2 is a CSI control circuit.

Floating capacitances exist between transmission lines and between transmission lines and earth, and when transmitting power over long distances these cannot be ignored. Floating capacitances are distributed constants, but here, for the sake of convenience, they will be expressed as centralized constants Cq1 and Cq2. In addition, the transmission line inductance is also shown divided into two parts, L1 and L2. Leading currents Iq flow in floating capacitances Cq1 and Cq2, and static var generator SVG is provided to compensate for these leading currents. Also, main series capacitor CAP, auxiliary series capacitor CAPa, and compensation current generator CIG are provided to compensate for transmission line inductance L1+L2.

The capacitance of main series capacitor CAP is selected so that it cancels out most of inductance L1+L2 of the transmission line. In addition, compensation current generator CIG is connected in parallel to auxiliary series capacitor CAPa, and supplies compensation current Ic to capacitor CAPa. Voltage Vo applied to auxiliary series capacitor CAPa is determined from the sum of current I flowing in the transmission line and above-mentioned compensation current Ic.

The equivalent reactance of the transmission line is regulated and power fluctuations are inhibited by regulating voltage Vo applied to auxiliary series capacitor CAPa. When the equivalent reactance of the transmission line has been compensated to zero, voltage Vo applied to auxiliary series capacitor CAPa in the steady state is expressed in the following expression. Where C is the capacitance of main series capacitor CAP, Ca is the capacitance of auxiliary series capacitor CAPa, and I is the current flowing in the transmission line:

$$Vo = -jI\{\omega(L1+L2) - 1/(\omega C)\}$$

$$= (I + Ic)/(j\omega Ca)$$

In addition, static var generator SVG causes compensation current Io to flow to cancel out leading currents Iq that flow in floating capacitances Cq1 and Cq2. As a result, the transmitting-side current and the receiving-side current become approximately equal, the current I flowing in the transmission line and the current flowing in main series capacitor CAP and auxiliary series capacitor CAPa become approximately equal, and the capacity of compensation current generator CIG can be reduced.

By this means, the equivalent reactance of transmission lines can be regulated, and the transmission capability of long-distance transmission lines greatly improved.

If an overcurrent flows due to an incident such as a line-to-earth fault or the like in the transmission line, bypass circuit SW connected in parallel with main series capacitor CAP and bypass circuit SWa connected in parallel with auxiliary series capacitor CAPa close, and the overcurrent is caused to flow through bypass circuits SW and SWa. As a result, reactance X=ω(L1+L2) of the transmission line can be returned to its original value, and escalation of the overcurrent prevented. In addition, the flow of overcurrent to main series capacitor CAP, auxiliary series capacitor CAPa, and compensation current generator CIG can be prevented, and the reliability of the system can be improved.

If the power in the transmission lines fluctuates due to the influence of an incident such as a line-to-earth fault or the like, changes in active power P and reactive power Q are detected by power detector PD as ΔP and ΔQ, and these changes control output current Ic of compensation current generator CIG. In concrete terms, power fluctuations can be rapidly inhibited by controlling compensation current component Ioq orthogonal to current Ir in the transmission line in proportion to active power change ΔP, and controlling compensation current component Iop in-phase (or in reverse phase) with current Ir in the transmission line in proportion to reactive power change ΔQ. Even in this situation, static var generator SVG works to cancel out leading current Iq flowing in the floating capacitance, and this assists the action of compensation current generator CIG.

Figure 50:
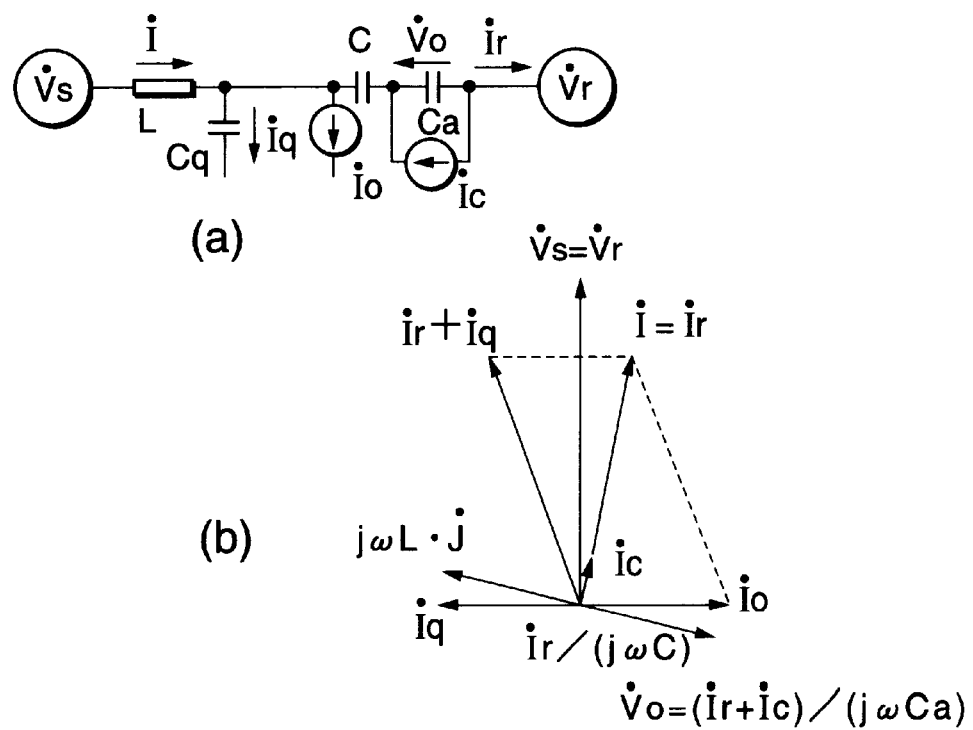
FIG. 50 is a voltage/current diagram to illustrate the operation of the system in FIG. 49.

FIG. 50 shows a voltage/current vector diagram provided to explain the operation of the system shown in FIG. 49.

In this diagram, Vs is the transmitting-side voltage, Vr is the receiving-side voltage, L is the inductance in the transmission line, C is a main series capacitor, Ca is an auxiliary series capacitor, I is the transmitting-side current, Ir is the receiving-side current, Ic is the compensation current generator output current, Iq is the leading current that flows in the floating capacitance of the transmission line, Io is the compensation current generated from the static var generator, and ω is the power supply angular frequency.

In the vector diagram of FIG. 50(*b*), compensation current Io is supplied from static var generator SVG to cancel out leading current Iq flowing in the floating capacitance. As a result, transmitting-side current I and receiving-side current Ir are equalized, and it is possible to effectively cancel out transmission line inductance L using main series capacitor C and auxiliary series capacitor Ca. Therefore, compensation current Ic output from compensation current generator CIG is reduced, and moreover, vector Ic of this current is in-phase (or in reverse phase) relative to the I=Ir vector, and is a component orthogonal to voltage Vo applied to auxiliary series capacitor Ca. Accordingly, a smaller capacity compensation current generator CIG can be used, and moreover, in the steady-state the active power exchanged with compensation current generator CIG is zero, and it is not necessary to include an energy supply source (or an energy regeneration source).

By this means, the transmission capability of the transmission line is improved, and moreover, the load on compensation current generator CIG is reduced, and a more economical long-distance AC transmission system can be provided.

Figure 51:
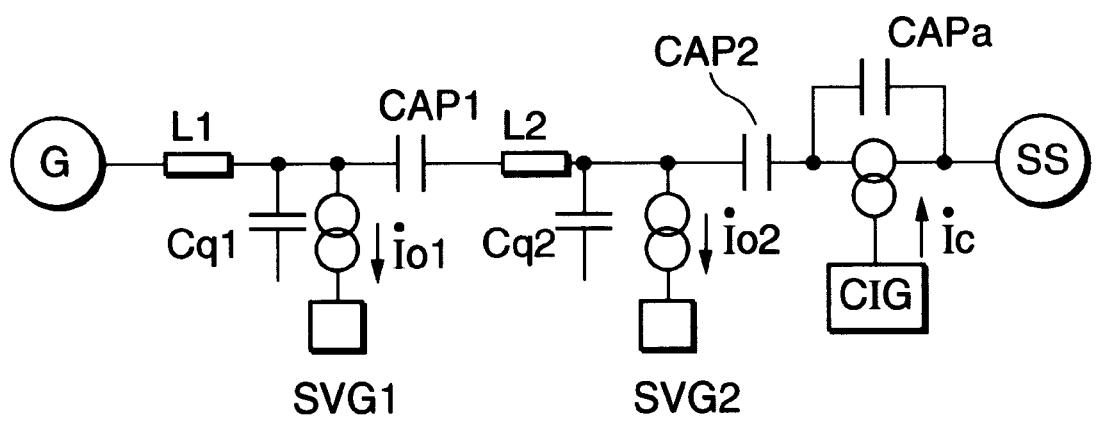
FIG. 51 is a block diagram showing a twenty-second embodiment of an AC long-distance power transmission system according to the present invention.

FIG. 51 is a block diagram showing a twenty-second embodiment of a long-distance AC transmission system of this invention.

In this diagram, G is a power station, SS is a substation, L1 and L2 are transmission line inductances, Cq1 and Cq2 are transmission line floating capacitances, SVG1 and SVG2 are static var generators, CAP1 and CAP2 are main series capacitors, CAPa is an auxiliary series capacitor, and CIG is a compensation current generator.

Floating capacitances exist between transmission lines and between transmission lines and earth, and when transmitting power over long distances these cannot be ignored. Transmission line floating capacitances are distributed constants, but here they will be expressed as centralized constants Cq1 and Cq2. In addition, the transmission line inductance is also shown divided into two arts, L1 and L2. Leading currents Iq1 and Iq2 flow in floating capacitances Cq1 and Cq2, and static var generators SVG1 and SVG2 are provided to compensate for these leading currents. Also, main series capacitors CAP1 and CAP2 are provided at separate locations to compensate for transmission line inductance L1+L2. Furthermore, auxiliary series capacitor CAPa and compensation current generator CIG are provided to regulate the equivalent reactance of the transmission line as a whole, and also to inhibit power oscillation.

In this example, two static var generators SVG1 and SVG2 are used, and these are distributed to different locations. Accordingly, static var generator SVG1 compensates for leading current Iq1 flowing in transmission line floating capacitance Cq1, and static var generator SVG2 compensates for leading current Iq2 flowing in transmission line floating capacitance Cq2.

Next, main series capacitors CAP1 and CAP2 are positioned separately immediately after the two static var generators SVG1 and SVG2. As a result, the current flowing in transmission line inductance L1 is approximately equal to the current flowing in main series capacitor CAP1, and the current flowing in transmission line inductance L2 is approximately equal to the current flowing in main series capacitor CAP2. Accordingly, main series capacitors CAP1 and CAP2 can effectively compensate for the transmission line inductance L1+L2, and the capacity of auxiliary series capacitor CAPa and compensation current generator CIG can be greatly reduced.

Even greater equalization of the transmission current I can be expected if a larger number of static var generators and series condensers are distributed along the transmission line, the equivalent reactance of the transmission line as a whole can be regulated, and it is possible to greatly improve the transmission capability of long-distance transmission lines.

Figure 52:
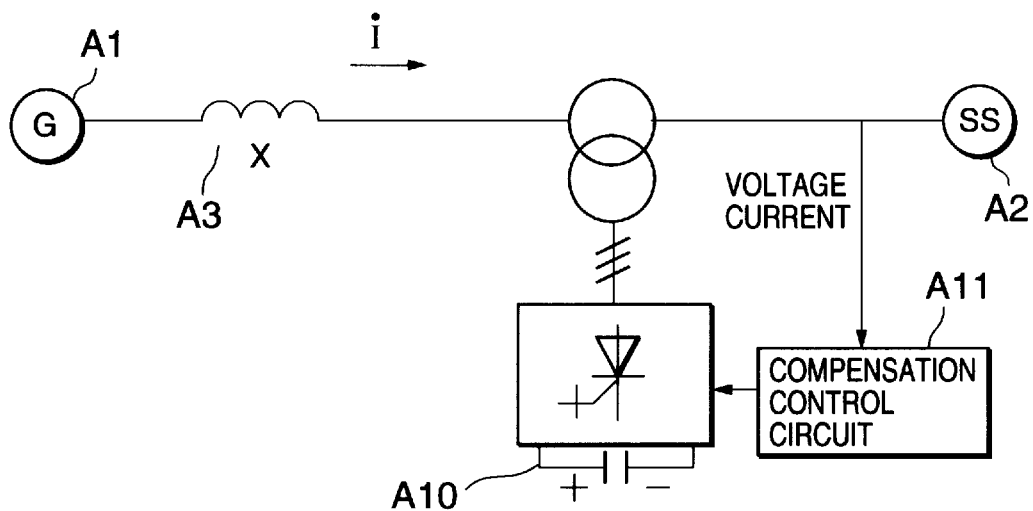
FIG. 52 is a block diagram of an AC power transmission system according to a twenty-third embodiment.

FIG. 52 is a block diagram showing a twenty-third embodiment of a long-distance AC transmission system of the present invention.

In the diagram, A1 is a power station (transmitting end), A2 is a substation (receiving end), A3 is system transmission line reactance X, A10 is a compensation voltage generator, A11 is a compensation control circuit for the compensation voltage generator. I is the three-phase current flowing in the system transmission line. In practice, resistances, and the like, exist in system, in addition to the reactance, but these have been omitted to simplify the explanation.

Figure 53:
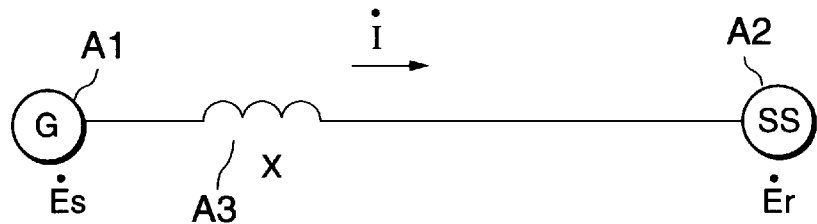
FIG. 53 is an equivalent circuit diagram in a case where no compensation voltage generator is provided.
Figure 54:
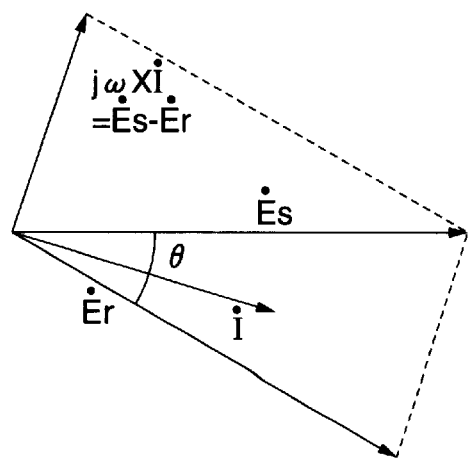
FIG. 54 is a power vector diagram for the equivalent circuit in FIG. 53.

FIG. 53 is an equivalent circuit showing a situation where there is no compensation voltage generator. FIG. 54 shows a voltage/current vector diagram for the system equivalent circuit shown in FIG. 53.

When there is no compensation voltage generator, as shown in FIG. 54, phase difference θ occurs between transmitting end voltage Es and receiving end voltage Er. Because this difference in voltage between transmitting-end voltage Es and receiving-end voltage Er occurs, current I flows in the transmission line due to the system reactance X.

In this case, in relation to transmission line current I, the relationship between the voltage difference and jωXI is Es−Er=jωLI, and the phase is 90° advanced relative to the current.

Figure 55:
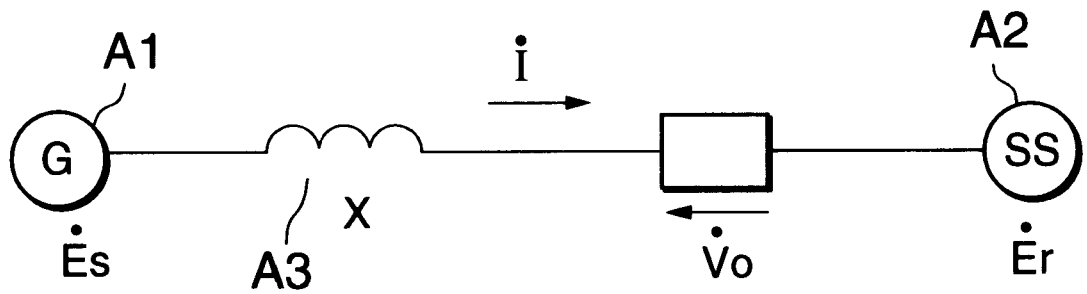
FIG. 55 is an equivalent circuit diagram in a case where a compensation voltage generator is provided.
Figure 56:
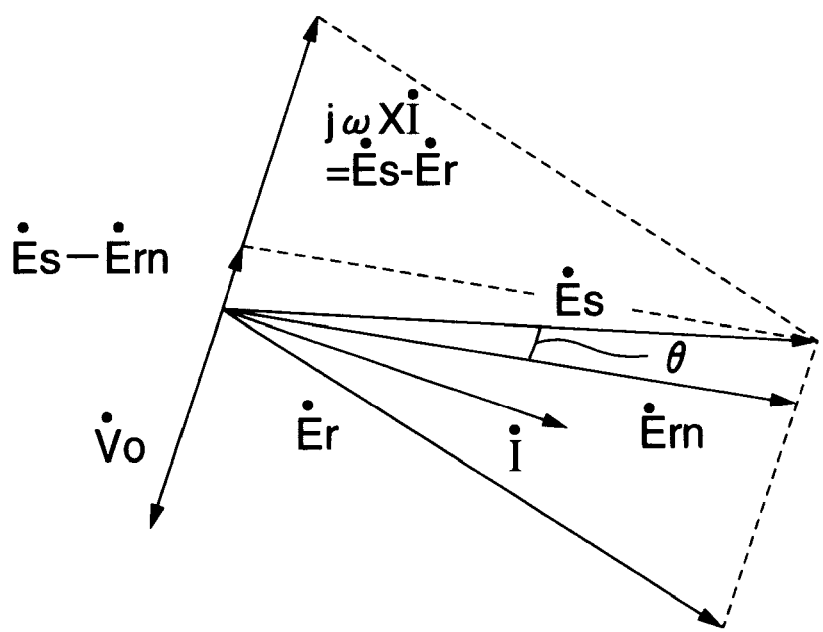
FIG. 56 is a power vector diagram in a steady state of the equivalent circuit in FIG. 55.

FIG. 55 is an equivalent circuit showing a situation of FIG. 52 where there is a compensation voltage generator. FIG. 56 shows a voltage/current vector diagram for the system equivalent circuit shown in FIG. 55.

By producing compensation voltage Vo, which is a component orthogonal to the current I flowing in the transmission line, as output from the compensation voltage generator, receiving-end voltage Er becomes Ern relative to transmitting-end voltage Es and phase difference θ is reduced, in order to cancel out voltage drop jωXI due to transmission line reactance X. That is, the equivalent reactance is reduced, so it is possible to increase the active power that can be transmitted. In this case, it is possible to make equivalent reactance X zero by making Vo=−jωLI, and Es can be made equal to Er.

With zero reactance power transmission, even if current increases, no phase angle θ between Es and Er operates, so the system is strong with respect to power oscillations.

FIG. 56 describes a steady-state compensation voltage. Even when power fluctuation arises within the system due to power variations at the transmitting end or receiving end, it is possible to supply to the receiving end a voltage approximately equal to transmitting-end voltage Es by controlling compensation voltage Vo with compensation voltage generator A10, so power oscillations can be controlled. The operation of the system in this situation is shown in the vector diagram of FIG. 57.

Figure 57:
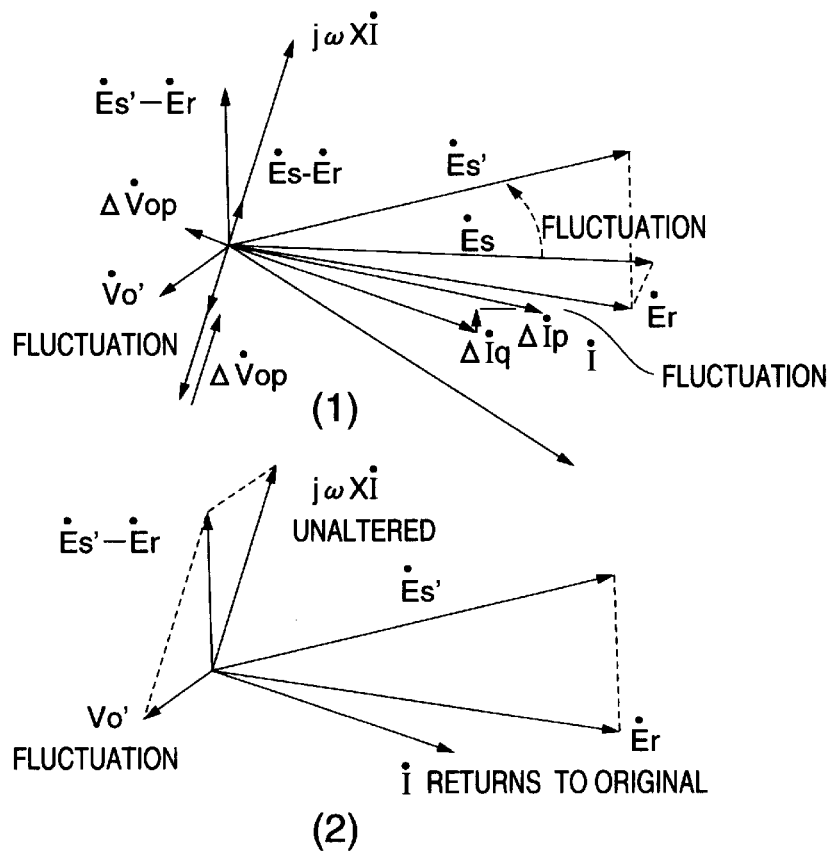
FIG. 57 is a power vector diagram in a case where a power fluctuation is generated in the equivalent circuit in FIG. 55.

FIG. 57 shows a situation in which in the phase of transmitting-end voltage Es has changed.

When transmitting-end voltage Es changes, current I flowing in the transmission line changes to I', as shown in FIG. 57(1). That is, active current component ΔIp in-phase with Er is produced, so compensation voltage ΔVoq, orthogonal to current I, is generated in the opposite direction to original compensation voltage Vo, in order to inhibit ΔIp. In addition, compensation voltage ΔVop is generated in reverse phase relative to current I, in order to inhibit the increase in reactive current component ΔIq. The sum of ΔVoq and ΔVop constitute compensation voltage Vo' when transmitting-end voltage Es changes.

As shown in FIG. 57(2), system current I and receiving-end voltage Er are kept constant by changing Vo to Vo' in order to satisfy the expression, Es−Er=jωLI+Vo.

As in the example shown in FIG. 52, by compensating for the voltage drop due to system reactance, reactance X is made approximately zero, and active power P that can be transmitted becomes infinite:

$$P = \frac{Es \cdot Er}{X} \sin\theta$$

(this is the same as $$P = \frac{Vs \cdot Vr}{X} \sin\theta,$$

stated earlier)

That is, power transmission unrestricted by reactance X becomes possible, and it is possible to increase transmission (distribution) capability in existing AC transmission (distribution) systems.

Figure 58:
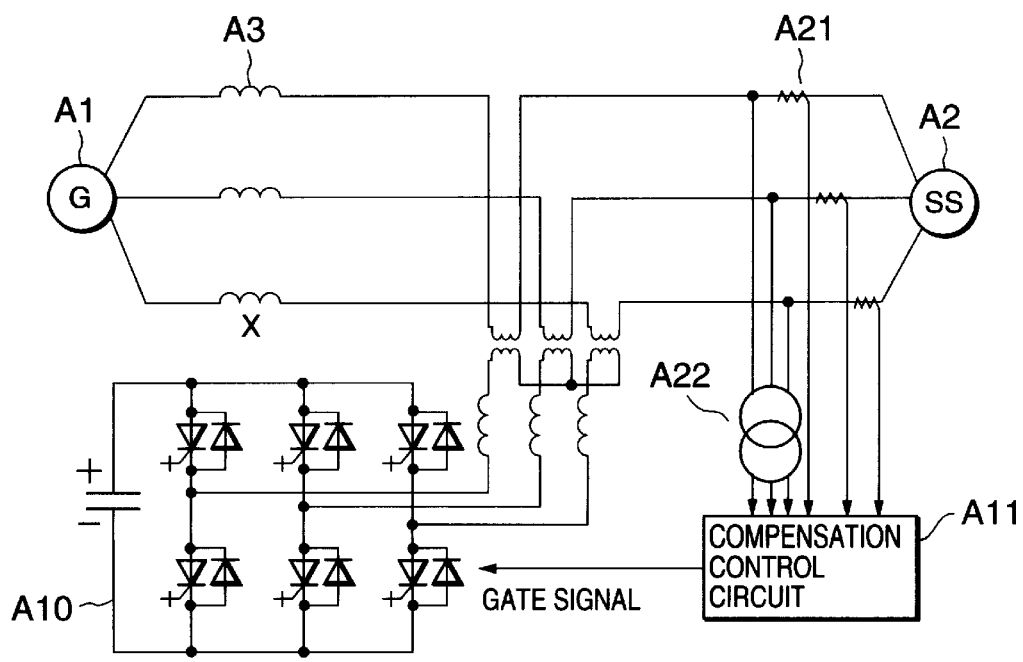
FIG. 58 is a practical block diagram of an AC power transmission system according to a twenty-third embodiment of the present invention.

FIG. 58 shows a practical block diagram of the twenty-third embodiment of this invention.

A1 is a power station, A2 is a substation, A3 is system transmission line reactance X, A10 is a compensation voltage generator, A11 is a compensation control circuit for the compensation voltage generator, A21 is a system current detector, and A21 is a system voltage detector.

Compensation voltage generator A10 is composed of self-turn-off devices (for example GTOs) with diodes connected in parallel to these devices, and is connected in a three-phase bridge structure. In addition, compensation voltage generator A10 is connected to a DC transformer via a reactor, and the primary side of the DC transformer is connected to the system separately for each phase.

Figure 59:
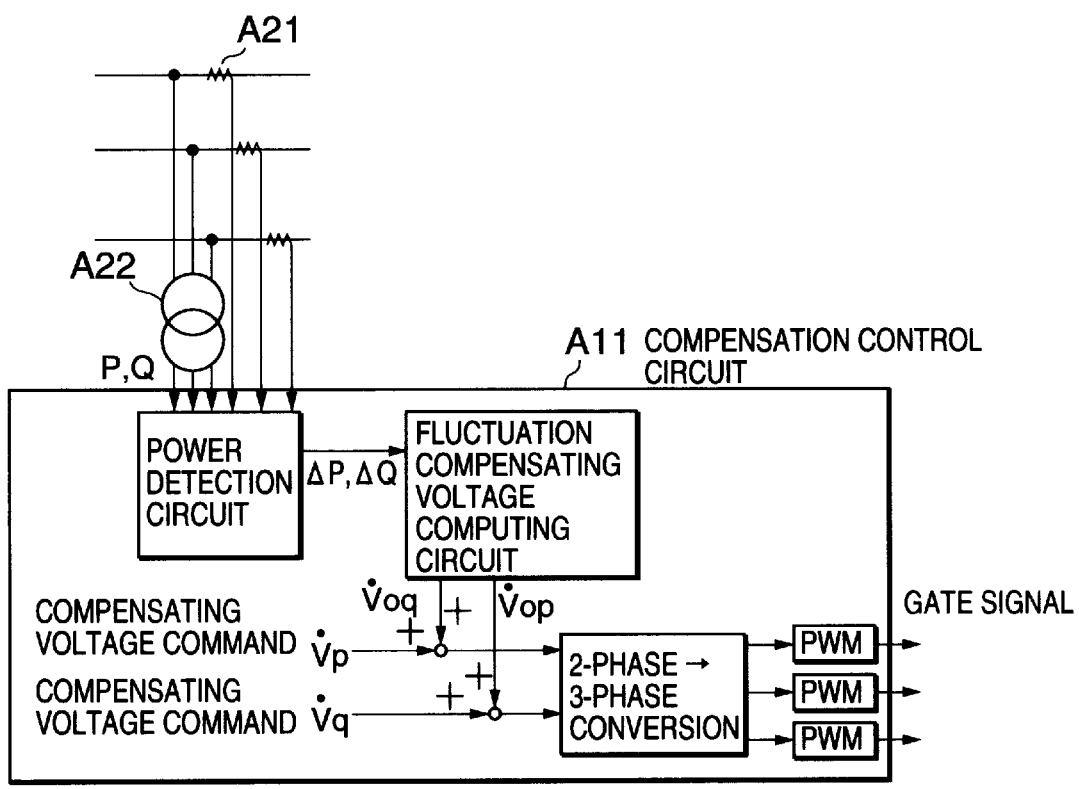
FIG. 59 is a block diagram of a compensation control circuit according to the twenty-third embodiment of the present invention.
Figure 60:
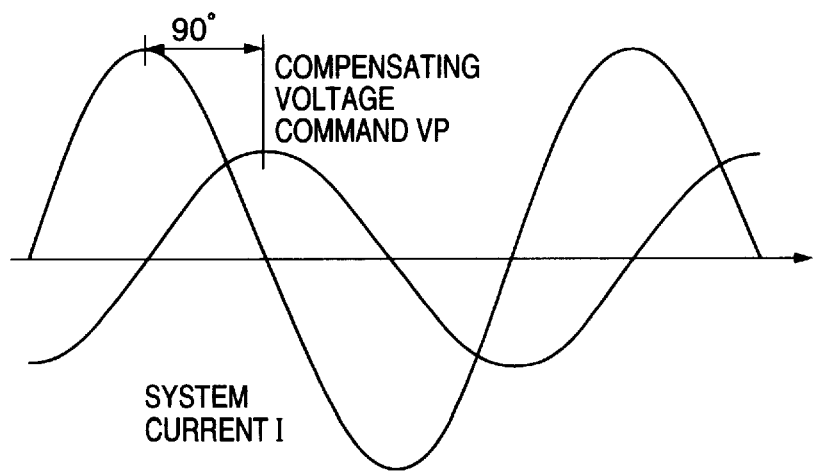
FIG. 60 is a diagram of the correlation between system current I and compensating voltage Vp in an AC power transmission system.

FIG. 59 is a block diagram of the compensation voltage generator compensation control circuit.

In the steady state, compensation voltage generator compensation control circuit A11 outputs compensation voltage Vo orthogonal to current I flowing in the transmission line to the primary side connected to the system, and so gives voltage command Vp and carries out PWM control.

Figure 61:
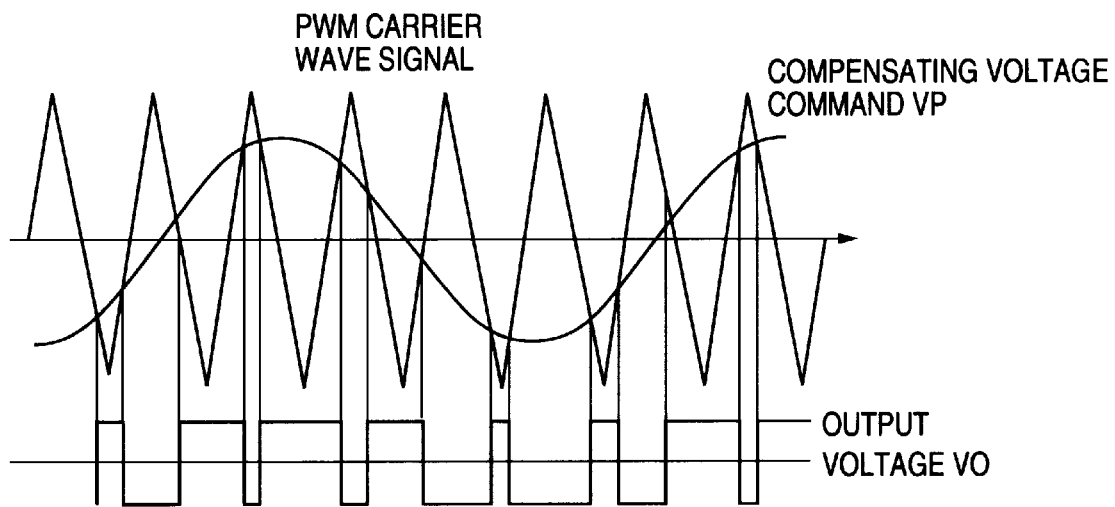
FIG. 61 is a waveform diagram of PWM control in an AC power transmission system.

That is, as shown in FIG. 50, a voltage component 90° out of phase relative to the system current I drives compensation voltage generator A10 as compensation voltage command Vp. If triangular wave comparison PWM control is carried out relative to compensation voltage command Vp, as shown in FIG. 61, output voltage Vo is output from compensation voltage generator A10 in response to the carrier signal and compensation voltage command Vp. As a result, a voltage corresponding to the voltage drop due to the reactance is output from compensation voltage generator A10.

By compensating for the voltage drop due to the system reactance, reactance X is made approximately zero, and active power P that can be transmitted becomes infinite:

$$P = \frac{Es \cdot Er}{X} \sin\theta$$

That is, power transmission unrestricted reactance X becomes possible, and it is possible to increase transmission (distribution) capability in existing AC transmission (distribution) systems.

On the other hand, if power oscillation occurs in the transmission line, inhibition and control are carried out as follows.

Active power Pp and reactive power Pq are found from the output of system current detector A21 and the output of system voltage detector A22. If power oscillation occurs, both active power Pp and reactive power Pq change and these changes are detected as ΔP and ΔQ.

Compensation voltage Voq orthogonal to the current I in the transmission line is regulated in proportion to active power change ΔP, and compensation voltage component Vop in-phase (or in reverse phase) to current Ir in the transmission line is regulated in proportion to in reactive power change ΔQ.

Power oscillation is inhibited by adding compensation voltages Vop and Voq in response to compensation voltage commands Vp and Vq.

Next, a twenty-fourth embodiment of the present invention will be described.

Figure 62:
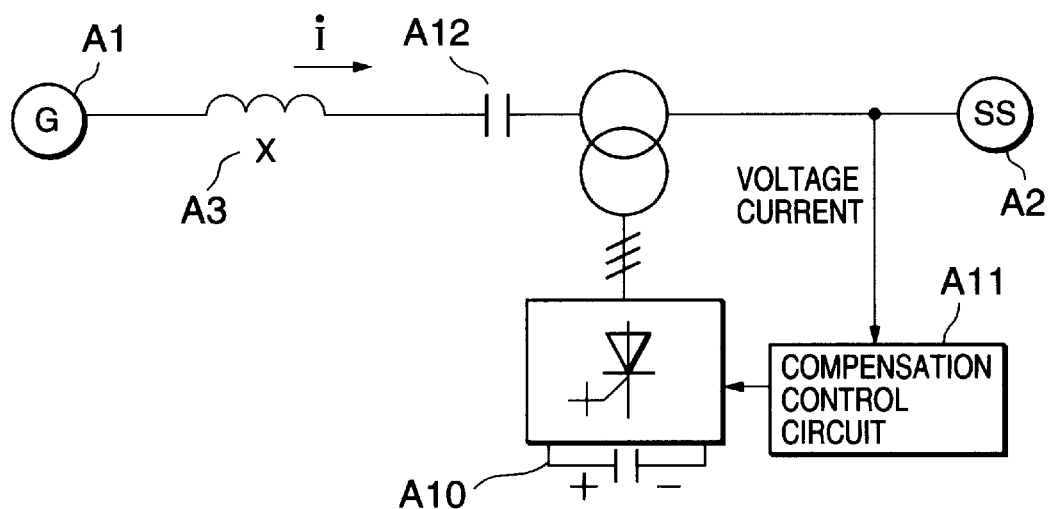
FIG. 62 is a block diagram of an AC power transmission system according to a twenty-fourth embodiment of the present invention.

FIG. 62 is a block diagram showing a twenty-fourth embodiment of an AC power transmission (distribution) system of the present invention.

In the diagram, A1 is a power station (transmitting end), A2 is a substation (receiving end), A3 is system transmission line reactance X, A10 is a compensation voltage generator, A11 is a compensation control circuit for the compensation voltage generator, and A12 is a capacitor connected to the system in series. I is the three-phase current flowing in the system transmission line. In practice, resistances, and the like, exist in system, in addition to the reactance, but these have been omitted to simplify the explanation.

Figure 63:
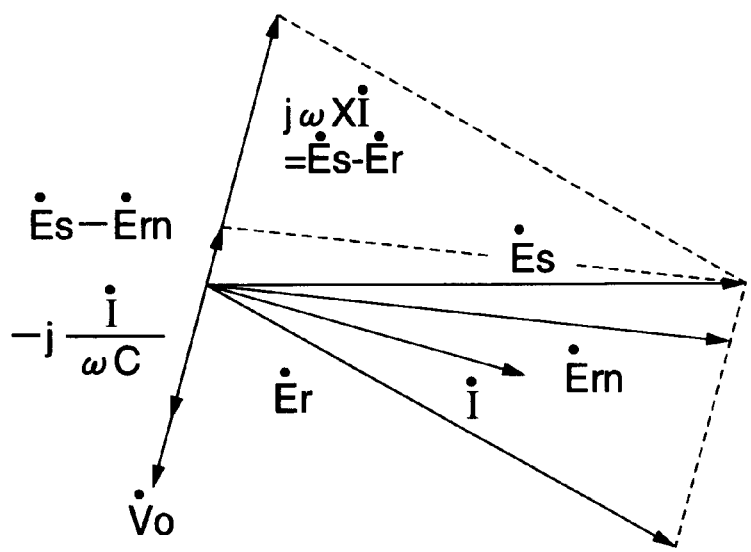
FIG. 63 is a power vector diagram of a steady state according to the twenty-fourth embodiment of the present invention.

FIG. 63 is a vector diagram showing a situation in which the system reactance is constantly compensated for.

Phase difference θ occurs between transmitting-end voltage Es and receiving-end voltage Er. Because this difference in voltage between transmitting-end voltage Es and receiving-end voltage Er occurs, current I flows in the transmission line due to system reactance X. In this case, in relation to transmission line current I, the relationship between the voltage difference and jωXI is Es−Er=jωLI, and the phase is 90° advanced relative to the current.

In response to this, the voltage indicated in the following expression is generated in reverse phase to the system reactance A3 by a capacitor A12 connected in series.

$$Vc = j\frac{1}{\omega C}$$

As a result of this voltage, voltage drop jωXI due to system reactance A3 can be inhibited.

Moreover, by producing compensation voltage Vo, which is a component orthogonal to the current I flowing in the transmission line, as output from the compensation voltage generator, receiving-end voltage Er becomes Ern relative to transmitting-end voltage Es, and phase difference θ reduces and the size of the voltage increases, in order to cancel out voltage drop jωXI due to the transmission line reactance X. That is, the equivalent reactance is reduced, so it is possible to increase the active power that can be transmitted. In this case, it is possible to make equivalent reactance X zero by making $$Vo = -\left(j\omega LI - j\frac{1}{\omega C}\right)$$

and Es can be made equal to Er.

Figure 64:
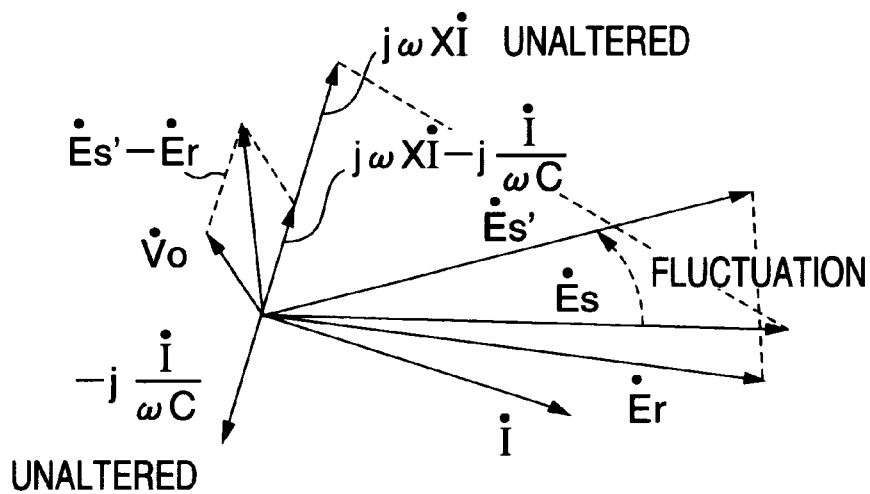
FIG. 64 is a power vector diagram in a case where a power fluctuation arises in the twenty-fourth embodiment of the present invention.

If transmission power fluctuations occur at transmitting end A1 or load power fluctuations occur at receiving end A2, system power fluctuations can be inhibited by carrying out control involving the output of compensation voltage from compensation voltage generator A10. FIG. 64 shows a vector diagram of the situation when the transmitting-end voltage has fluctuated.

As shown in FIG. 64, if the phase angle relative to receiving-end voltage Er increases due to fluctuations in transmitting-end voltage Es, system current I and receiving-end voltage Er can be maintained at a constant level by controlling voltage Vo output from compensation voltage generator A10 in proportion to the value of Es−Er. That is, power oscillations in the system can be inhibited even if the transmitting-end voltage fluctuates.

In addition, in the steady state, the voltage drop due to the system reactance is compensated for by series capacitor A12 and compensation voltage generator A10, so the capacity of compensation voltage generator A10 can be reduced relative to the compensation voltage generator used in the twenty-third embodiment, in which the voltage drop due to the system reactance is compensated for by the compensation voltage generator A10 alone.

Figure 65:
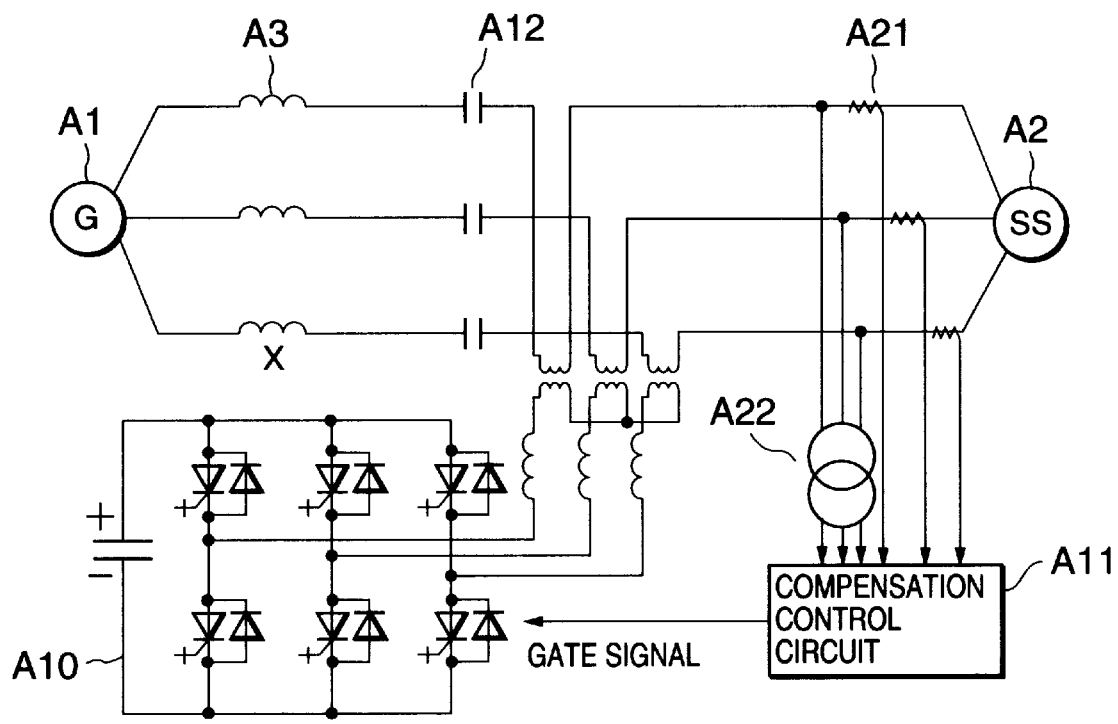
FIG. 65 is a practical block diagram of an AC power transmission system according to the twenty-fourth embodiment of the present invention.

FIG. 65 shows a practical block diagram of the twenty-fourth embodiment of an AC power transmission (distribution) system of the present invention.

A1 is a power station, A2 is a substation, A3 is system transmission line reactance X, A10 is a compensation voltage generator, A11 is a compensation control circuit for the compensation voltage generator, A12 is a capacitor, A21 is a system current detector, and A21 is a system voltage detector.

Compensation voltage generator A10 is composed of self-turn-off devices (for example GTOs) with diodes connected in parallel to these devices, and is connected in a three-phase bridge structure. In addition, compensation voltage generator A10 is connected to a DC transformer via a reactor, and the primary side of the DC transformer is connected to the system separately for each phase.

The structure of the compensation voltage generator compensation control circuit is similar to that of the twenty-third embodiment shown in FIG. 59, but it is somewhat different because capacitor A12 is connected to the system in series. In the steady state, the compensation voltage generator compensation acts to compensate for that portion that cannot be compensated for by capacitor A12.

In the steady-state, compensation voltage generator compensation control circuit A11 outputs compensation voltage Vo orthogonal to current I flowing in the transmission line to the primary side connected to the system, and so gives voltage command Vp and carries out PWM control. In this case, a voltage is generated by capacitor A12 in reverse phase to the system reactance, so compensation voltage Vo becomes:

$$Vo = -\left(j\omega LI - j\frac{1}{\omega C}\right)$$

Figure 66:
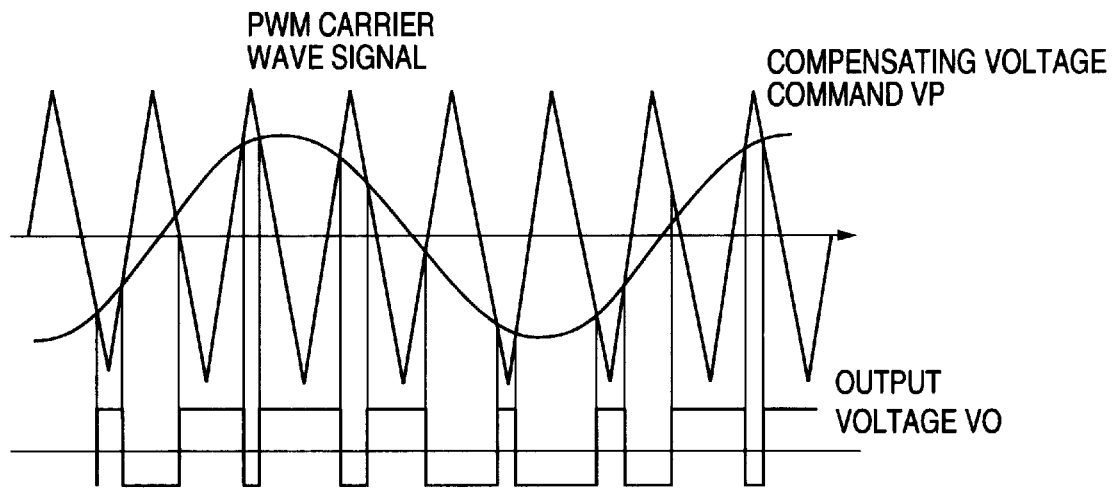
FIG. 66 is a waveform diagram of PWM control in an AC power transmission system according to the twenty-fourth embodiment of the present invention.

That is, a voltage component 90° out-of-phase relative to the system current I drives compensation voltage generator A10 as compensation voltage command Vp. If triangular wave comparison PWM control is carried out relative to compensation voltage command Vp, as shown in FIG. 66, output voltage Vo is output from compensation voltage generator A10 in response to the carrier wave signal and compensation voltage command Vp. As a result, the voltage drop due to the reactance is compensated for by the sum of the voltage output by capacitor A12 and the voltage output by compensation voltage generator A10.

By compensating for the voltage drop due to the system reactance, reactance X is made approximately zero, and active power P that can be transmitted becomes infinite:

$$P = \frac{Es \cdot Er}{X}\sin\theta$$

That is, power transmission unrestricted by reactance X becomes possible, and it is possible to increase transmission (distribution) capability in existing AC transmission (distribution) systems.

On the other hand, if power oscillation occurs in the transmission line, inhibition control is carried out as follows.

Active power Pp and reactive power Pq are found from the output of system current detector A21 and the output of system voltage detector A22. If power oscillations occur, both active power Pp and reactive power Pq change, and these changes are detected as ΔP and ΔQ.

Compensation voltage Voq orthogonal to current I in the transmission line is regulated in proportion to active power change ΔP, and the compensation voltage component Vop in-phase (or in reverse phase) with current I in the transmission line is regulated in proportion to reactive power change ΔQ.

Power oscillation is inhibited by adding these compensation voltages Voq and Vop in response to compensation voltage commands Vp and Vq.

Figure 67:
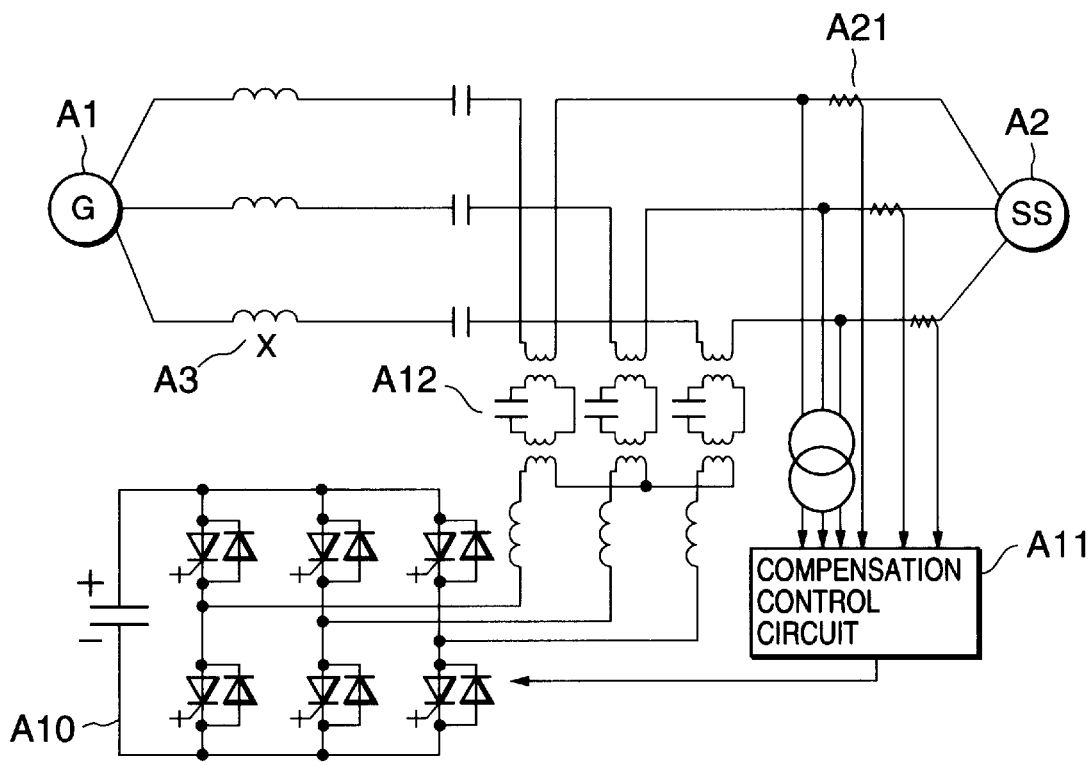
FIG. 67 is a further block diagram of an AC power transmission system according to the twenty-fourth embodiment of the present invention.

FIG. 67 shows a different modification of the twenty-fourth embodiment of an AC power transmission (distribution) system of the present invention. Here, only the aspects that differ from the AC power transmission system shown in FIG. 65 will be explained, and elements that are identical will not be explained.

The point of difference from the AC power transmission system shown in FIG. 65 is that capacitor A12 is connected to the system via a transformer, instead of being connected to the system directly.

Even when capacitor A12 is connected via a transformer in this way, as in the AC power transmission system shown in FIG. 65, in the steady state, the voltage drop due to system reactance can be compensated for by the sum of the voltage output by capacitor A12 and the voltage output by compensation voltage generator A10, power transmission unrestricted by reactance X becomes possible, and it is possible to increase transmission (distribution) capability in existing AC transmission (distribution) systems.

In addition, if power oscillation occurs in the transmission line, this power oscillation can be inhibited by regulating compensation voltage Voq orthogonal to current I in the transmission line in proportion to active power change ΔP, and by regulating compensation voltage component Vop in-phase (or in reverse phase) with current I in the transmission line in proportion to reactive power change ΔQ.

In this way, in the twenty-fourth embodiment, the voltage drop due to system reactance can be compensated for by connecting capacitor A12 to the system in series. Also, power oscillation due to power variations from the transmitting end or the receiving end can be inhibited by compensation voltage generator A10. Moreover, by compensating for the system voltage drop using both series capacitor A12 and the compensation voltage generator, it is possible to increase transmission (distribution) capability in existing AC transmission (distribution) systems using a small capacity compensation voltage generator.

Next, a twenty-fifth embodiment of the present invention will be described.

Figure 68:
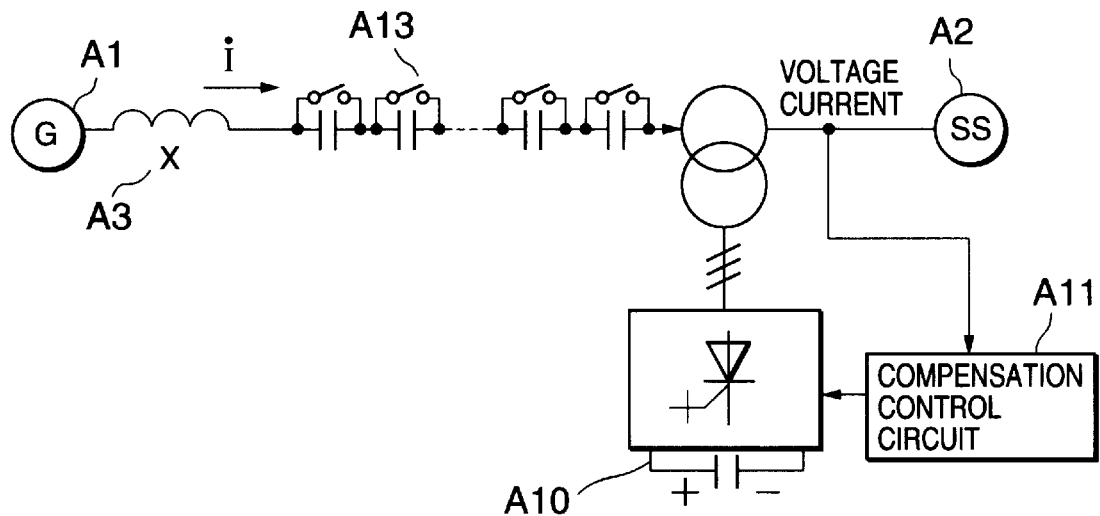
FIG. 68 is a block diagram of an AC power transmission system according to a twenty-fifth embodiment of the present invention.

FIG. 68 is a block diagram showing a twenty-fifth embodiment of an AC power transmission (distribution) system of the present invention.

In the diagram, A1 is a power station (transmitting end), A2 is a substation (receiving end), A3 is system transmission line reactance X, A10 is a compensation voltage generator, A11 is a compensation control circuit for the compensation voltage generator. A13 is multiple capacitors connected to the system in series, which are provided with switches so that both terminals of any of the capacitors can be independently short-circuited. I is the three-phase current flowing in the system transmission line. In practice, resistances, and the like, exist in system, in addition to the reactance, but these have been omitted to simplify the explanation.

Phase difference θ occurs between transmitting-end voltage Es and receiving-end voltage Er. Because this difference in voltage between transmitting-end voltage Es and the receiving-end voltage Er occurs, current I flows in the transmission line due to system reactance X. In this case, in relation to transmission line current I, the relationship between the voltage difference and jωXI is Es−Er=jωLI, and the phase is 90° advanced relative to the current.

In response to this, the voltage indicated in the following expression is generated in reverse phase to system reactance A3 by multiple capacitors A13 connected to the system in series. In this expression C is the total capacitance of multiple capacitors A13.

$$Vc = j\frac{1}{\omega C}$$

As a result of this voltage, voltage drop jωXI due to system reactance A3 can be inhibited.

Moreover, by producing compensation voltage Vo, which is a component orthogonal to the current I flowing in the transmission line, as output from the compensation voltage generator, receiving-end voltage Er becomes Ern relative to transmitting-end voltage Es, and phase difference θ reduces and the size of the voltage increases, in order to cancel out voltage drop jωXI due to transmission line reactance X. That is, the equivalent reactance is reduced, so it is possible to increase the active power that can be transmitted. In this case, it is possible to make equivalent reactance X zero by making $$Vo = -\left(j\omega LI - j\frac{1}{\omega C}\right)$$

and Es can be made equal to Er.

If transmission power fluctuations occur at transmitting end A1 or load power fluctuations occur at receiving end A2, system power oscillation can be inhibited by carrying out control involving the output of compensation voltage from compensation voltage generator A10.

For example, if the phase angle relative to receiving-end voltage Er increases due to fluctuations in transmitting-end voltage Es, system current I and receiving-end voltage Er can be maintained at a constant level by controlling voltage Vo output from compensation voltage generator A10 in proportion to the value of Es−Er. That is, power fluctuations in the system can be inhibited even if the transmitting-end voltage fluctuates.

In addition, if transmission power fluctuations occur at transmitting end A1 or load power fluctuations occur in receiving end A2, fluctuation of oscillation can also be inhibited by changing the capacitance of the capacitors by short-circuiting both terminals of any of multiple capacitors A13.

By connecting capacitors A13 to the system in series so that the capacitance can be changed step-wise in this way, the voltage drop due to system reactance A3 can be compensated for step-wise. Also, in the steady state, the voltage drop due to the system reactance is compensated for by both compensation voltage generator A10 and capacitors A13 together, so the capacity of compensation voltage generator A10 can be reduced, and since voltage fluctuations from the transmitting end or the receiving end can be inhibited by compensation voltage generator A10, it is possible to increase transmission (distribution) capability in existing AC transmission (distribution) systems.

Figure 69:
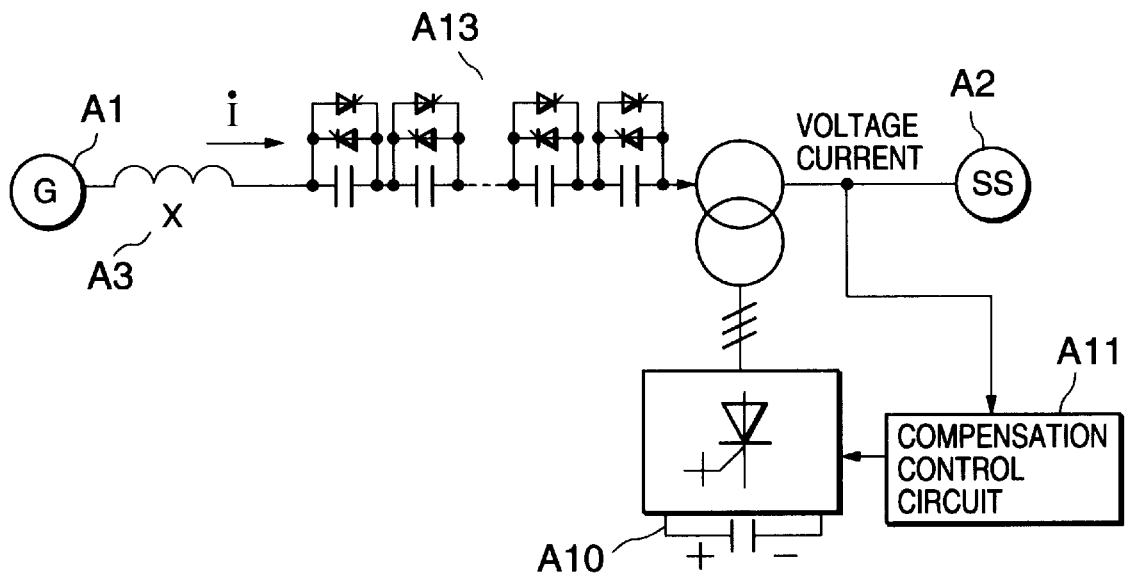
FIG. 69 is a block diagram of a modification of an AC power transmission system according to the twenty-fifth embodiment of the present invention.

FIG. 69 shows a different modification of the twenty-fifth embodiment of an AC power transmission (distribution) system of the present invention. Here, only the aspects that differ from the AC power transmission system shown in FIG. 68 will be explained, and elements that are identical will not be explained.

FIG. 69 is an example in which the switches that short-circuit both terminals of capacitors A13 in the AC power transmission system shown in FIG. 68 have, in practical terms, been replaced by thyristor switches that are connected in inverse parallel to each other.

With this construction also, as in the AC power transmission system shown in FIG. 68, by connecting capacitors A13 to the system in series so that the capacitance can be changed step-wise, the voltage drop due to system reactance A3 can be compensated for step-wise. Also, in the steady state, the voltage drop due to the system reactance is compensated for by both compensation voltage generator A10 and capacitors A13 together, so the capacity of compensation voltage generator A10 can be reduced, and since voltage fluctuations from the transmitting end or the receiving end can be inhibited by compensation voltage generator A10, it is possible to increase transmission (distribution) capability in existing AC transmission (distribution) systems.

Next, a twenty-sixth embodiment of the present invention will be described.

Figure 70:
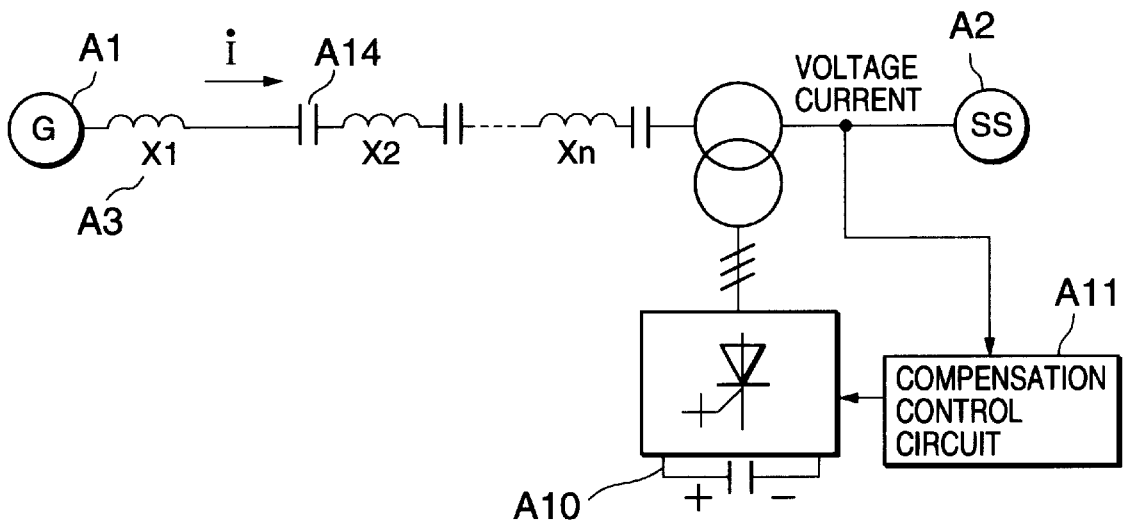
FIG. 70 is a block diagram of an AC power transmission system according to a twenty-sixth embodiment of the present invention.

FIG. 70 is a block diagram showing a twenty-sixth embodiment of an AC power transmission (distribution) system of this invention.

In the diagram, A1 is a power station (transmitting end), A2 is a substation (receiving end), A3 are system transmission line reactances X~Xn, A10 is a compensation voltage generator, A11 is a compensation control circuit for the compensation voltage generator. A14 is multiple capacitors connected to the system in series and which are distributed to multiple locations in system. I is the three-phase current flowing in the system transmission line.

In the AC power transmission system of the twenty-sixth embodiment shown in FIG. 70, the point of difference from the AC power transmission system of the twenty-fourth embodiment shown in FIG. 62 is that capacitors A14 are distributed to multiple locations. Apart from this, the system is identical to the AC power transmission system of the twenty-fourth embodiment, and the elements that are identical will not be explained.

By distributing capacitors A14 to multiple locations in this way, it is possible to actively compensate for the voltage drop due to the reactance of the system, the voltage distribution of the system can be made uniform, and it is possible to increase transmission (distribution) capability in existing AC transmission (distribution) systems.

Next, a twenty-seventh embodiment of the present invention will be described.

Figure 71:
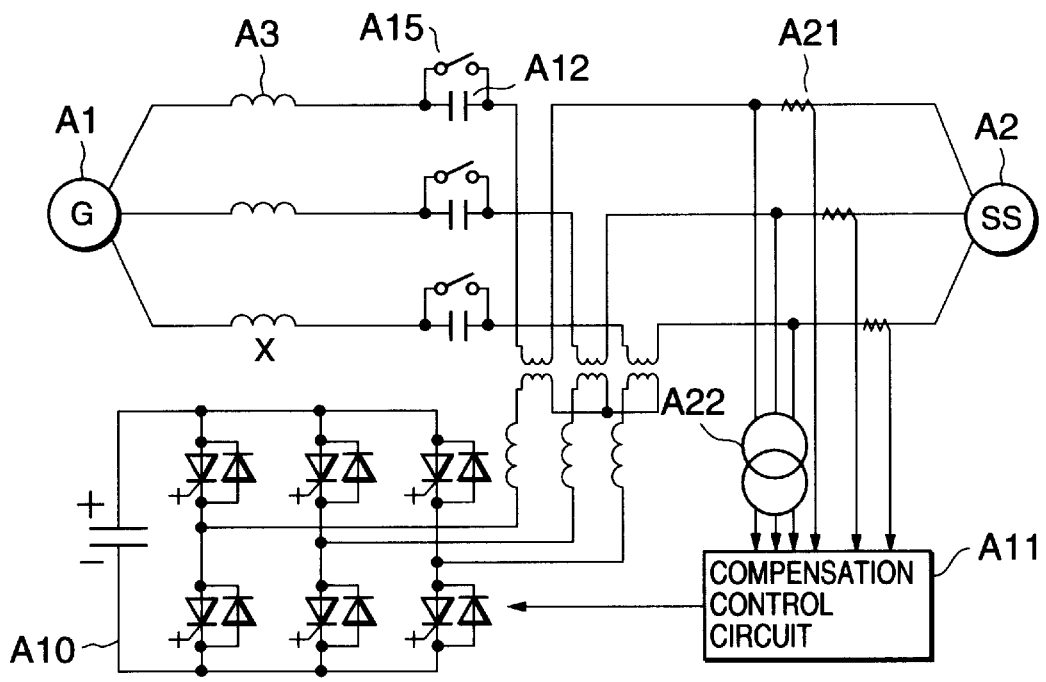
FIG. 71 is a block diagram of an AC power transmission system according to a twenty-seventh embodiment of the present invention.

FIG. 71 is a block diagram showing a twenty-seventh embodiment of an AC power transmission (distribution) system of the present invention.

In the diagram, A1 is a power station (transmitting end), A2 is a substation (receiving end), A3 is system transmission line reactance X, A10 is a compensation voltage generator, A11 is a compensation control circuit for the compensation voltage generator, A12 is a capacitor connected to the system in series, and A15 is a switch for bypassing the above-mentioned capacitor connected in series.

If an overcurrent flows due to an incident such as a line-to-earth fault or the like in the system, switch A15 for bypassing capacitor A12 closes, and the overcurrent is caused to flow through switch A15. As a result, the reactance of the system can be returned to its original value X, and escalation of the overcurrent prevented. In addition, the flow of overcurrent to the series capacitor can be prevented, and the reliability of the system can be improved.

Apart from this, the operation of this system is identical to that of the twenty-fourth embodiment, and the elements that are identical will not be explained.

Figure 72:
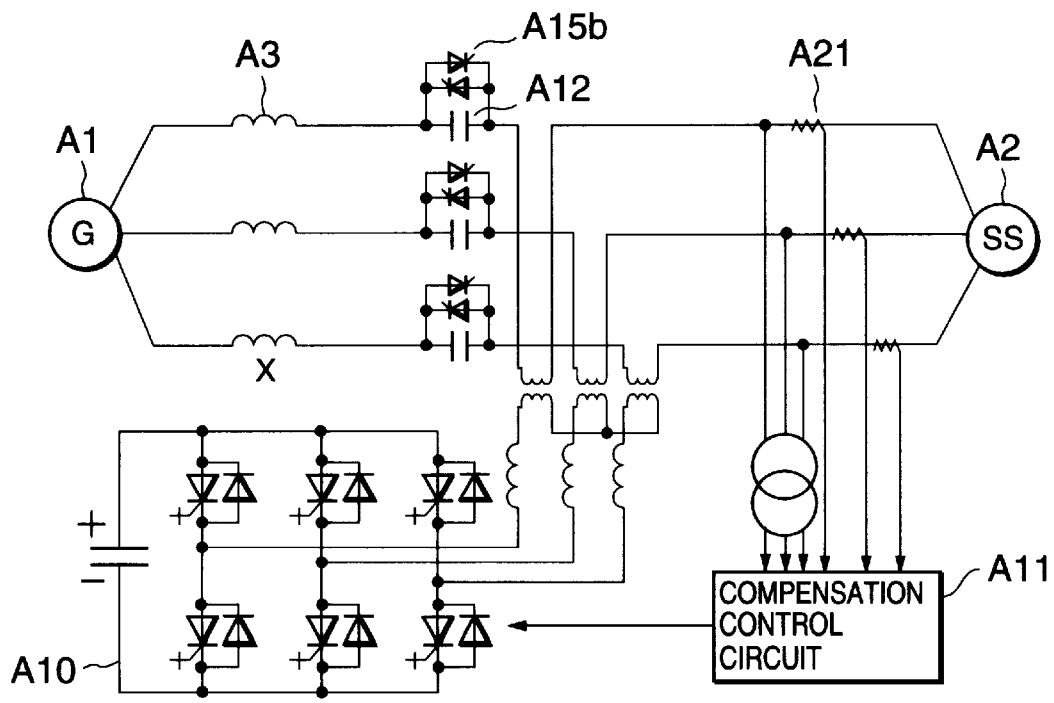
FIG. 72 is a further block diagram of an AC power transmission system according to the twenty-seventh embodiment of the present invention.

FIG. 72 shows a different modification of the twenty-seventh embodiment of an AC power transmission (distribution) system of this invention. Here, only the aspects that differ from the AC power transmission system shown in FIG. 71 will be explained, and elements that are identical will not be explained.

FIG. 72 is an example in which the switch that short-circuits both terminals of capacitor A12 in the AC power transmission system shown in FIG. 71 has, in practical terms, been replaced by thyristor switches A15$b$ that are connected in inverse parallel to each other.

With this construction also, as in the AC power transmission system shown in FIG. 71, if an overcurrent flows due to an incident such as a line-to-earth fault or the like in the system, switches A15$b$ for bypassing capacitor A12 close, and the overcurrent is caused to flow through these switches A15$b$. As a result, the reactance of the system can be returned to its original value X, and escalation of the overcurrent prevented. In addition, the flow of overcurrent to the series capacitor can be prevented, and the reliability of the system can be improved.

Next, a twenty-eighth embodiment of the present invention will be described.

Figure 73:
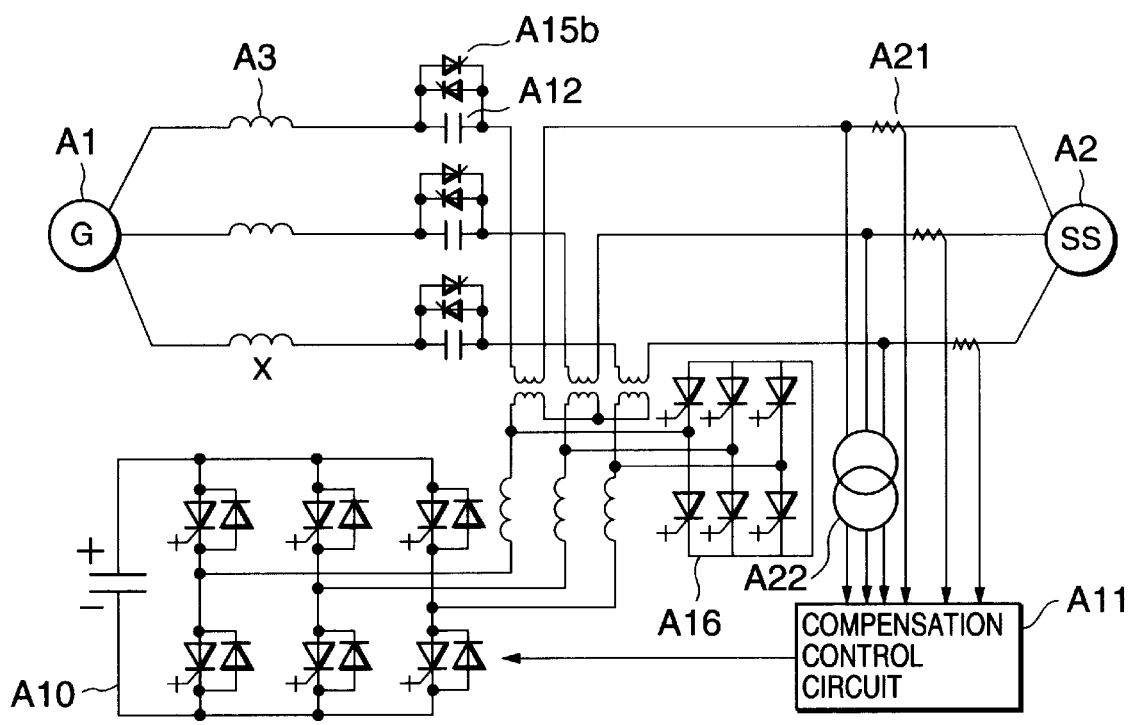
FIG. 73 is a block diagram of an AC power transmission system according to a twenty-eighth embodiment of the present invention.

FIG. 73 is a block diagram showing a twenty-eighth embodiment of an AC power transmission system of the present invention.

In the diagram, A1 is a power station (transmitting end), A2 is a substation (receiving end), A3 is system transmission line reactance X, A10 is a compensation voltage generator, A11 is a compensation control circuit for the compensation voltage generator, A12 is a capacitor connected to the system in series, A15$b$ is a thyristor switch which bypasses the above-mentioned capacitor connected in series, and A16 is a circuit to bypass the above-mentioned compensation voltage generator.

If an overcurrent flows due to an incident such as a line-to-earth fault or the like in the system, switch A15$b$ for bypassing capacitor A12 closes, furthermore circuit A16 for bypassing the output terminals of compensation voltage generator A10 short-circuits, and the overcurrent is caused to flow through switch A15$b$ and bypass circuit A16. As a result, the reactance of the system can be returned to its original value X, and escalation of the overcurrent prevented. In addition, the flow of overcurrent to series capacitor A12 and compensation voltage generator A10 can be prevented, and the reliability of the system can be improved.

Apart from this, the operation of this system is identical to that of the twenty-fourth embodiment, and the elements that are identical will not be explained.

Next, a twenty-ninth embodiment of the present invention will be described.

Figure 74:
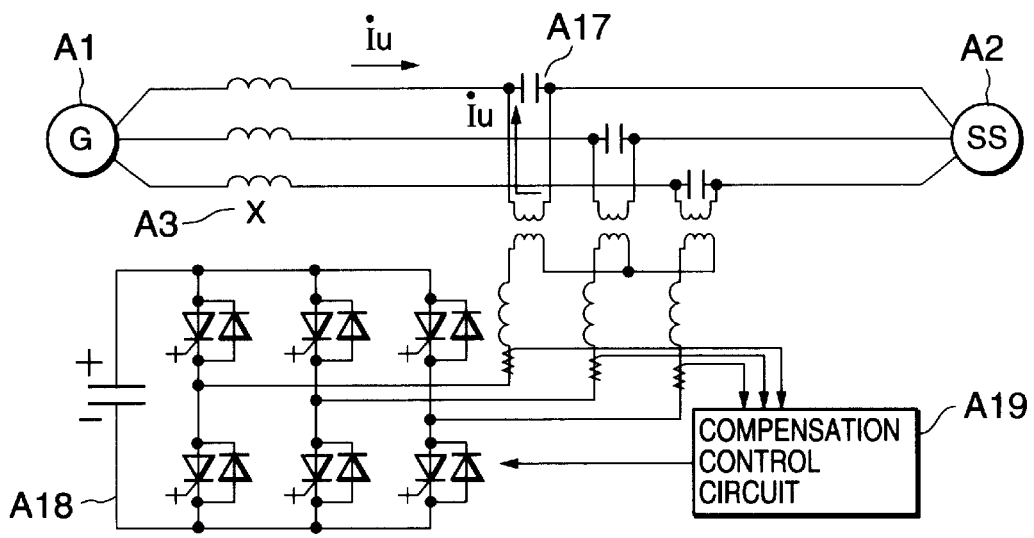
FIG. 74 is a block diagram of an AC power transmission system according to a twenty-ninth embodiment of the present invention.

FIG. 74 is a block diagram showing a twenty-ninth embodiment of an AC power transmission (distribution) system of the present invention.

In the diagram, A1 is a power station (transmitting end), A2 is a substation (receiving end), A3 is system transmission line reactance X, A17 is a capacitor connected to the system, A18 is a compensation current generator connected in parallel to capacitor A17, A19 is a compensation control circuit for the compensation current generator, and Iu is the U-phase current flowing in the system transmission line. In practice, resistances, and the like, exist in system, in addition to the reactance, but these have been omitted to simplify the explanation.

Compensation current generator A18 is composed of self-turn-off devices (for example GTOs) with diodes connected in parallel to these devices, and is connected in a three-phase bridge structure. In addition, the compensation current generator A18 is connected to a DC transformer via a reactor, and the primary side of the DC transformer is connected in parallel to capacitor A17 separately for each phase.

Figure 75:
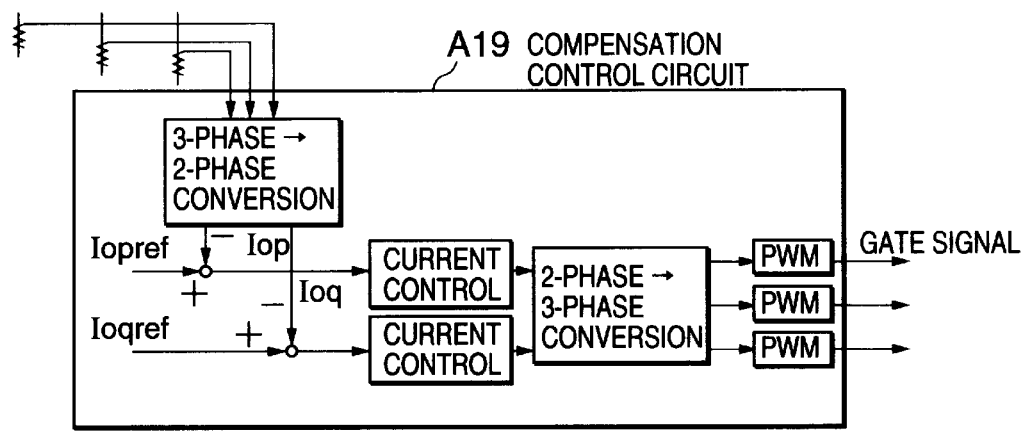
FIG. 75 is a block diagram of a compensation control circuit according to the twenty-ninth embodiment of the present invention.
Figure 76:
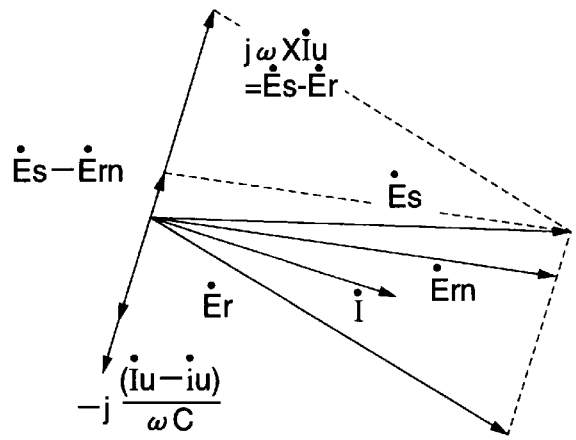
FIG. 76 is a power vector diagram of a steady state according to the twenty-ninth embodiment of the present invention.
Figure 77:
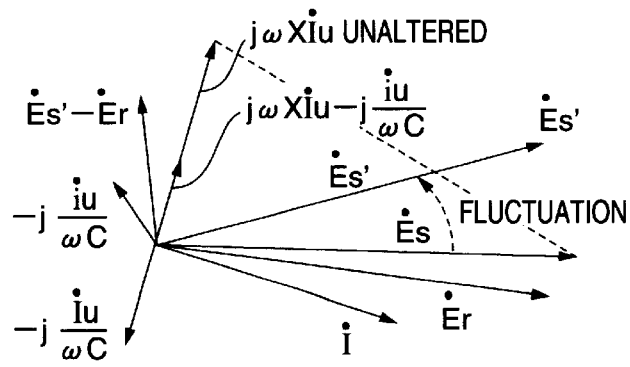
FIG. 77 is a power vector diagram of a case where a power fluctuation occurs according to the twenty-ninth embodiment of the present invention.

FIG. 75 is a block diagram showing the compensation control circuit for the compensation current generator, and operation of this circuit is explained using the vector diagrams of FIG. 76 and FIG. 77.

FIG. 76 is a vector diagram showing a situation in which the system reactance is constantly compensated for. Phase difference θ occurs between transmitting-end voltage Es and receiving-end voltage Er. Because this difference in voltage between transmitting-end voltage Es and receiving-end voltage Er occurs, current Iu flows in the transmission line due to system reactance X. In this case, in relation to transmission line current Iu, the relationship between the voltage difference and jωX·Iu is Es−Er=jωLIu, and the phase is 90° advanced relative to the current.

In response to this, the current at the output terminals of capacitor A17, that is connected in series, and compensation current generator A18 connected in parallel to capacitor A17 compensates, in the steady state, for voltage drop jωL·Iu due to the reactance, as a result of the control carried out by compensation current control circuit A19. Voltage Ec generated by capacitor A17 is in reverse phase to the reactance. Taking the current output from compensation current generator A18 as iu, voltage Ec generated by capacitor A17 is:

$$Ec = -j\frac{Iu + iu}{\omega C}$$

Therefore, in the steady state, the difference between voltage Ec generated by capacitor A17 and voltage drop jωL·Iu due to the reactance becomes the voltage difference between the transmitting end and the receiving end. Thus, the transmission (distribution) capability of an existing AC transmission (distribution) system can be improved.

Also, even in the case of power fluctuation occurring at the transmitting end and the receiving end, that fluctuation can be suppressed by controlling the output current of compensation current generator A18. A vector diagram for the case of transmitting-end voltage Es fluctuating is shown in FIG. 77. When the transmitting-end voltage fluctuates from Es to Es', system current Iu and receiving-end voltage Er can be kept constant by controlling the size and phase of output current iu from compensation current generator A18 according to the value of Es'−Er. In other words, even if the transmitting end voltage fluctuates, system power fluctuation can be suppressed.

In this way, the voltage drop of the system is compensated by capacitor A17 that is connected in series with the system and compensation current generator A18 that is connected in parallel with capacitor A17. Also, because voltage fluctuation at the transmitting end and the receiving end can be suppressed, the transmission (distribution) capability of an existing AC transmission (distribution) system can be improved.

The following is a description of a thirtieth embodiment of the present invention.

Figure 78:
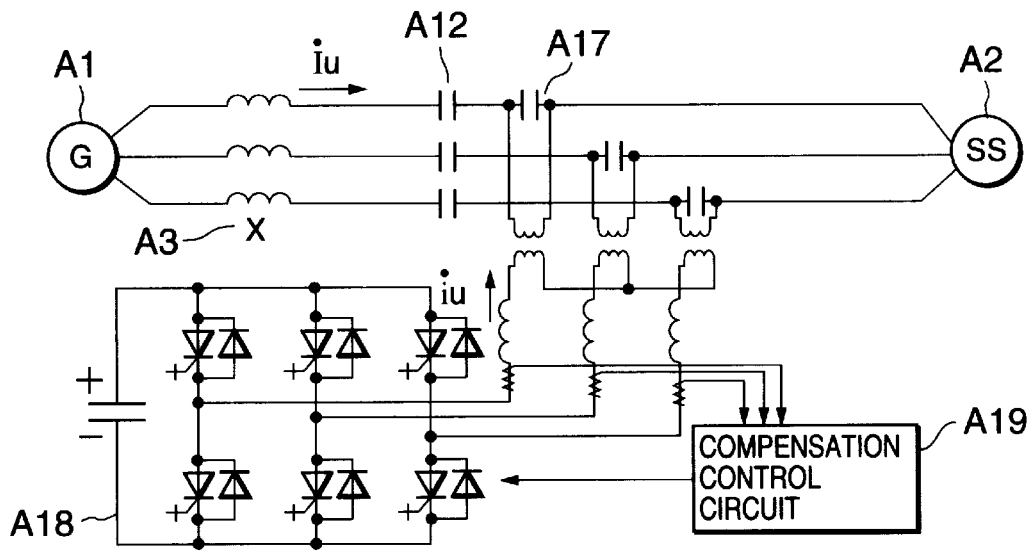
FIG. 78 is a block diagram of an AC power transmission system according to a thirtieth embodiment of the present invention.

FIG. 78 is a block diagram of a thirtieth embodiment of an AC transmission (distribution) system of the present invention.

In the diagram, A1 is a power station (transmitting end); A2 is a substation (receiving end); A3 is reactance X of the system transmission line; A12 is a first capacitor connected in series with the system; A17 is a second capacitor connected to the system; A18 is a compensation current generator connected in parallel with second capacitor A17; A19 is a compensation control circuit for the compensation current generator; Iu is the U-phase current flowing in the system transmission line. In fact, as well as reactance, resistance and the like are also present in the system, but these have been omitted to simplify the description.

Phase difference θ occurs between transmitting end voltage Es and receiving end voltage Er. Because of this voltage difference between transmitting end voltage Es and receiving end voltage Er, current I flows in the transmission line due to system reactance X. For current I in the transmission line at this time, the relationship between the voltage difference and jωX·Iu becomes Es−Er=jωL·Iu, and the phase is advanced 90° in relation to the current.

In response to this, the current at the output terminals of series-connected first capacitor A12 and compensation current generator A18 that is connected in parallel with second capacitor A17 is controlled by compensating current control circuit A19. Thus, voltage drop jωL·Iu due to reactance X is compensated in the steady state.

When the capacitance of capacitor A12 is taken as C1, the voltage generated by serially-connected first capacitor A12 is in reverse phase to system capacitance A3, as in the following expression.

$$Vc = -j\frac{1}{\omega C1}$$

Voltage drop jωX·Iu of system reactance A3 can be suppressed by this voltage.

Also, when the current outputted from compensation current generator A18 is taken as iu, and the capacitance of second capacitor A17 as C2, voltage Ec generated by second capacitor A17 becomes $$Ec = -j\frac{(Iu + iu)}{\omega C}$$

Therefore, in the steady state, the difference between the voltage generated by the first and second capacitors and voltage drop jωL·Iu due to and the reactance becomes the voltage difference between the transmitting end and the receiving end. Thus, the transmission (distribution) capability of an existing AC transmission (distribution) system can be improved.

Also, even in the case of power fluctuation occurring at the transmitting end and the receiving end, that fluctuation can be suppressed by controlling the output current of compensation current generator A18. When the transmitting-end voltage fluctuates from Es to Es', system current Iu and receiving end voltage Er can be kept constant by controlling the size and phase of output current iu from compensation current generator A18 according to the value of Es'−Er. In other words, even if the transmitting end voltage fluctuates, system power fluctuation can be suppressed.

Moreover, because, in the steady state, the system reactance voltage drop is compensated for by series capacitor A12 and compensation current generator A18, the capacity of compensation current generator A18 can be reduced.

In this way, the system voltage drop is compensated for by first capacitor A12 and second capacitor A17 that are connected in series with the system and compensation current generator A18 that is connected in parallel with second capacitor A17. Because, in this case, there is combined compensation by first capacitor A12, second capacitor A17 and compensation current generator A18, it is possible to use a smaller capacity compensation current generator A18. Also, because voltage fluctuation at the transmitting end and the receiving end can be suppressed, the transmission (distribution) capability of an existing AC transmission (distribution) system can be improved.

The following is a description of a thirty-first embodiment of the present invention.

Figure 79:
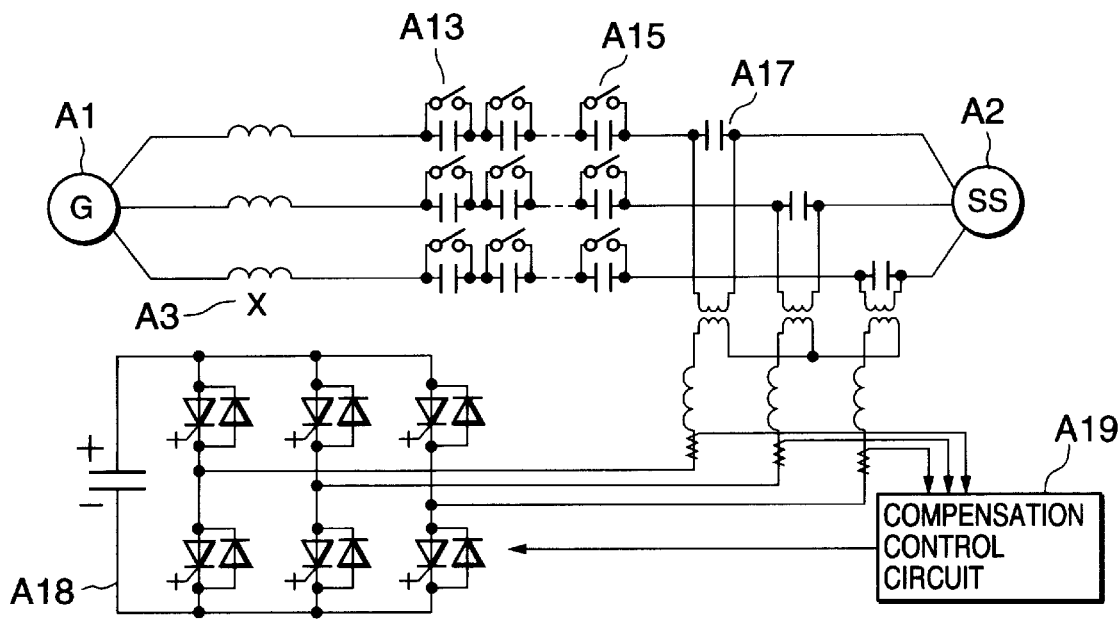
FIG. 79 is a block diagram of an AC power transmission system according to a thirty-first embodiment of the present invention.

FIG. 79 is a block diagram of a thirty-first embodiment of an AC transmission (distribution) system of the present invention.

In the diagram, A1 is a power station (transmitting end); A2 is a substation (receiving end); A3 is reactance X of the system transmission line; A13 is a first capacitor connected in series with the system, and the capacitance of this capacitor can be varied step-wise by switches A15 that are connected in parallel with it; A17 is a second capacitor connected to the system; A18 is a compensation current generator connected in parallel with second capacitor A17; A19 is a compensation control circuit for the compensation current generator. In fact, as well as reactance, resistance and the like are also present in the system, but these have been omitted to simplify the description.

Here, only the point of difference from the thirtieth embodiment is described, and descriptions of like parts have been omitted.

The point of difference from the thirtieth embodiment is that the first capacitor that is connected in series with the system is composed of multiple capacitors. Switches A15 are connected to the two ends of each capacitor. Thus, by operating switches A15, the capacitance of the first capacitor can be varied step-wise.

By this means, the system reactance voltage drop and fluctuation of power oscillation can be suppressed by causing step-wise variation of the capacitor capacitance by shorting the two ends of any of the first capacitors.

The following is a description of a thirty-second embodiment of the present invention.

Figure 80:
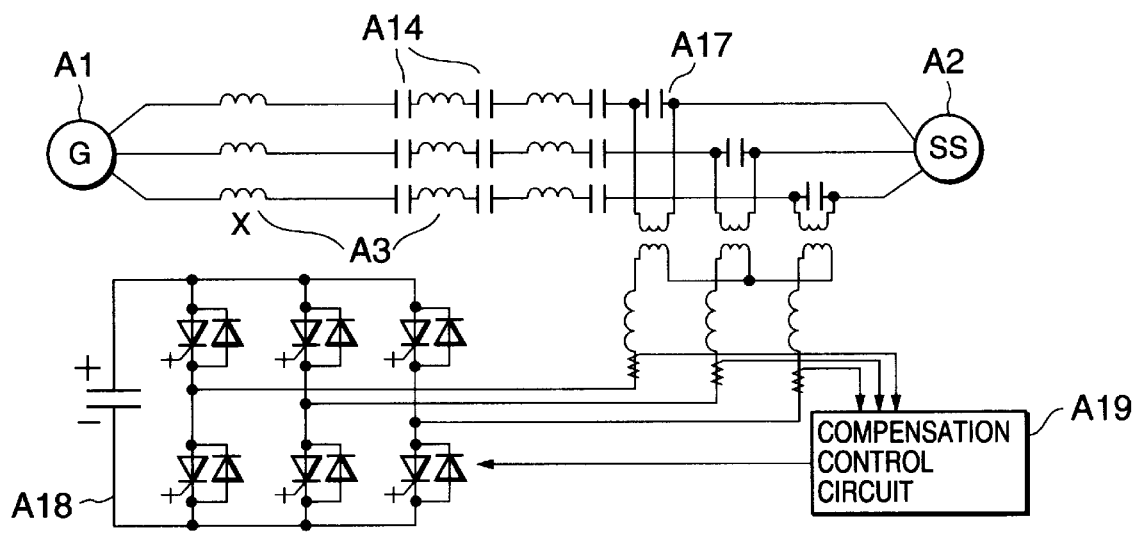
FIG. 80 is a block diagram of an AC power transmission system according to a thirty-second embodiment of the present invention.

FIG. 80 is a block diagram of a thirty-first embodiment of an AC transmission (distribution) system of the present invention.

In the diagram, A1 is a power station (transmitting end); A2 is a substation (receiving end); A3 is reactance X of the system transmission line; A14 is a first capacitor connected in series with the system, and this is split and installed in multiple locations in the system; A17 is a second capacitor connected to the system; A18 is a compensation current generator connected in parallel with second capacitor A17; A19 is a compensation control circuit for the compensation current generator. In fact, as well as reactance, resistance and the like are also present in the system, but these have been omitted to simplify the description.

The point of difference of the thirty-second embodiment of an AC transmission (distribution) system, shown in FIG. 80, from the thirtieth embodiment of an AC transmission system, shown in FIG. 78, is that capacitor A14 is split and installed in multiple locations. Apart from that, the system is the same as the thirtieth embodiment of an AC transmission system, and descriptions have been omitted.

By splitting capacitor A14 and installing it in multiple locations in the system in this way, the system reactance voltage drop can readily be compensated, and the system voltage distribution can be made uniform. Furthermore, the transmission (distribution) capability of an AC transmission (distribution) system can be improved.

The following is a description of a thirty-third embodiment of the present invention.

Figure 81:
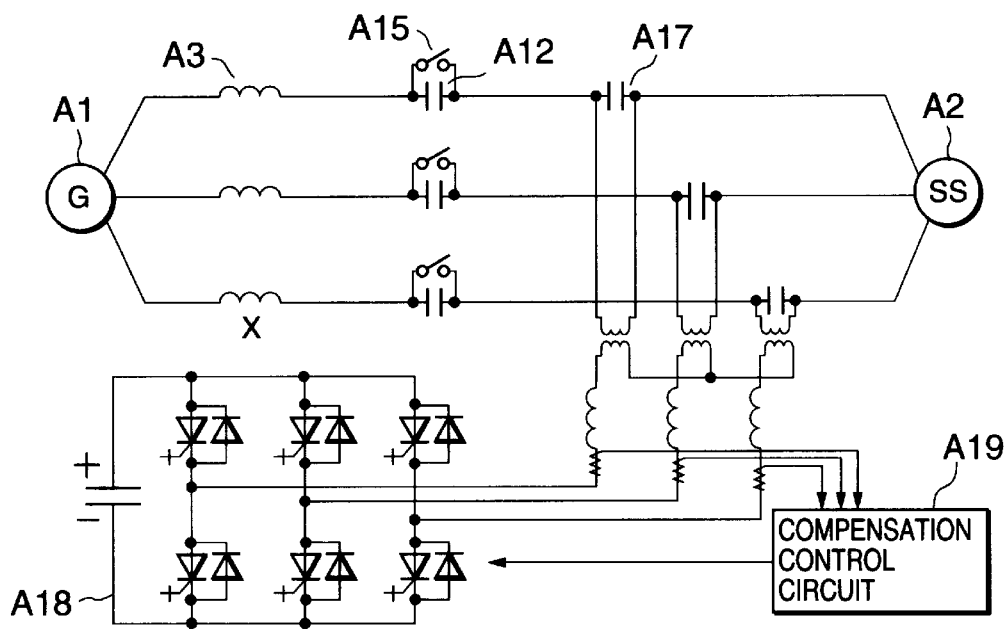
FIG. 81 is a block diagram of an AC power transmission system according to a thirty-third embodiment of the present invention.

FIG. 81 is a block diagram of a thirty-third embodiment of an AC transmission (distribution) system of the present invention.

In the diagram, A1 is a power station (transmitting end); A2 is a substation (receiving end); A3 is reactance X of the system transmission line; A12 is a first capacitor connected in series with the system; A15 is a switch for bypassing the capacitor that is connected in series with the system; A17 is a second capacitor connected to the system; A18 is a compensation current generator connected in parallel with second capacitor A17; A19 is a compensation control circuit for the compensation current generator. In fact, as well as reactance, resistance and the like are also present in the system, but these have been omitted to simplify the description.

When an overcurrent due to an earth fault or the like occurs in the system, the overcurrent is made to flow through switch A15 by closing switch A15 to bypass capacitor A12. By this means, system reactance X returns to its original value, and the overcurrent can be prevented from increasing. Also, the overcurrent is prevented from flowing through the series capacitor, and system reliability can be increased.

Apart from that, the operation is the same as in the thirtieth embodiment. Therefore, further description has been omitted here.

The following is a description of a thirty-fourth embodiment of the present invention.

Figure 82:
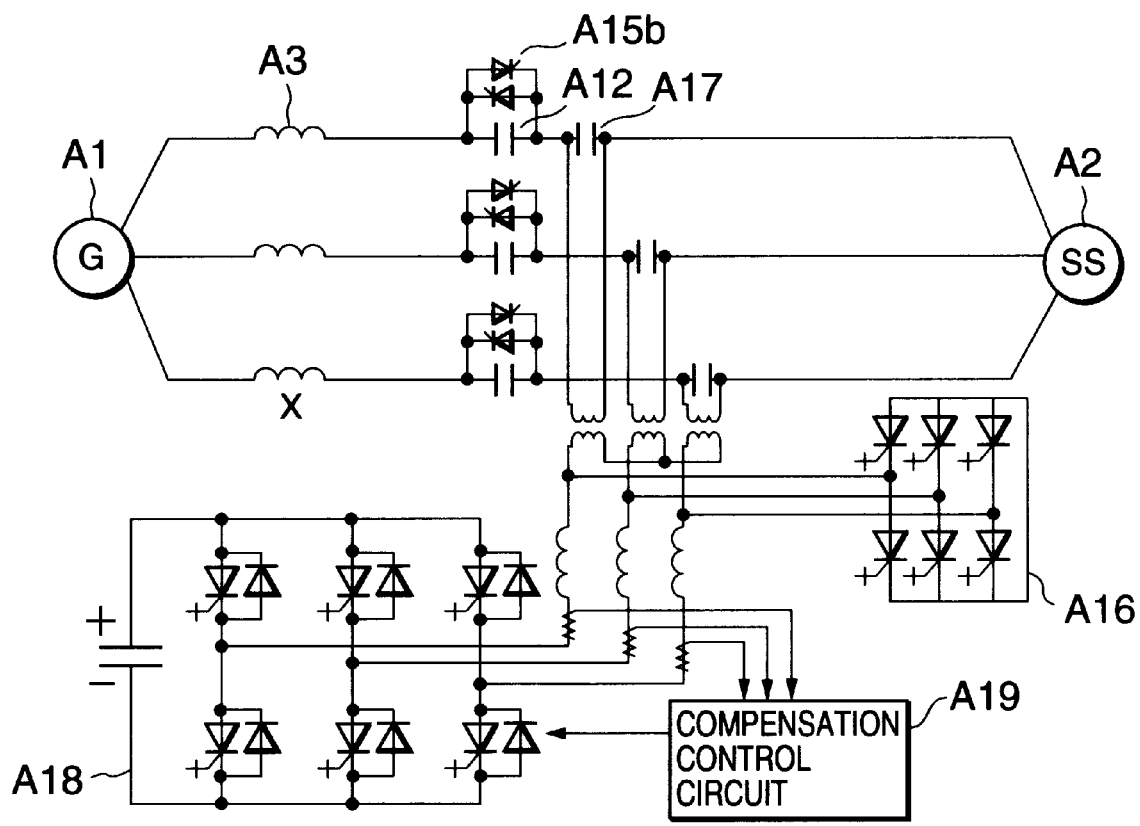
FIG. 82 is a block diagram of a power transmission system according to a thirty-fourth embodiment of the present invention.

FIG. 82 is a block diagram of a thirty-fourth embodiment of an AC transmission (distribution) system of the present invention.

In the diagram, A1 is a power station (transmitting end); A2 is a substation (receiving end); A3 is reactance X of the system transmission line; A12 is a first capacitor connected in series with the system; A15$b$ is a thyristor switch for bypassing the capacitor that is connected in series with the system; A16 is a bypass circuit for bypassing the compensation current generator; A17 is a second capacitor connected to the system; A18 is a compensation current generator connected in parallel with second capacitor A17; A19 is a compensation control circuit for the compensation current generator. In fact, as well as reactance, resistance and the like are also present in the system, but these have been omitted to simplify the description.

When an overcurrent due to an earth fault or the like occurs in the system, switch A15$b$ is closed to bypass capacitor A12. Moreover, the output terminals of compensation current generator A18 are shorted by bypass circuit A16. Thus, the overcurrent is made to flow through switch A15$b$ and bypass circuit A16. By this means, system reactance X returns to its original value, and the overcurrent can be prevented from increasing. Also, the overcurrent is prevented from flowing through the series capacitor A12 and compensation current generator A18, and system reliability can be increased.

Apart from that, the operation is the same as in the thirtieth embodiment. Therefore, further description has been omitted here.

As described in detail above, with the AC transmission system of the present invention long-distance transmission via multiple substations becomes possible. Loads can also be taken from each of those substations, and links can be made with multiple systems that were difficult with DC. Also, existing transmission lines can be put to use, and it becomes possible to improve the transmission capability of the transmission lines. Moreover, the design is such that power oscillation, too, can speedily be suppressed, and an economical and highly reliable AC transmission system can be provided.

Also, when using the present invention, by connecting compensation voltage circuits or compensation current circuits and capacitors to the system to compensate system inductance in long-distance AC transmission lines or AC distribution lines, an AC transmission system can be provided that can improve the transmission capability of transmission lines or distribution lines.

Obviously numerous additional modifications and variations of the present invention are possible in light of the above teachings. It is therefore to be understood that within the scope of the appended claims, the present invention may be practised otherwise than as specially described herein.

What is claimed is:

1. An AC transmission system that transmits electric power via a plurality of substations, comprising:

a series compensation generator, of which at least one or more is provided in said AC transmission system, that generates a compensating voltage to regulate an equivalent reactance of transmission lines between said substations and to suppress power oscillation, and wherein said series compensation generator is designed also to regulate the reactance of neighbouring transmission lines.

2. An AC transmission system according to claim 1, wherein said series compensation generator comprises:

a means for detecting an active power and a reactive power fluctuations of said transmission line; and a means for regulating a compensation voltage of the component that is orthogonal to a current flowing in said transmission line responding to said active power fluctuation, and regulating said compensating voltage of the in-phase component of said current flowing in said transmission line responding to said reactive power fluctuation to suppress power oscillation of said AC transmission system.

3. An AC transmission system according to claim 1, wherein said series compensation generator comprises:

a means for detecting said power flow of said transmission line and regulating said equivalent reactance of said transmission line responding to said power flow.

4. An AC transmission system according to claim 1, wherein said series compensation generator comprises:

a bypass circuit that bypasses an overcurrent when said overcurrent occurs due to a ground fault or the like in said transmission line.

5. An AC transmission system according to claim 1, wherein said series compensation generator comprises:

a series transformer; and a voltage source self-commutating inverter that is connected to a secondary side of said series transformer.

6. An AC transmission system according to claim 1, wherein said series compensation generator comprises:

a series capacitor; and a compensation voltage generator that is connected in series with said series capacitor.

7. An AC transmission system according to claim 1, wherein said series compensation generator comprises:

a series capacitor; and a compensation current generator that is connected in parallel with said series capacitor.

8. An AC transmission system according to claim 1, wherein said series compensation generator comprises:

a main series capacitor;

an auxiliary series capacitor that is connected in series with said main series capacitor; and a compensation current generator that is connected in parallel with said auxiliary series capacitor.

9. An AC transmission system that transmits electric power via a plurality of substations, comprising:

a series compensation generator that generates a compensation voltage so that an equivalent reactance of transmission lines that connect between all said substations on a transmission path becomes substantially zero, and wherein said series compensation generator is designed also to regulate the reactance of neighbouring transmission lines.

10. An Ac transmission system that transmits electric power via a plurality of substations, comprising:

a series compensation generator that selects, out of transmission lines that link between said substations, said transmission line having the largest percentage reactance % XI and generates a compensating voltage so that said series compensation generator reduces an equivalent reactance of said transmission line.

11. An AC transmission system that transmits electric power via a plurality of substations, comprising:

a series compensation generator that selects, out of transmission lines that link between said substations, said transmission line for which the product of a reactance X of said transmission line and a power flow P flowing in said transmission line is the largest, and generates a compensating voltage so that said series compensation generator reduces an equivalent reactance of said transmission line.

12. An AC transmission system that transmits electric power via a plurality of substations, comprising:

a plurality of series capacitors that are connected in series with a transmission line to cancel out the greater part of the transmission line inductances between said substations; and a compensation voltage generator that generates a compensating voltage to regulate a reactance of said transmission line and suppress power oscillation.

13. An AC transmission system according to claim 12, wherein:

said plurality of series capacitors and said compensation voltage generator are provided with bypass circuits that bypass an overcurrent when said overcurrent occurs due to a ground fault or the like in said transmission line.

14. An AC transmission system that transmits electric power via a plurality of substations, comprising:

a plurality of series capacitors that are connected in series with a transmission line to cancel out the greater part of said transmission line inductances between said sub-stations; and a compensation voltage generator that is connected in series with any of said series capacitors, and generates a compensating voltage to suppress power oscillation in said transmission line.

15. An AC transmission system that transmits electric power via a plurality of substations, comprising:

a plurality of series capacitors that are connected in series with a transmission line to cancel out the greater part of the transmission line inductances between said substations; and a compensation current generator that is connected in parallel with any of said series capacitors, and generates a compensating current to suppress power oscillation in said transmission line.

16. An AC transmission system according to claim 15, wherein:

said series capacitors are provided with bypass circuits that bypass an overcurrent when said overcurrent occurs due to a ground fault or the like in said transmission line.

17. An AC transmission system that transmits electric power via a plurality of substations, comprising:

a plurality of main series capacitors that are connected in series with a transmission line to cancel out the greater part of said transmission line inductances between said substations;

an auxiliary series capacitor that is connected in series with any of said main capacitors; and a compensation current generator that is connected in parallel with said auxiliary series capacitor.

18. An AC transmission system according to claim 17, wherein:

said main series capacitors and said auxiliary series capacitor are provided with bypass circuits that bypass an overcurrent when said overcurrent occurs due to a ground fault or the like in said transmission line.

19. An AC transmission system, comprising:

a transmission line;

a series compensation generator that generates a compensating voltage to regulate an equivalent reactance of said transmission line, wherein said series compensation generator is designed also to regulate the reactance of neighbouring transmission lines; and a static var generator that compensates a reactive current or a harmonic current flowing in floating capacitance of said transmission line.

20. An AC transmission system according to claim 19, wherein:

said series compensation generator is provided with a power oscillate ion suppression means that detects power fluctuation in said transmission line, and suppresses said power fluctuation.

21. An AC transmission system according to claim 19, wherein:

said series compensation generator is provided with a bypass circuit that bypasses an overcurrent when said overcurrent occurs due to a ground fault or the like in said transmission line.

22. An AC transmission system according to claim 19, wherein:

said series compensation generator or said static var generator is split and installed in multiple locations in said transmission line.

23. An AC transmission system according to claim 20, wherein:

said series compensation generator is provided with a bypass circuit that bypasses an overcurrent when said overcurrent occurs due to a ground fault or the like in said transmission line.

24. An AC transmission system, comprising:

a transmission line;

a series compensation generator that generates a compensating voltage so that an equivalent inductance of said transmission line becomes substantially zero, wherein said series compensation generator is designed also to regulate the reactance of neighbouring transmission lines; and a static var generator that compensates a reactive current or a harmonic current flowing in floating capacitance of said transmission line.

25. An AC transmission system according to claim 24, wherein:

said series compensation generator is provided with a bypass circuit that bypasses an overcurrent when said overcurrent occurs due to a ground fault or the like in said transmission line.

26. An AC transmission system, comprising:

a transmission line;

a series capacitor that is connected in series with said transmission line to cancel out the greater part of the inductance of said transmission line;

a compensation voltage generator that is connected in series with said series capacitor; and a static var generator that compensates a reactive current or a harmonic current flowing in floating capacitance of said transmission line.

27. An AC transmission system according to claim 26, wherein:

said series capacitor and said compensation voltage generator are connected with bypass circuits that bypass an overcurrent when said overcurrent occurs due to a ground fault or the like in said transmission line.

28. An AC transmission system according to claim 26, wherein:

said compensation voltage generator is provided with a power oscillation suppression means that detects power fluctuation in said transmission line, and suppresses said power fluctuation.

29. An AC transmission system according to claim 26, wherein:

said series capacitor or said static var generator is split and installed in multiple locations in said transmission line.

30. An AC transmission system, comprising:

a transmission line;

a series capacitor that is connected in series with said transmission line to cancel out the greater part of inductance of said transmission line;

a compensation current generator that is connected in parallel with said series capacitor; and a static var generator that compensates a reactive current or a harmonic current flowing in floating capacitance of the said transmission line.

31. An AC transmission system according to claim 30, wherein:

said series capacitor is connected with a bypass circuit that bypasses an overcurrent when said overcurrent occurs due to a ground fault or the like in said transmission line.

32. An AC transmission system according to claim 30, wherein:

said compensation current generator is provided with means that detect power fluctuation in said transmission line, and suppress said power fluctuation.

33. An AC transmission system, comprising:

a transmission line;

a main series capacitor that is connected in series with said transmission line to cancel out the greater part of inductance of said transmission line;

an auxiliary series capacitor that is connected in series with said main series capacitor;

a compensation current generator that is connected in parallel with said auxiliary series capacitor; and a static var generator that compensates a reactive current or a harmonic current flowing in floating capacitance of said transmission line.

34. An AC transmission system according to claim 32, wherein:

said main series capacitor and said auxiliary series capacitor are connected with bypass circuits that bypass an overcurrent when said overcurrent occurs due to a ground fault or the like in said transmission line.

35. An AC transmission system according to claim 33, wherein:

said main series capacitor or said static var generator is split and installed in multiple locations in said transmission line.

36. An AC transmission system, comprising:

a transmission line; and a compensation voltage generation means for being connected in series with said transmission line and generating a compensating voltage, a phase angle of which is shifted 90° (ninety degrees) to transmission current, so that equivalent inductance of said transmission line becomes substantially zero.

37. An AC transmission system, comprising:

a transmission line; and a compensation voltage generation means for being connected in series with said transmission line and generating a compensating voltage, a phase angle of which is shifted 90° (ninety degrees) to transmission current, so that equivalent inductance of said transmission line becomes substantially zero and generating a compensating voltage to suppress an electrical oscillation when said oscillation occurs in said AC transmission line.

38. An AC transmission system, comprising:

a transmission line;

a capacitor that is connected in series with said transmission line; and a compensation voltage generation means for being connected in series with said transmission line and generating a compensating voltage so that equivalent inductance of said transmission line becomes substantially zero and generating a compensating voltage to suppress an electrical oscillation when said oscillation occurs in said transmission line.

39. An AC transmission system according to claim 38, wherein:

said capacitor may vary capacitance of said capacitor step-wise.

40. An AC transmission system according to claim 38, wherein:

said capacitor is split and installed in multiple locations in said transmission line.

41. An AC transmission system according to claim 38, further comprising:

a bypass circuit that shorts out said capacitor when an overvoltage or an overcurrent occurs in said transmission line.

42. An AC transmission system, comprising:

a transmission line;

a capacitor that is connected in series with said transmission line; and a compensation current generation means for being connected in parallel with said capacitor and generating a compensating current so that equivalent inductance of said transmission line becomes substantially zero.

43. An AC transmission system according to claim 42, further comprising:

a bypass circuit that shorts out said second capacitor when an overcurrent flows in said transmission line.

44. An AC transmission system, comprising:

a transmission line;

a capacitor that is connected in series with said transmission line; and a compensation current generation means for being connected in parallel with said capacitor and generating a compensating current so that equivalent inductance of said transmission line becomes substantially zero and generating a compensating current to suppress an electrical oscillation when said oscillation occurs in said transmission line.

45. An AC transmission system, comprising:

a transmission line;

a first capacitor that is connected in series with said AC transmission line;

a second capacitor that is connected in series with said first capacitor; and a compensation current generation means for being connected in parallel with said second capacitor and generating a compensating current so that equivalent inductance of said transmission line becomes substantially zero and generating a compensating current to suppress an electrical oscillation when said oscillation occurs in said transmission line.

46. An AC transmission system according to claim 45, wherein:

said first capacitor may vary capacitance of said first capacitor step-wise.

47. An AC transmission system according to claim 45, wherein:

said first capacitor is split and installed in multiple locations in said transmission line.

48. An AC transmission system according to claim 45, further comprising:

a bypass circuit that shorts out said first capacitor when an overvoltage or an overcurrent occurs in said transmission line.

* * * * *